(12) United States Patent
Takijiri et al.

(10) Patent No.: US 12,410,318 B2
(45) Date of Patent: Sep. 9, 2025

(54) PIGMENT COMPOSITION, COLORANT COMPOSITION, COATING MATERIAL, INK, INK SET, PRINTED MATTER, AND PACKAGING MATERIAL

(71) Applicants: artience Co., Ltd., Tokyo (JP); TOYOCOLOR CO., LTD., Tokyo (JP)

(72) Inventors: Kohei Takijiri, Tokyo (JP); Takayoshi Kono, Tokyo (JP); Shohei Sakamoto, Tokyo (JP)

(73) Assignees: artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 16 days.

(21) Appl. No.: 18/294,763

(22) PCT Filed: Jun. 30, 2022

(86) PCT No.: PCT/JP2022/026422
§ 371 (c)(1),
(2) Date: Feb. 2, 2024

(87) PCT Pub. No.: WO2023/013332
PCT Pub. Date: Feb. 9, 2023

(65) Prior Publication Data
US 2024/0343907 A1    Oct. 17, 2024

(30) Foreign Application Priority Data

Aug. 3, 2021 (JP) .................................. 2021-127080
Apr. 14, 2022 (JP) .................................. 2022-066765

(51) Int. Cl.
| | | |
|---|---|---|
| C09B 67/22 | (2006.01) | |
| B65D 65/42 | (2006.01) | |
| C08K 5/3417 | (2006.01) | |
| C08K 5/3462 | (2006.01) | |
| C09B 67/20 | (2006.01) | |
| C09D 7/41 | (2018.01) | |
| C09D 11/037 | (2014.01) | |
| C09D 11/322 | (2014.01) | |
| C09D 11/40 | (2014.01) | |
| G03G 9/09 | (2006.01) | |

(52) U.S. Cl.
CPC .......... *C09B 67/0034* (2013.01); *B65D 65/42* (2013.01); *C08K 5/3417* (2013.01); *C08K 5/3462* (2013.01); *C09B 67/0066* (2013.01); *C09D 7/41* (2018.01); *C09D 11/037* (2013.01); *C09D 11/322* (2013.01); *C09D 11/40* (2013.01); *G03G 9/0906* (2013.01)

(58) Field of Classification Search
CPC ...................................................... C09B 57/04
See application file for complete search history.

(56) References Cited

U.S. PATENT DOCUMENTS

| | | | |
|---|---|---|---|
| 4,349,671 A | 9/1982 | Iqbal et al. | |
| 6,077,339 A | 6/2000 | Nyssen et al. | |
| 6,120,944 A * | 9/2000 | Schadeli | G03F 7/0007 430/7 |

(Continued)

FOREIGN PATENT DOCUMENTS

| | | |
|---|---|---|
| JP | 56-167697 A | 12/1981 |
| JP | 59-184262 A | 10/1984 |
| JP | 10-140066 A | 5/1998 |

(Continued)

OTHER PUBLICATIONS

International Search Report of PCT/JP2022/026422 dated Sep. 20, 2022 [PCT/ISA/210].

*Primary Examiner* — Ian A Rummel
(74) *Attorney, Agent, or Firm* — Sughrue Mion, PLLC

(57) ABSTRACT

Provided is a pigment composition that includes an isoindoline compound, has excellent dispersibility, weather resistance and heat resistance, and good storage stability, and is capable of forming images having high chroma and the like, the pigment composition including an isoindoline compound represented by formula (1) and an isoindoline compound represented by formula (2). Also provided are a colorant composition, a coating material, an ink, an ink set, a printed matter, and a packaging material.

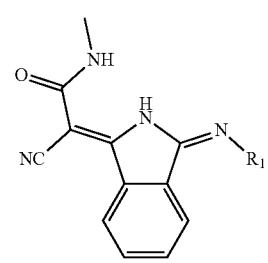

(1)

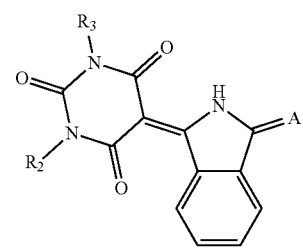

(2)

14 Claims, No Drawings

(56) References Cited

U.S. PATENT DOCUMENTS

| | | |
|---|---|---|
| 2010/0003612 A1 | 1/2010 | Loebel et al. |
| 2022/0213324 A1 | 7/2022 | Matsumoto et al. |

FOREIGN PATENT DOCUMENTS

| | | |
|---|---|---|
| JP | 2006-206737 A | 8/2006 |
| JP | 2007-071924 A | 3/2007 |
| JP | 2009-543917 A | 12/2009 |
| JP | 2016-065115 A | 4/2016 |
| JP | 2018-169505 A | 11/2018 |
| JP | 2019-082497 A | 5/2019 |
| JP | 2019-112537 A | 7/2019 |
| JP | 6893277 B1 | 6/2021 |
| WO | 2020/218262 A1 | 10/2020 |

\* cited by examiner

PIGMENT COMPOSITION, COLORANT COMPOSITION, COATING MATERIAL, INK, INK SET, PRINTED MATTER, AND PACKAGING MATERIAL

CROSS REFERENCE TO RELATED APPLICATIONS

This application is a National Stage of International Application No. PCT/JP2022/026422 filed on Jun. 30, 2022, claiming priority based on Japanese Patent Application No. 2021-127080 filed on Aug. 3, 2021 and Japanese Patent Application No. 2022-066765 filed on Apr. 14, 2022.

TECHNICAL FIELD

The present disclosure relates to a pigment composition including an isoindoline compound. Further, the present disclosure relates to a colorant composition, a coating material, an ink, an ink set, a printed matter, and a packaging material.

BACKGROUND ART

Pigments are mainly used as colorants in applications such as plastic products, toners, coating materials, and printing inks. Pigments are broadly classified into inorganic pigments and organic pigments. In comparison with inorganic pigments, organic pigments are generally superior in color clarity and tinting strength, but tend to be inferior in weather resistance and heat resistance. Examples of known organic pigments include azo pigments, quinophthalone pigments, isoindoline pigments, isoindolinone pigments, anthraquinone pigments, diketopyrrolopyrrole pigments, and quinacridone pigments.

In recent years, there has been an increasing demand for organic pigments and colorants that do not include primary aromatic amines and heavy metals, from the viewpoint of reducing environmental impacts and ensuring safety and health. Azo pigments are mainly used as organic pigments having yellow to red hues. The components of azo pigments may include primary aromatic amines that are derived from raw materials used or are produced through light or thermal decomposition. Thus, in recent years, isoindoline pigments that do not include primary aromatic amines have attracted attention, such as C.I. Pigment Yellow 185, C.I. Pigment Yellow 139, and C.I. Pigment Red 260.

For example, Patent Document 1 discloses an isoindoline pigment for plastic coloring applications. Patent Document 2 also discloses a dispersion for inkjet inks which includes water, a dispersant, and an isoindoline pigment.

PRIOR ART DOCUMENTS

Patent Documents

Patent Document 1: JP-T-2009-543917 A
Patent Document 2: JP 10-140066 A

SUMMARY OF INVENTION

Problems Invention Aims to Solve

However, conventional pigment compositions including isoindoline compounds are difficult to disperse and have poor dispersion stability. Further, colorant compositions including isoindoline compounds lack weather resistance and heat resistance.

An object of the present invention is to provide a pigment composition including an isoindoline compound that is excellent in dispersibility and storage stability and has high weather resistance and heat resistance.

Means for Solution of the Problems

A pigment composition according to an embodiment of the present invention includes an isoindoline compound represented by formula (1) below and an isoindoline compound represented by formula (2) below.

[Chemical formula 1]

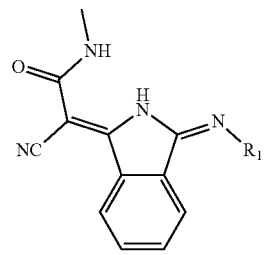

(1)

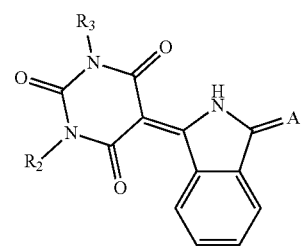

(2)

In the formula, $R_1$ represents an alkyl group that may be substituted, $R_2$ and $R_3$ each independently represent a hydrogen atom, or an alkyl group or aryl group that may be substituted, and 'A' represents a group represented by formula (3), formula (4), or formula (5) below,

[Chemical formula 2]

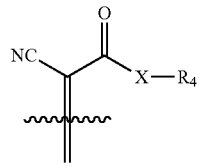

(3)

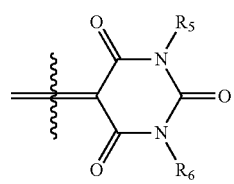

(4)

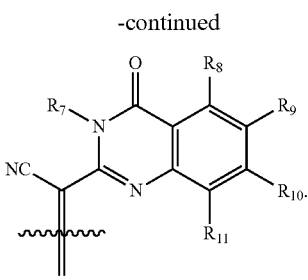

(5)

In the formula, 'X' represents —O— or —NH—, and $R_4$ represents an alkyl group or aryl group which may be substituted, $R_5$ and $R_6$ each independently represent a hydrogen atom, or an alkyl group that may be substituted, and $R_7$ represents a hydrogen atom, $R_8$ to $R_{11}$ each independently represent a hydrogen atom, a halogen atom, or an alkyl, alkoxy, aryl, or aryloxy group that may be substituted.

The disclosure of the present application relates to the subject matter described in Japanese Patent Application No. 2021-127080 filed on Aug. 3, 2021, and Japanese Patent Application No. 2022-066765 filed on Apr. 14, 2022, the entire contents of which are incorporated herein by reference.

Effects of the Invention

The present invention is capable of providing a pigment composition including an isoindoline compound excellent in dispersibility and storage stability and having high weather resistance and heat resistance. The present invention is also capable of providing: an ink set including a yellow ink; a printed matter; and a packaging material.

EMBODIMENTS FOR PERFORMING THE INVENTION

First, terms used in this description will be defined. When described as "(meth)acryloyl", "(meth)acryl", "(meth)acrylic acid", "(meth)acrylate", and "(meth)acrylamide", they mean "acryloyl and/or methacryloyl", "acryl and/or methacryl", "acrylic acid and/or methacrylic acid", "acrylate and/or methacrylate", and "acrylamide and/or methacrylamide", respectively, unless otherwise noted. The term "C.I." means the color index (C.I.).

In this description, "Mw" is the weight average molecular weight in polystyrene equivalent determined through gel permeation chromatography (GPC) measurement, and "Mn" is the number average molecular weight in polystyrene equivalent determined through GPC measurement. The amine value is the number of mg of potassium hydroxide equivalent to the equivalent amount of hydrochloric acid required to neutralize the amino group contained in 1 g of resin, and the acid value and hydroxyl value can be determined in accordance with JIS K0070. The glass transition temperature (Tg) can be determined using differential scanning calorimetry.

These can be measured using a method described in the [EXAMPLES] section.

<I> Pigment Composition

A pigment composition according to one embodiment of the present invention includes an isoindoline compound represented by formula (1), and an isoindoline compound represented by formula (2).

By including two types of isoindoline compounds as described above, the pigment composition according to the present embodiment can improve dispersibility, weather resistance, heat resistance, and storage stability, which have conventionally been desired to be improved with respect to isoindoline compounds. The pigment composition according to the present embodiment can be used for a wide range of applications requiring coloring such as molded bodies, toners, coating materials, printing inks, and inkjet inks.

[Isoindoline Compound (1)] and [Isoindoline Compound (2)]

Hereinafter, an isoindoline compound represented by formula (1) is referred to as an isoindoline compound (1), and an isoindoline compound represented by formula (2) is referred to as an isoindoline compound (2).

[Chemical formula 3]

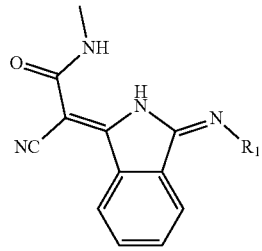

(1)

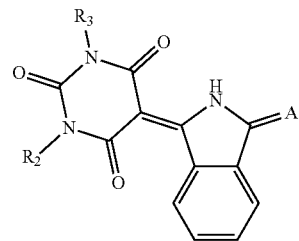

(2)

In formula (1), $R_1$ represents an alkyl group which may be substituted.

In formula (2), $R_2$ and $R_3$ each independently represent a hydrogen atom, or an alkyl group or aryl group which may be substituted.

'A' represents a group represented by formula (3), formula (4), or formula (5) below.

[Chemical formula 4]

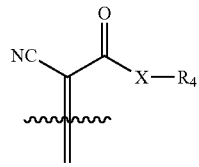

(3)

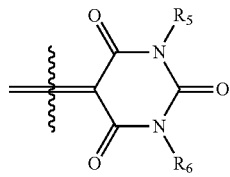

(4)

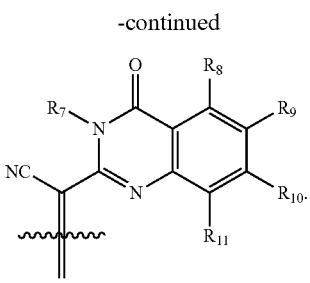

(5)

In formula (3), 'X' represents —O— or —NH—, and $R_4$ represents an alkyl group or aryl group which may be substituted.

In formulas (4) and (5), $R_5$ and $R_6$ each represent a hydrogen atom, or an alkyl group which may be substituted, and $R_7$ represents a hydrogen atom.

In formulas (5), $R_8$ to $R_{11}$ each independently represent: a hydrogen atom; a halogen atom; or an alkyl group, alkoxy group, aryl group, or aryloxy group which may be substituted.

The pigment composition contains the isoindoline compound (1) and the isoindoline compound (2), thereby enabling forming images having excellent weather resistance and heat resistance and having high chroma and the like. In addition, in water-based dispersion, a dispersion having excellent stability over time and dispersibility can be produced.

The reason for this is presumed to be that a hydrogen atom bonded to a nitrogen atom included in the isoindoline compound (1) forms a hydrogen bond with an oxygen atom included in the isoindoline compound (2). It is presumed that hydrogen bonds are suitably formed between molecules as described above, thereby improving weather resistance and heat resistance.

In the case of the isoindoline compound (2) alone, pigment particles become large due to extremely strong hydrogen bonds derived from a barbituric acid structure. However, the inclusion of the isoindoline compound (1) relaxes the excess hydrogen bonds, thereby suppressing crystal growth and suppressing enlargement of pigment particles. Further, when the pigment composition is prepared, the isoindoline compound (1) has weak color development when used alone, but the hue of the isoindoline compound (2) can be maintained, without decreasing, due to intermolecular interaction with the isoindoline compound (2). It is presumed that these factors overlap to form an image having higher chroma and the like.

The reason why a water-based dispersion excellent in stability over time and dispersibility can be produced using the pigment composition is presumed as follows. The isoindoline compound (2) is highly hydrophilic due to a barbituric acid residue, and thus has a higher affinity for water than that of a dispersant and cannot be adsorbed by the dispersant. However, when the isoindoline compound (1) is used together, the hydrophilicity of the isoindoline compound (2) is relaxed and can be adsorbed by the dispersant, thereby forming a water-based dispersion.

In one embodiment, the content of the isoindoline compound (1) relative to 100% by mass of the pigment composition is preferably within a range from 0.01% to 30% by mass, and more preferably from 0.05% to 10% by mass.

In one embodiment, the content of the isoindoline compound (2) relative to 100% by mass of the pigment composition is preferably 70% to 99.99% by mass, and more preferably 90% to 99.95% by mass.

In one embodiment, the content of the isoindoline compound (1) in the total of 100% by mass of the isoindoline compound (1) and the isoindoline compound (2) is preferably within a range from 0.01% to 30% by mass, and more preferably from 0.05% to 10% by mass.

In one embodiment, the mass ratio of the isoindoline compound (1) to the isoindoline compound (2) is preferably (1)/(2)=1/9999 to 3/7, more preferably 1/1999 to 1/4, and even more preferably 1/999 to 1/19.

In one embodiment, the number of carbon atoms of the alkyl group (—R) in $R_1$ in formula (1) above is preferably within a range from 1 to 20, more preferably from 1 to 10, even more preferably from 1 to 4, and an alkyl group with 1 or 2 carbon atoms is even still more preferable.

The alkyl group may have a linear structure, a branched structure, a monocyclic structure, or a fused polycyclic structure.

Examples of the alkyl group include a methyl group, ethyl group, propyl group, butyl group, pentyl group, hexyl group, heptyl group, octyl group, nonyl group, decyl group, dodecyl group, octadecyl group, isopropyl group, isobutyl group, isopentyl group, 2-ethylhexyl group, 2-hexyldodecyl group, sec-butyl group, tert-butyl group, sec-pentyl group, tert-pentyl group, tert-octyl group, neopentyl group, cyclopropyl group, cyclobutyl group, cyclopentyl group, cyclohexyl group, adamantyl group, norbornyl group, boronyl group, and 4-decylcyclohexyl group.

In the above alkyl group, at least one hydrogen atom may be substituted with another substituent such as a halogen atom, hydroxy group, alkoxy group, carboxy group, ester group, sulfo group, sulfanyl group, sulfamoyl group, amino group, alkylamino group, and amide group. Further, there may be multiple substituents, and a substituent may further include a substituent. For example, the substituent such as the above alkylamino group and amide group may further include a substituent described above, such as a hydroxy group. Note that the substituent is not limited to the above.

The above alkyl group may have a structure in which two or more alkyl groups (however, one is an alkylene group) are bonded to each other through a linking group. Specific examples of the linking group include an ester bond (—COO—), ether bond (—O—), and sulfide bond (—S—). That is, in this description, the alkyl group may be a group represented by, for example, "—R'—O—R" (R' represents an atomic group obtained by removing one hydrogen atom from the above alkyl group). A specific example is —$C_2H_4$—O—$C_2H_5$.

In formula (2) above, the carbon number of the alkyl group (—R) in $R_2$ and $R_3$ is the same as that of the alkyl group in $R_1$.

In formula (2), the aryl group (—Ar) in $R_2$ and $R_3$ is an atomic group obtained by removing one hydrogen atom from an aromatic hydrocarbon. The carbon number is preferably within a range from 6 to 30, and more preferably from 6 to 20. Examples of the above aryl group include a phenyl group, tolyl group, biphenylyl group, terphenylyl group, quarterphenylyl group, pentalenyl group, indenyl group, naphthyl group, binaphthalenyl group, ternaphthalenyl group, quarternaphthalenyl group, azulenyl group, heptalenyl group, biphenylenyl group, indacenyl group, fluoranthenyl group, acephenanthrylenyl group, aceanthrylenyl group, phenalenyl group, fluorenyl group, anthryl group, bianthracenyl group, teranthracenyl group, quarteranthracenyl group, anthraquinolyl group, phenanthryl group, triphenylenyl group, pyrenyl group, chrysenyl group, naphthacenyl group, pleiadenyl group, picenyl group, perylenyl group, pentaphenyl group, pentacenyl group, tetraphenylenyl group, hexaphenyl group, hexacenyl group, rubicenyl group, coronenyl group, trinaphthylenyl group, heptaphenyl group, heptacenyl group, pyranthrenyl group, and ovarenyl group. Among them, the phenyl group and the tolyl group are preferable.

In the above aryl group, at least one hydrogen atom may be substituted with another substituent such as a halogen atom, hydroxy group, alkoxy group, carboxy group, ester group, sulfo group, sulfanyl group, sulfamoyl group, amino group, alkylamino group, and amide group. Further, there may be multiple substituents. Note that the substituent is not limited to the above.

In formula (3) above, 'X' represents —O— or —NH—, and is preferably —NH—.

In formula (3) above, the carbon number of the alkyl group (—R) in $R_4$ is the same as that of the alkyl group in $R_1$. In formula (3) above, the aryl group (—Ar) in $R_4$ is the same as those in $R_2$ and $R_3$.

In formula (4) above, the carbon number of the alkyl group (—R) in $R_5$ and $R_6$ is the same as that of the alkyl group in $R_1$.

In formula (5), the halogen atom in $R_8$ to $R_{11}$ is not particularly limited, and examples include a fluorine atom, chlorine atom, bromine atom, and iodine atom.

In formula (5), the carbon number of the alkyl group (—R) in $R_8$ to $R_{11}$ is the same as that of the alkyl group in $R_1$.

In one embodiment, the alkyl group preferably has 1 to 6 carbons, more preferably 1 to 4 carbons, and even more preferably 1 or 2 carbon alkyl groups.

In formula (5), the alkoxy group in $R_8$ to $R_{11}$ is a group (—OR) having an oxygen atom bonded to the above alkyl group (—R).

In formula (5), the aryl group (—Ar) in $R_8$ to $R_{11}$ is the same as the aryl group in $R_2$ and $R_3$.

In formula (5), the aryloxy group in $R_8$ to $R_{11}$ is a group (—OAr) having an oxygen atom bonded to the above aryl group (—Ar). In one embodiment, the aryloxy group is preferably a phenoxy group.

In one embodiment, in formula (5), $R_8$ to $R_{11}$ are each preferably independently selected from the group consisting of a hydrogen atom, an alkyl group having 1 to 6 carbons, fluoroalkyl group having 1 to 6 carbons, alkoxy group (the alkyl group has 1 to 6 carbons), phenyl group, and phenoxy group.

The isoindoline compound (1) and the isoindoline compound (2) may be used alone or in combination of two or more types.

Examples of a production method of a pigment composition including the isoindoline compound (1) and the isoindoline compound (2) include (A) a method for synthesizing two types at once (co-synthesis method), (B) a method for mixing the isoindoline compound (1) and the isoindoline compound (2) during the production of a dispersion, (C) a method for converting the isoindoline compound (1) and the isoindoline compound (2) together into a pigment using an acid pasting method, acid slurry method, dry milling method, salt milling method, solvent salt milling method, or solvent method (heat treatment in a high-boiling point solvent such as an alcohol or an aromatic solvent); or a method for obtaining the pigment composition using a combination of (A) to (C).

Among these, it is preferable to produce the pigment composition by using the following: (A) co-synthesis method; (C) method for converting the isoindoline compound (1) and the isoindoline compound (2) together into a pigment using an acid pasting method or solvent salt milling method; or a method using a combination of (A) and (C).

[Method for Producing Isoindoline Compound (1)]

The isoindoline compound (1) can be synthesized using a known synthetic method. For example, as shown in scheme 1 below, phthalonitrile (hereinafter referred to as a compound (6)) represented by formula (6), or 1,3-diiminoisoindoline (hereinafter referred to as a compound (7)) represented by formula (7) can be used as a starting material for producing the isoindoline compound (1).

Hereinafter, the synthetic method will be described with reference to a specific example of the isoindoline compound (1). In the following description, the number in each formula will be described as the number of a compound.

The isoindoline compound (1) can be produced according to scheme 1 below.

(Scheme 1)

[Chemical formula 5]

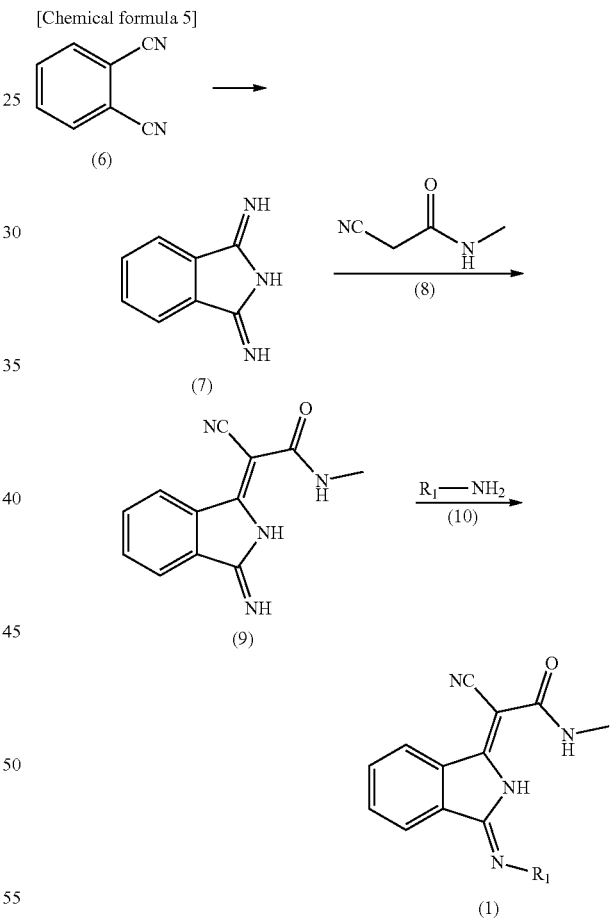

Scheme 1 may include a first step (S1) of obtaining a compound (7) by reacting a compound (6) with a base in a solvent, a second step (S2) of then reacting the compound (7) with a compound (8) in the presence of water, and a third step (S3) of then reacting a compound (9) with a compound (10) in the presence of water. The reaction temperature at each step in Scheme 1 is preferably within a range from about 10 to 100° C.

Examples of the solvent used in the first step include: an alcohol such as methanol, ethanol, isopropanol, butanol, and glycol; ether such as glycol ether and tetrahydrofuran; and an acyclic or cyclic amide such as formamide, dimethylformamide, dimethylacetamide, and N-methylpyrrolidone. Among these, an acyclic or cyclic amide is preferable, and tetrahydrofuran and formamide are more preferable.

The solvent may be used alone or in combination of two or more types. The amount of the solvent used is, relative to the amount of 100 parts by mass of the compound (6), preferably within a range from 5 to 15 times, and more preferably from 5 to 10 times.

Examples of the base include an alkali metal hydroxide, an alkali metal such as lithium, sodium, and potassium, an alkali metal carbonate, an alkali metal amide, alkali metal hydride; and an alkali metal or alkali earth metal alkoxide derived from a primary, secondary, or tertiary aliphatic alcohol having an alkyl chain or alkylene chain with 1 to 10 carbon atoms. Among these, sodium hydroxide or potassium carbonate is preferable.

As another synthetic method, the isoindoline compound (1) can be produced, for example, according to scheme 2 below.

(Scheme 2)

[Chemical formula 6]

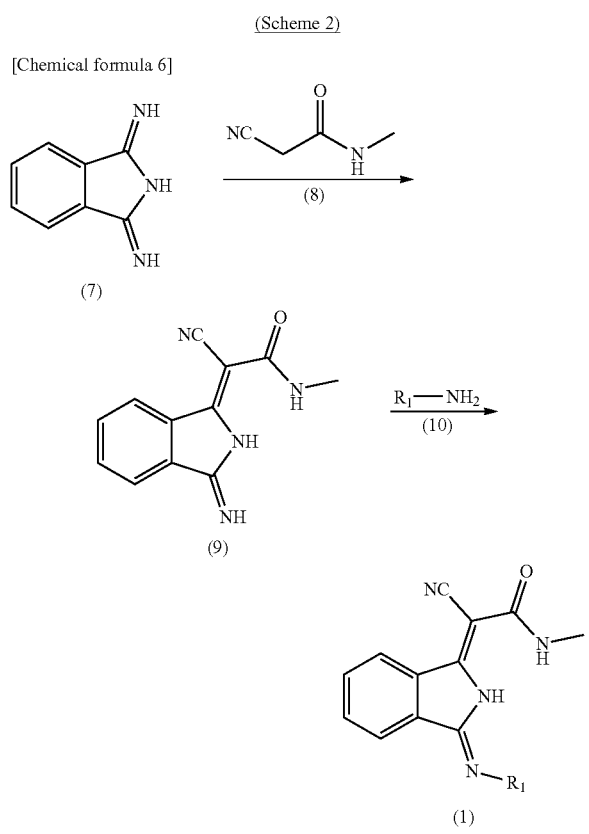

Scheme 2 may include a second step (S2) of reacting a compound (7) with a compound (8) in the presence of an aqueous ammonia solution; and a third step (S3) of then reacting a compound (9) with a compound (10) in the presence of water.

In the second step (S2) of scheme 2, the amount of the aqueous ammonia solution used is preferably, relative to the amount of 100 parts by mass of the compound (7), within a range from 1 to 20 times and more preferably from 1 to 5 times, when a 28% aqueous ammonia solution is used.

In addition, scheme 2 may include a step of continuously reacting the compound (7) with the compound (8) and the compound (9) with the compound (10) in the presence of water.

In any case, the reaction temperature at each step in scheme 2 is preferably within a range from about 10 to 100° C.

[Method for Producing Isoindoline Compound (2)]

The isoindoline compound (2) can be synthesized using a known method. Examples include methods described in JP55-157657A, JP56-081369A, JP57-035565A, JP03-153761A, JP54-091532A, and JP60-058469A.

It is preferable that the isoindoline compound (1) and the isoindoline compound (2) be used after being processed into fine particles through a micronization treatment, either individually or together, and it is more preferable that they be subjected to a micronization treatment together. Examples of the micronization treatment include a dissolution deposition method represented by acid pasting, solvent salt milling, and dry milling. The pigment particle diameter after micronization is preferably within a range from 20 to 300 nm and more preferably from 50 to 150 nm, as the average primary particle diameter. Depending on the conditions of the solvent salt milling, the particle size of the pigment particles may grow.

A method for producing a pigment composition including an isoindoline compound (1) and an isoindoline compound (2) is exemplified below.

(A) a method for synthesizing two or more types at once (co-synthesis method), (B) a method for mixing the isoindoline compound (1) and the isoindoline compound (2) during the production of a dispersion, (C) a method for converting the isoindoline compound (1) and the isoindoline compound (2) together into a pigment using an acid pasting method, acid slurry method, dry milling method, salt milling method, solvent salt milling method, solvent method (heat treatment in a high-boiling point solvent such as an alcohol or an aromatic solvent), or the like, and (D) a method using a combination of the above methods (A) to (C).

Thereamong, it is preferable to use: (A) a co-synthesis method; (C) a method for pigmenting the isoindoline compound (1) and the isoindoline compound (2) together using an acid pasting method or a solvent salt milling method; or (D) a method using a combination of (A) and (C).

Micronization using acid pasting causes a pigment to be dissolved in concentrated sulfuric acid, and by mixing it with a large excess of water, fine pigment particles are precipitated. Thereafter, filtration and washing with water are repeated, and drying is performed to obtain micronized pigment particles.

An example of the acid pasting is a method in which the pigment is dissolved in 98% sulfuric acid which is 5 to 30 times by mass of the pigment, and the obtained sulfuric acid solution is mixed with water which is 5 to 30 times by mass of the obtained sulfuric acid solution. The temperature at which the pigment is dissolved in sulfuric acid is sufficient as long as reactions such as decomposition and sulfonation of the raw materials do not occur. The above temperature at which the pigment is dissolved is preferably within a range from 3 to 40° C., for example. There are no particular limitations on the method for mixing the sulfuric acid solution of the pigment with water and on conditions such as a mixing temperature. In many cases, when mixing is performed at a lower temperature than at a higher temperature, the precipitated pigment particles tend to be minute. Thus, the temperature at the time of mixing above is preferably within a range from 0 to 60° C., for example. The water used at the time of mixing is sufficient as long as it is industrially usable. However, from the viewpoint of reducing the temperature rise during precipitation, pre-cooled water is preferable.

The method for mixing the sulfuric acid solution with water is not particularly limited, and any method may be used as long as the pigment is completely precipitated. For example, pigment particles can be precipitated using a method for pouring a sulfuric acid solution into ice water prepared in advance, a method for continuously pouring a pigment into flowing water using a device such as an aspirator, and the like.

The slurry obtained using a method described above is filtered and washed to remove the acidic component, and then dried and ground to obtain a pigment adjusted to have a desired particle size. When the slurry is filtered, the slurry which is a mixture of the sulfuric acid solution and water may be filtered as it is. When the slurry has poor filterability, the slurry may be heated and stirred before filtering. The slurry may be neutralized with a base and then filtered.

In micronization using solvent salt milling, a clay-like mixture including at least three components of a pigment, a water-soluble inorganic salt, and a water-soluble solvent is strongly kneaded using a kneader or the like. The kneaded mixture is put in water and stirred with various stirrers to form a slurry. The obtained slurry is filtered to remove the water-soluble inorganic salt and water-soluble solvent. The above-described slurrying, filtering, and washing with water are repeated to obtain a micronized pigment.

Examples of the water-soluble inorganic salt used include sodium chloride, sodium sulfate, and potassium chloride. Such an inorganic salt is used within a range from one time or more by mass of the pigment to preferably 20 times or less by mass of the pigment. When the amount of the inorganic salt is one time or more by mass, the pigment can be sufficiently micronized. When the amount of the inorganic salt is 20 times or less by mass, a great deal of effort is unnecessary to remove the water-soluble inorganic salt and water-soluble solvent after kneading. In addition, it is preferable from the viewpoint of productivity since the amount of the pigment which can be processed at one time is not reduced. Note that sodium chloride used industrially is sometimes produced from a natural product such as seawater. Thus, the sodium chloride used may include impurities of about 0.01% to 30% by mass, such as potassium chloride, calcium chloride, magnesium chloride, calcium sulfate, and magnesium sulfate.

The micronization of the pigment often generates heat with kneading. Thus, from the viewpoint of safety, it is preferable to use a water-soluble solvent having a boiling point of about 120 to 250° C. Specific examples of the water-soluble solvent include 2-(methoxymethoxy)ethanol, 2-butoxyethanol, 2-(isopentyloxy)ethanol, 2-(hexyloxy)ethanol, ethylene glycol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, 2-ethyl-1,3-hexanediol, diacetin, triacetin, and low-molecular weight polypropylene glycol.

The micronization using dry milling can be performed by dry grinding the pigment using various grinders. In this method, grinding proceeds through collision or friction between grinding media. The device used to perform dry milling is not particularly limited. Specific examples include ball mills, attritors, and vibration mills, which are dry milling devices with built-in grinding media such as beads. When dry grinding is performed using these devices, the interior of the grinding container may be depressurized and filled with an inert gas such as nitrogen gas, as necessary. After dry milling, the above solvent salt milling, stirring treatment in a solvent, and the like may be performed.

[Colorant Derivative]

The pigment composition may contain a colorant derivative.

The colorant derivative is a known compound having an acidic group, a basic group, a neutral group, or the like in an organic dye residue. Examples of the colorant derivative include: compounds having an acidic substituent such as a sulfo group, carboxy group, and phosphate group, and amine salts thereof; compounds having a basic substituent such as a sulfonamide group, and a tertiary amino group at a terminal; and compounds having a neutral substituent such as a phenyl group and a phthalimide alkyl group.

Examples of the organic pigment include diketopyrrolopyrrole-based pigments, anthraquinone-based pigments, quinacridone-based pigments, dioxazine-based pigments, perinone-based pigments, perylene-based pigments, thiazine indigo-based pigments, triazine-based pigments, benzimidazolone-based pigments, indole-based pigments such as benzoisoindole, isoindoline-based pigments, isoindolinone-based pigments, quinophthalone-based pigments, naphthol-based pigments, surene-based pigments, metal complex-based pigments, azo-based pigments such as azo, disazo, and polyazo.

Specific examples include known colorant derivatives described: as diketopyrrolopyrrole-based colorant derivatives, in JP2001-220520A, WO2009/081930, WO2011/052617, WO2012/102399, and JP2017-156397A;
  as phthalocyanine-based colorant derivatives, in JP2007-226161A, WO2016/163351, JP2017-165820A, and Japanese Patent No. 5753266;
  as anthraquinone-based colorant derivatives, in JP63-264674A, JP09-272812A, JP10-245501A, JP10-265697A, JP2007-079094A, and WO2009/025325; as quinacridone-based colorant derivatives, in JP48-54128A, JP03-9961A, and JP2000-273383;
  as dioxazine-based colorant derivatives, in JP2011-162662A;
  as thiazine indigo-based colorant derivatives, in JP2007-314785A;
  as triazine-based colorant derivatives, in JP61-246261A, JP11-199796A, JP2003-165922A, JP2003-168208A, JP2004-217842A, and JP2007-314681A;
  as benzoisoindole-based colorant derivatives, in JP2009-57478A;
  as quinophthalone-based colorant derivatives, in JP2003-167112A, JP2006-291194A, JP2008-31281A, and JP2012-226110A;
  as naphthol-based colorant derivatives, in JP2012-208329A and JP2014-5439A;
  as azo-based colorant derivatives, in 2001-172520A and 2012-172092A;
  as acidic substituents, in JP2004-307854A; and
  as basic substituents, in JP2002-201377A, JP2003-171594A, JP2005-181383A, and JP2005-213404A.

Note that in these publications, a colorant derivative may be described as a derivative, pigment derivative, dispersant, pigment dispersant, or simply a compound, but a compound having a substituent such as an acidic group, a basic group, or a neutral group in the organic dye residue described above is synonymous with a colorant derivative.

The colorant derivative may be used alone or in combination of two or more types.

<11> Colorant Composition

A colorant composition according to one embodiment of the present invention preferably includes the above pigment composition and a dispersion medium.

[Dispersion Medium]

Examples of the dispersion medium include resins and solvents. Resins include a resin-type dispersant and a binder resin. Solvents include water and an organic solvent. Note that a low-molecular dispersant such as a surfactant can be used as necessary.

Examples of the resin-type dispersants include: JONCRYL67, JONCRYL678, JONCRYL586, JONCRYL611, JONCRYL683, JONCRYL690, JONCRYL57J, JONCRYL60J, JONCRYL61J, JONCRYL62J, JONCRYL63J, JONCRYLHPD-96J, JONCRYL501 J, and JONCRYLPDX-6102B, manufactured by BASF Japan Ltd.;
 DISPERBYK180, DISPERBYK187, DISPERBYK190, DISPERBYK191, DISPERBYK194, DISPERBYK2010, DISPERBYK2015, DISPERBYK2090, DTSPERBYK2091, DISPERBYK2095, and DISPERBYK2155, manufactured by BYK Chemie Japan KK;
 SOLSPERSE24000, SOLSPERSE32000, SOLSPERSE39000, and SOLSPERSE41000, manufactured by The Lubrizol Corporation; and
 SMA1000H, SMA1440H, SMA2000H, SMA3000H, and SMA17352H, manufactured by Sartomer Co., Ltd.

Examples of the binder resin include a polyolefin resin, a polyester resin, a styrene copolymer, an acrylic resin, and a modified resin thereof. Specific examples include: a polyolefin resin including polyethylene such as high-density polyethylene (HDPE), linear low-density polyethylene (L-LDPE), and low-density polyethylene (LDPE), and polypropylene; a polyester resin such as polyethylene terephthalate; a styrene copolymer such as a styrene-p-chlorstyrene copolymer, styrene-vinyltoluene copolymer, styrene-vinylnaphthalene copolymer, styrene-acrylic acid ester copolymer, styrene-methacrylic acid ester copolymer, styrene-methyl α-chlormethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, and styrene-acrylonitrile-indene copolymer; an acrylic resin such as an acrylic resin and methacrylic resin; polyvinyl chloride, phenolic resin, naturally modified phenolic resin, naturally modified maleic acid resin, polyvinyl acetate, silicone resin, polyurethane resin, ethylene-vinyl acetate copolymer resin, vinyl acetate resin, nitrocellulose resin, polyamide resin, epoxy resin, xylene resin, polyvinyl butyral resin, polyvinyl acetal resin, cellulose ester resin, alkyd resin, rosine-based resin, ketone resin, cyclized rubber, chlorinated polyolefin resin, terpene resin, coumarinindene resin, alkyd resin, amino resin, petroleum resin, and modified resins of these.

Organic solvents can be classified into water-soluble solvents and water-insoluble solvents.

Examples of water-soluble solvents include ethanol, n-propanol, isopropanol, isobutanol, ethylene glycol, diethylene glycol, triethylene glycol, propylene glycol, and glycerin. Examples of water-insoluble solvents include toluene, xylene, butyl acetate, methyl acetate, methyl ethyl ketone, methyl isobutyl ketone, butyl alcohol, and aliphatic hydrocarbons.

Each material making up the colorant composition can be used alone or in combination of two or more types.

(Water-Based Colorant Composition)

In one embodiment of the present invention, the colorant composition is preferably used as a water-based colorant composition.

The water-based colorant composition preferably includes a pigment composition, a resin as a dispersion medium, water, and a water-soluble solvent.

The resin used as the dispersion medium is preferably a resin-type dispersant. Examples of the type of resin include a styrene-(meth)acrylic acid copolymer, (meth)acrylic acid-(meth)acrylic acid-(meth)acrylic ester copolymer, styrene-(meth)acrylic acid-(meth)acrylic acid alkyl ester copolymer, styrene-α-methylstyrene-(meth)acrylic acid copolymer, styrene-α-methylstyrene-(meth)acrylic acid-(meth)acrylic acid alkyl ester copolymer, poly(meth)acrylic acid, vinylnaphthalene-(meth)acrylic acid copolymer, styrene-maleic acid copolymer, maleic acid-maleic anhydride copolymer, a olefin-(anhydrous)maleic acid copolymer, a olefin-(anhydrous)maleic acid-polyalkylene glycol allyl ether copolymer, vinylnaphthalene-maleic acid copolymer, and polyester-modified (meth)acrylic acid polymer, and salts of these.

The form of the resin includes a water-soluble resin, an emulsion (water-insoluble resin), and the like.

Ion exchanged water and distilled water are preferable as water

Examples of the water-soluble solvent include 2-(methoxymethoxy)ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and liquid polypropylene glycol.

The water-based colorant composition can contain a surfactant. Examples of the surfactant include an anionic surfactant, a nonionic surfactant, and the like.

Examples of the anionic surfactant include fatty acid salts, alkyl sulfate ester salts, alkylaryl sulfonate, alkylnaphthalene sulfonates, dialkyl sulfonates, dialkyl sulfosuccinates, alkyl diaryl ether disulfonates, alkyl phosphates, polyoxyethylene alkyl ether sulfates, polyoxyethylene alkylaryl ether sulfates, naphthalene sulfonic acid formalin condensates, and polyoxyethylene alkyl phosphate ester salts.

Examples of the nonionic surfactant include polyoxyethylene alkyl ether, polyoxyethylene alkyl aryl ether, polyoxyethylene polyoxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid ester polyoxyethylene alkylamines, glycerol borate fatty acid esters, and polyoxyethylene glycerol fatty acid esters.

The surfactant content is, relative to 100% by mass of the water-based colorant composition, preferably within a range from 0.3% to 20% by mass and more preferably from 1% to 10% by mass.

The surfactant content is, relative to 100 parts by mass of the pigment composition, preferably within a range from 5 to 200 parts by mass and more preferably from 25 to 100 parts by mass.

The water-based colorant composition can contain other additives. Other additives include a preservative, a pH adjuster, an anti-foaming agent, and a wetting agent.

Examples of the preservative include sodium dehydroacetate, sodium benzoate, sodium pyridine thione-1-oxide, zinc pyridine thione-1-oxide, 1,2-benzisothiazoline-3-one, amine salts of 1-benzisothiazoline-3-one and the like.

The content of the preservative is preferably within a range from 0.1% to 2% by mass relative to 100% by mass of the water-based colorant composition.

Examples of the pH adjuster include various amines, inorganic bases, ammonia, and various buffer solutions.

The anti-foaming agent can be used to prevent the generation of bubbles in the production of the water-based colorant composition. Examples of commercially available anti-foaming agents include Surfynol 104E, Surfynol 104H, Surfynol 104A, Surfynol 104BC, Surfynol 104DPM, Surfynol 104PA, Surfynol 104PG-50, Surfynol 420, Surfynol 440, Surfynol 465, Surfynol 485, and Surfynol PSA-336 (all manufactured by Nissin Chemical Industry Co., Ltd.). In addition, there are also mentioned ADDITOL VXW6211, ADDITOL VXW4973, ADDITOL VXW6235, ADDITOL XW375, ADDITOL XW376, ADDITOL VXW6381, ADDITOL VXW6386, ADDITOL VXW6392, ADDITOL VXW6393, ADDITOL VXW6399, and ADDITOL XW6544 (all manufactured by Allnex Japan Inc.).

The wetting agent can be used to obtain a smooth film during printing or coating. Examples of commercially available wetting agents include ADDITOL VXL6237N, ADDITOL XL260N, ADDITOL VXL6212, ADDITOL UVX7301/65, ADDITOL XW330, ADDITOL VXW6200, ADDITOL VXW6205, ADDITOL VXW6394, ADDITOL VXW6208, ADDITOL VXW6208/60, and ADDITOL VXW6374 (all manufactured by Allnex Japan Inc.).

Each of the materials used in the production of the water-based colorant composition can be used alone or in combination of two or more types.

The water-based colorant composition can be produced through dispersion treatment of materials such as a pigment composition, a resin, water, and another additive used as necessary.

Examples of the dispersion device used for the dispersion treatment include a horizontal sand mill, vertical sand mill, annular bead mill, attritor, microfluidizer, high speed mixer, homomixer, homogenizer, high pressure homogenizer, ball mill, paint shaker, roll mill, millstone mill, ultrasonic dispersion device, counter collision-type high pressure dispersion device, and oblique collision-type high pressure dispersion device.

More specifically, when a resin-type dispersant which is a water-soluble resin is used as the above resin, a method described in the following embodiment can be applied. That is, the water-based colorant composition according to the present invention can be obtained by mixing the pigment composition, the resin-type dispersant, water, and the like, and then performing dispersion treatment using the above dispersion device.

When a resin-type dispersant which is a water-insoluble resin is used as the above resin, for example, the resin-type dispersant is dissolved in an organic solvent capable of dissolving the water-insoluble resin and then is mixed with the pigment composition, and the dispersion treatment is performed using the above dispersion device. Then, a water-based colorant composition is obtained by using a method for performing phase inversion emulsification using water and then distilling off the organic solvent.

In contrast, since the dispersibility and dispersion stability of the pigment composition in the water-based colorant composition can be particularly enhanced, it is preferable to crosslink the resin-type dispersant on the surface of the pigment composition. In an aqueous inkjet ink using such a pigment composition in which the resin-type dispersant present on the surface is crosslinked (hereinafter also referred to as "pigment composition-containing crosslinked resin particles"), excellent redispersibility can be obtained. That is, by adding water after the aqueous inkjet ink dries, and aggregates and thickens, the pigment composition in the aqueous inkjet ink can be dispersed again. Thus, for example, nozzle clogging and "blur" can be suppressed during continuous printing. By coating the pigment composition with a crosslinked resin-type dispersant, the improvement of weather resistance and pH resistance can also be achieved.

Examples of the production method of the water-based colorant composition which includes pigment composition-containing crosslinked resin particles include the following four methods.

[[Method (i)]]

A method for producing pigment composition-containing crosslinked resin particles includes the following four steps.

Step (i-1): a step of performing dispersion treatment using: a pigment composition; a resin-type dispersant having a crosslinkable functional group and a carboxy group in which the carboxy group is made hydrophilic through neutralization with a basic compound; and water Step (i-2): a step of depositing and fixing the resin-type dispersant on the surface of the pigment composition by adding an acidic compound to the dispersion of the pigment composition produced in step (i-1) and neutralizing or acidifying the pH of the dispersion Step (i-3): a step of, after the above step (i-2), neutralizing the carboxy group in the resin-type dispersant using a basic compound (the basic compound may be the same or different from the basic compound used in step (i-1)), and redispersing in water the pigment composition to which the resin-type dispersant is fixed Step (i-4): a step of, after the above step (i-3), reacting the crosslinkable functional group in the resin-type dispersant with a crosslinker to crosslink to obtain a water-based colorant composition which includes pigment composition-containing crosslinked resin particles. Note that the crosslinker may be added at the beginning of step (i-4) or may be added at any step of steps (i-1) to (i-3).

[[Method (ii)]]

As the resin-type dispersant, a resin-type dispersant is used which has a self-crosslinkable functional group and a carboxy group in which carboxy group is made hydrophilic through neutralization with a basic compound. Other than this, the pigment composition fixed with the resin-type dispersant is redispersed in water in the same manner as steps (i-1) to (i-3) described above. Then, the resin-type dispersant is self-crosslinked to obtain a water-based colorant composition which includes pigment composition-containing crosslinked resin particles.

[[Method (iii)]]

A method for producing pigment composition-containing crosslinked resin particles includes the following two steps.

Step (iii-1): a step of mixing a pigment, a resin having a carboxy group, a basic compound, and water Step (iii-2): a step of, after the above step (iii-1), obtaining a water-based colorant composition which includes pigment composition-containing crosslinked resin particles by adding a crosslinking agent and performing crosslinking treatment

[[Method (iv)]]

A method for producing pigment composition-containing crosslinked resin particles includes the following three steps.

Step (iv-1): a step of mixing a pigment, a resin having a carboxy group, and an organic solvent Step (iv-2): a step of, after the above step (iv-1), adding water and removing the organic solvent through vacuum distillation or the like Step (iv-3): a step of, after the above step (iv-2), obtaining a water-based colorant composition which includes pigment composition-containing crosslinked resin particles by adding a crosslinking agent and performing crosslinking treatment.

The dispersion stability of the isoindoline compound (1) and the isoindoline compound (2) is improved by performing heat treatment or post-treatment relative to the water-based colorant composition obtained using the above-described methods. In the heat treatment, the water-based colorant composition is heated to 30 to 80° C. and held over a period of several hours to a week. In the post-treatment, the water-based colorant composition is subjected to dispersion treatment using an ultrasonic dispersion device, or a collision-type beadless dispersion device, a high-speed mixer, a homogenizer, a high-pressure homogenizer, a silverson mixer, a planetary mixer, a trimix, a kneader, an extruder, a horizontal sand mill, a vertical sand mill, or/and an annular-type bead mill, a paint shaker, a ball mill, a high-pressure dispersion device, a counter collision-type dispersion device, an oblique collision-type dispersion device or the like.

Note that before the dispersion treatment, pre-dispersion treatment can be performed without using water and a water-soluble solvent. Examples of the device used for the pre-dispersion treatment include: a kneading mixer such as a kneader and a three-roll mill; a non-volatile dispersion device such as a two-roll mill; and a media-less dispersion device such as an MK mixer.

Examples of aspects of the colorant composition according to the present embodiment include aspect 1 including a pigment composition and a resin (for example, a solvent free-based colorant composition), aspect 2 including a pigment composition and an organic solvent (for example, a solvent-based colorant composition), and aspect 3 including a pigment composition, a resin, and water (for example, a water-based colorant composition) described in detail in the upper part.

To describe the uses of each aspect, examples of the aspect 1 include a composition for molding, a toner, a solvent-free-based (active energy ray-curable) printing ink, and a solvent-free-based inkjet ink. The aspect 2 is a solvent-based colorant composition, and examples thereof include a coating material, a printing ink, and an inkjet ink. The aspect 3 is a water-based colorant composition, and examples thereof includes an aqueous coating material, an aqueous printing ink, and an aqueous inkjet ink. In this specification, when a solvent contains water, it is described as "aqueous", but when a solvent is an "organic solvent", it is not particularly described as "solvent-based". Note that water is preferably ion exchanged water in which metal ions are removed, or distilled water.

<III> Composition for Molding

A composition for molding according to one embodiment of the present invention contains a colorant composition (pigment composition and resin).

The composition for molding preferably includes a thermoplastic resin as a resin. The composition for molding which includes the thermoplastic resin is preferably used to be melt-kneaded and molded into a desired shape to produce a molded body. The composition for molding includes the isoindoline compound (1) and the isoindoline compound (2) having high heat resistance and thus color change can be suppressed when melt-kneading is performed at 300° C., for example. Note that the resin is not limited to a thermoplastic resin.

Examples of the thermoplastic resin include a homopolymer or a copolymer using ethylene, propylene, butylene, styrene, or the like as a monomer component. More specific examples include polyolefin resins such as polyethylene including high-density polyethylene (HDPE), linear low-density polyethylene (L-LDPE), and low-density polyethylene (LDPE), polypropylene, and polybutylene. Specific examples of other useful resins include polyester resins such as polyethylene terephthalate, polyamide resins such as nylon 6 and nylon 66, polystyrene resins, and thermoplastic ionomer resins. Among these, polyolefin resins and polyester resins are preferable. Note that the number average molecular weight of the thermoplastic resin is preferably within a range from more than 30,000 and 200,000 or less.

The content of the thermoplastic resin is, relative to the total of 100 parts by mass of the isoindoline compound (1) and the isoindoline compound (2), preferably within a range from 10,000 to 10,000,000 parts by mass, and more preferably from 10,000 to 2,000,000 parts by mass.

The composition for molding can contain wax. The wax includes low-molecular weight polyolefins. These are polymers of olefin monomers such as ethylene, propylene, butylene, and may be blocks, random copolymers, or terpolymers. Specifically, they are polymers of α-olefins such as low-density polyethylene (LDPE), high-density polyethylene (HDPE), and polypropylene (PP).

The number average molecular weight of the wax is preferably within a range from 1,000 to 30,000 and more preferably from 2,000 to 25,000. Setting within these ranges allows the wax to suitably transfer to the surface of the molded body, thereby achieving an excellent balance between slidability and bleed-out control.

The melting point of the wax is preferably within a range from 60 to 150° C. and more preferably from 70 to 140° C. Setting the melting point within these ranges improves the processability during melt-kneading of the thermoplastic resin and the wax.

Note that the melt flow rate (MFR), obtained in accordance with JIS K-7210, of the wax is preferably larger than 100 g/10 minutes.

The blending amount of the wax is preferably within a range from 0.1 to 10 parts by mass relative to 100 parts by mass of the thermoplastic resin.

The composition for molding can contain other additives. The other additives may be materials commonly used in the art of molded bodies. Examples include antioxidants, light stabilizers, dispersants, metal soaps, anti-static agents, flame retardants, lubricants, fillers, and colorants other than the isoindoline compound (1) and the isoindoline compound (2).

The composition for molding can be produced, for example, with the composition ratio of the molded body. Another example of the composition for molding can be produced as a masterbatch containing high concentrations of the isoindoline compound (1) and the isoindoline compound (2). In one embodiment, a masterbatch is preferable from the viewpoint that the isoindoline compound (1) and the isoindoline compound (2) are easily dispersed uniformly in the molded body.

As the masterbatch, it is preferable to melt-knead a thermoplastic resin and a pigment composition and then form it into an optional shape for easy use in the next step, for example. The masterbatch and a diluted resin (for example, the thermoplastic used in the masterbatch) are then melt-kneaded to form a molded body of a desired shape. Examples of the shape of the masterbatch include pellets, powders, and plates. Note that in order to prevent aggregation of the pigment composition, it is preferable to produce a dispersion obtained by melt-kneading the pigment composition and wax in advance, and then melt-kneading the mixture with a thermoplastic resin to produce a masterbatch. The device used for the dispersion is preferably a blend mixer or a three-roll mill, for example.

When the forming resin composition is produced as a masterbatch, preferably, a total of 1 to 200 parts by mass, and more preferably, 5 to 100 parts by mass, of the isoindoline compound (1) and the isoindoline compound (2) is blended with respect to 100 parts by mass of the thermoplastic resin. The mass ratio of a masterbatch (X) to a diluted resin (Y) which serves as a base resin of a molded body is preferably X/Y=1/1 to 1/100, and more preferably 1/3 to 2/100. In these ranges, the isoindoline compound (1) and the isoindoline compound (2) are easily dispersed uniformly in the molded body, and good coloring is easily obtained.

For the diluted resin (Y), a thermoplastic resin used in the masterbatch is preferably used. Other thermoplastic resins may be used as long as there is no issue with compatibility.

For melt-kneading, a single-screw kneading extruder, a twin-screw kneading extruder, a tandem twin-screw kneading extruder, or the like may be used, for example. The melt-kneading temperature varies depending on the type of thermoplastic resin, but is usually within a range from about 150 to 300° C.

Examples of applications of the composition for molding include plastic molded bodies, sheets, and films.

<IV> Toner

A toner according to one embodiment of the present invention contains a colorant composition (pigment composition and resin).

The resin used for the toner is called a binder resin and is preferably a thermoplastic resin. The toner includes dry toner and wet toner, and dry toner is preferable. For example, for the dry toner, a pigment composition and a binder resin are melt-kneaded, cooled, and then subjected to pulverization and classification steps. Next, a post-treatment step of blending and mixing an additive is performed, and the production ends.

Examples of the binder resin include a styrene-p-chlorstyrene copolymer, styrene-vinyltoluene copolymer, styrene-vinylnaphthalene copolymer, styrene-(meth)acrylic acid ester copolymer, styrene-α-methyl chlormethacrylic acid copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-acrylonitrile-indene copolymer, polyvinyl chloride, phenolic resin, naturally modified phenolic resin, naturally modified maleic acid resin, (meth)acrylic resin, polyvinyl acetate, silicone resin, polyester resin, polyurethane, polyamide resin, furan resin, epoxy resin, xylene resin, polyvinyl butyral, terpene resin, coumarinindene resin, and petroleum-based resin.

Among these, a polyester resin and a styrene-based copolymer are preferable, and a polyester resin is more preferable. Since the pigment composition of the present embodiment is particularly excellent in compatibility with the polyester resin, the isoindoline compound (1) and the isoindoline compound (2) are uniformly and finely dispersed in a toner, and thus a high-quality toner can be obtained.

The weight average molecular weight (Mw) of the polyester resin is preferably 5,000 or more, more preferably within a range from 10,000 to 1,000,000, and even more preferably from 20,000 to 100,000. When a polyester resin of a suitable Mw is used, a toner having good offset resistance and low temperature fixability can be obtained.

The acid value of the polyester resin is preferably within a range from 10 to 60 mgKOH/g and more preferably from 15 to 55 mgKOH/g. When a polyester resin having a suitable acid value is used, the release of a release agent is easily suppressed and the image density in a high humidity environment is hardly reduced.

The hydroxyl value of the polyester resin is preferably 20 mgKOH/g or less, and more preferably 15 mgKOH/g or less. When a polyester resin of a suitable hydroxyl value is used, the image density hardly decreases in a high humidity environment. Note that the lower limit of the hydroxyl value is 0.1 mgKOH/g.

The glass transition temperature (Tg) of the polyester resin is preferably within a range from 50 to 70° C., and more preferably from 50 to 65° C. The aggregation of a toner can be suppressed with a suitable Tg. Note that Tg can be measured using a differential scanning calorimeter (device: DSC-6, manufactured by Shimadzu Corporation).

The toner can further contain a charge control agent. When a charge control agent is used, a toner having a stable charge amount can be easily obtained. For the charge control agent, a positive or negative charge control agent can be used through appropriate selection.

When the toner is a positively charged toner, a positive charge control agent is used. Examples of the positive charge control agent include a nigrosine-based dye, triphenylmethane-based dye, organic tin oxide, quaternary ammonium salt compound, and styrene-acrylic based polymer in which a quaternary ammonium salt is copolymerized as a functional group to a styrene-acrylic resin. Among these, a quaternary ammonium salt compound is preferable. An example of the quaternary ammonium salt compound is a salt-forming compound of a quaternary ammonium salt, and an organic sulfonic acid or molybdic acid. The organic sulfonic acid is preferably a naphthalene sulfonic acid.

When the toner is a negatively charged toner, a negative charge control agent is used. Examples of the negative charge control agent include a metal complex of a monoazo dye, styrene-acrylic based polymer in which a sulfonic acid is copolymerized as a functional group to a styrene-acrylic resin, metal salt compound of an aromatic hydroxycarboxylic acid, metal complex of an aromatic hydroxycarboxylic acid, phenol-based condensate, and phosphonium-based compound. As the aromatic hydroxycarboxylic acid, salicylic acid, 3,5-di-tert-butyl salicylic acid, 3-hydroxy-2-naphthoic acid, and 3-phenyl salicylic acid are preferable. The metal used for the metal salt compound includes zinc, calcium, magnesium, chromium, and aluminum.

The toner can contain a release agent. Examples of the release agent include hydrocarbon-based waxes such as a polypropylene wax, polyethylene wax, and Fisher-Tropsch wax, synthetic ester waxes, and natural ester-based waxes such as a carnava wax and rice wax.

The toner may contain, as necessary, a lubricant, a fluidizing agent, an abrasive, a conductivity imparting agent, an image anti-peeling agent, and the like.

Examples of the lubricant include polyvinylidene fluoride and zinc stearate. Examples of the fluidizing agent include silica produced using a dry method or a wet method, aluminum oxide, titanium oxide, silicon aluminum co-oxide, and silicon titanium co-oxide, and hydrophobized products thereof. Among these, hydrophobized silica, silicon aluminum co-oxide, and silicon titanium co-oxide fine powder are preferable. A method for hydrophobizing these fine powders includes treatment with silicon oil or a silane coupling agent such as tetramethyldisilazane, dimethyldichlorosilane, or dimethyldimethoxysilane.

Examples of the abrasive include silicon nitride, cerium oxide, silicon carbide, strontium titanate, tungsten carbide, calcium carbonate, and those obtained by hydrophobizing these abrasives. An example of the conductivity imparting agent is tin oxide.

In the present embodiment, the toner can be used as a one-component developer or a two-component developer. The two-component developer can further contain a carrier.

Examples of the carrier include a magnetic powder such as iron powder, ferrite powder, and nickel powder, and coated products in which surfaces of these carriers are coated with a resin or the like. Examples of the resin for coating the carrier surfaces include a styrene-(meth)acrylic acid ester copolymer, (meth)acrylic acid ester copolymer, fluorine-containing resin, silicone-containing resin, polyamide resin, ionomer resin, and polyphenylene sulfide resin. Among these, a silicone-containing resin having less spent toner formation is preferable. The weight average particle size of the carrier is preferably within a range from 30 to 100 μm.

The mixing ratio (mass ratio) of the toner and the carrier in the two-component developer is preferably within a range from 1:100 to 30:100.

<V> Coating Material

A coating material according to one embodiment of the present invention contains a colorant composition (pigment composition, resin, and solvent).

Examples of the resin include a thermosetting resin and a thermoplastic resin. The thermosetting resin is preferably a resin having a glass transition temperature of 10° C. or higher. Examples of the thermosetting resin include acrylic resin, polyester, and polyurethane. The thermosetting resin preferably has a functional group that can react with a curing agent. Examples of the functional group include a carboxy group and a hydroxyl group. Examples of the curing agent include an isocyanate curing agent, epoxy curing agent, aziridine curing agent, and amine curing agent.

The thermoplastic resin is preferably a resin having a glass transition temperature of 30° C. or higher. Examples of the thermoplastic resin include nitrocellulose and polyester. Note that the thermosetting resin and the thermoplastic resin can be used together.

As the solvent, examples of non-water-soluble solvents include toluene, xylene, butyl acetate, methyl acetate, methyl ethyl ketone, methyl isobutyl ketone, butyl alcohol, and aliphatic hydrocarbon.

As the solvent, examples of water-soluble solvents include water, monohydric alcohol, dihydric alcohol, and glycol. Examples of water-soluble solvents include ethanol, n-propanol, isopropanol, isobutanol, ethylene glycol, diethylene glycol, triethylene glycol, propylene glycol, and glycerin. Also included is water-dilutable monoether derived from a polyhydric alcohol. A specific example thereof is methoxypropanol or methoxybutanol. Also, an example is water-dilutable glycol ether such as butyl glycol or butyl diglycol. Note that as described above, the coating material is referred to as an aqueous coating material when the solvent contains water.

The coating material can further contain a known additive.

Examples of coating material applications include metal coating materials and plastic coating materials.

<V> Printing Ink

A printing ink according to one embodiment of the present invention contains a colorant composition. Aspects of the colorant composition contained therein are as described above, and examples include aspect 1 including a pigment composition and a resin, aspect 2 including a pigment composition and an organic solvent, and aspect 3 containing a pigment composition, a resin and water. Solvent-free-based (active energy ray-curable) printing inks, (solvent-based) printing inks, and aqueous printing inks can be obtained, respectively.

Further, the printing ink of the present embodiment is an ink other than inkjet inks, and depending on the printing method, examples include an ink for offset printing, ink for flexographic printing (flexographic ink), ink for gravure printing (gravure ink), ink for silkscreen printing (silkscreen ink), and ink for color filters.

By combining classifications according to aspects of the colorant composition contained and classifications according to printing methods, specific examples of the printing ink of the present embodiment include the following inks. A (solvent-based) offset ink, (solvent-based) gravure ink, (solvent-based) flexographic ink, (solvent-based) silk screen ink, aqueous gravure ink, aqueous flexographic ink, active energy ray-curable offset ink, active energy ray-curable flexographic ink, and active energy ray-curable silk screen ink.

The production method (mixing means) of the ink is not particularly limited. For example, the ink can preferably be produced by performing mixing using a roller mill, ball mill, pebble mill, attritor, or sand mill.

Substrates for printing the printing ink are not particularly limited, and known substrates can be used. Specific examples include polyolefins such as polyethylene and polypropylene, polyesters such as polyethylene terephthalate, polycarbonate, and polylactic acid, polystyrene-based resins such as polystyrene, AS resin, and ABS resin, nylon, polyamide, polyvinyl chloride, polyvinylidene chloride, cellophane, coated paper such as art paper, coated paper, and cast paper, uncoated paper such as high-quality paper, medium-quality paper, and newsprint, synthetic paper such as yupo paper, and aluminum, and film-shaped substrates made from composite materials thereof. Also, examples of substrates include vapor deposition substrates in which inorganic compounds such as silica, alumina, and aluminum are deposited on polyethylene terephthalate and nylon film. The substrate may be further coated with polyvinyl alcohol or the like on the surface vapor-deposited with an inorganic compound or the like, and may be further subjected to surface treatment such as corona treatment.

The method for printing the printing ink is not particularly limited, and known methods can be used. Specific examples include roll coaters, rod coaters, blades, wire bars, doctor knives, spin coaters, screen coaters, gravure coaters, offset gravure coaters, and flexo coaters. Heating may be performed as necessary during printing.

The printing ink can further contain a known binder resin, solvent, bright material, additive, and the like according to various applications.

Examples of the binder resin include rosin resins, rosin-modified phenolic resins, polyurethane, nitrocellulose, acrylic resins, styrene-acrylic resins, and petroleum resins.

Examples of non-water-soluble solvents as the solvent include toluene, xylene, butyl acetate, methyl acetate, methyl ethyl ketone, methyl isobutyl ketone, butyl alcohol, and aliphatic hydrocarbons.

Examples of water-soluble solvents as the solvent include ethanol, n-propanol, isopropanol, isobutanol, ethylene glycol, diethylene glycol, triethylene glycol, propylene glycol, and glycerin. Also included is water-dilutable monoether derived from polyhydric alcohols. Methoxypropanol or methoxybutanol can be mentioned, for example. Water-dilutable glycol etheruch as butyl glycol or butyl diglycol is also mentioned.

The bright material may be constituted by particles having an average thickness of 0.5 to 10 μm and an average particle diameter of 5 to 50 μm, and examples thereof include metal flakes, mica, and coated glass flakes. Examples of metal flakes include aluminum flakes and gold powder. Examples of mica include common mica and coated mica. An example of coated glass flakes is glass flakes or the like coated with a metal oxide such as titanium oxide or the like.

The content of the bright material is preferably within a range from 0.1% to 10% by mass relative to 100% by mass of the printing ink. Further, other colored pigments normally used in the art and various additives may be blended as necessary.

The printing ink can further contain a known additive. Examples of the additive include pigment derivatives, dispersants, wetting agents, adhesive aids, leveling agents, anti-foaming agents, anti-static agents, trapping agents, anti-blocking agents, hydrocarbon waxes, isocyanate-based curing agents, and silane coupling agents.

Embodiments of a gravure ink, aqueous flexographic ink, and active energy ray-curable ink as examples of the printing ink will be described in detail, but the present invention is not limited only to the following embodiments.

<Gravure Ink>

A gravure ink according to one embodiment of the present invention preferably contains a colorant composition (pigment composition and solvent) and more preferably further contains a binder resin.

The binder resin used for the gravure ink according to the present embodiment is preferably a polyurethane resin. Note that the polyurethane resin includes a polyurethane urea resin.

[Polyurethane Resin]

Examples of the synthesis of a polyurethane resin include (1) a two-step method for synthesizing a polyurethane prepolymer having an isocyanate group at an end, which is obtained by reacting a polyol with a diisocyanate compound at a ratio in which the isocyanate group becomes excessive, and then synthesizing by reacting a urethane prepolymer having an isocyanate group with a chain extending agent and/or a terminal blocking agent having the amino group in a solvent, and (2) a one-step method for reacting a polypropylene glycol, a polyol, a diisocyanate compound, and a chain extending agent and/or a terminal blocking agent having the amino group in a suitable solvent at one time.

Examples of the solvent used for the synthesis include: an ester-based solvent such as ethyl acetate, propyl acetate, and butyl acetate; ketone-based solvent such as acetone, methyl ethyl ketone, and methyl isobutyl ketone; alcohol-based solvent such as methanol, ethanol, isopropyl alcohol, and n-butanol; hydrocarbon-based solvent such as methylcyclohexane and ethylcyclohexane; and a mixture of these solvents.

Among these methods, the two-step method is preferable from the viewpoint of obtaining a more uniform polyurethane resin. When a polyurethane resin is produced using the two-step method, the equivalence ratio between the isocyanate group of the urethane prepolymer and the amino group of the chain extending agent and terminal blocking agent (mol of isocyanate group/mol of amino group) is preferably within a range from 1/1.3 to 1/0.9. When the equivalence ratio between the isocyanate group and the amino group is 1/1.3 or more, the chain extending agent and/or terminal blocking agent remaining unreacted is reduced, and yellowing of the polyurethane resin and post-printing odor can be suppressed. When the equivalence ratio between the isocyanate group and the amino group is 1/0.9 or less, the molecular weight of the obtained polyurethane resin becomes appropriate, and it is possible to obtain a resin achieving a suitable film strength after printing.

The weight average molecular weight of the above polyurethane resin is preferably within a range from 15,000 to 100,000. When the weight average molecular weight of the polyurethane resin is 15,000 or more, the blocking resistance of the ink, the strength of the printed film, and the oil resistance are excellent, and when the weight average molecular weight is 100,000 or less, the viscosity of the ink obtained is within an appropriate range and the printed film has excellent gloss.

In addition, the above polyurethane resin preferably has an amine value from the viewpoint of printing suitability and laminate strength. The amine value is preferably within a range from 0.5 to 20 mgKOH/g and more preferably from 1 to 15 mgKOH/g.

The binder resin content in the gravure ink is preferably within a range from 4% to 25% by mass and more preferably from 6% to 20% by mass.

[Organic Solvent]

Examples of the organic solvent used in the gravure ink of the present embodiment include: an aromatic organic solvent such as toluene and xylene; ketone-based organic solvent such as acetone, methyl ethyl ketone, and methyl isobutyl ketone; ester-based organic solvent such as ethyl acetate, n-propyl acetate, butyl acetate, and propylene glycol monomethyl ether acetate; alcohol-based organic solvent such as methanol, ethanol, n-propanol, isopropanol, and n-butanol; and glycol ether-based solvent such as ethylene glycol monopropyl ether and propylene glycol monomethyl ether. These organic solvents are preferably used by mixing two or more types.

In the gravure ink, a mixed solvent of an ester-based organic solvent and an alcohol-based organic solvent is preferably used. The mass ratio of the ester-based organic solvent to the alcohol-based organic solvent (mass of ester-based organic solvent:mass of alcohol-based organic solvent) is preferably within a range from 95:5 to 40:60, and more preferably from 90:10 to 50:50.

The organic solvent content in the gravure ink is, on the basis of the mass of the gravure ink, preferably within a range from 60% to 90% by mass, and more preferably within a range from 70% to 85% by mass.

The viscosity of each color ink may preferably be 10 mPa·s or more from the viewpoint of preventing sedimentation of a pigment and dispersing the pigment appropriately, and may preferably be 1,000 mPa·s or less from the viewpoint of work efficiency during ink production and printing.

Note that the above viscosity is a value which is measured at 25° C. using a type B viscometer manufactured by TOKIMEC INC.

[Water]

The gravure ink of the present embodiment can further include water. By including a predetermined amount of water, the pigment dispersibility due to the polyurethane resin is improved, and the printing suitability such as the highlight transfer property, plate covering property, and trapping property is improved.

The water content is, on the basis of the mass of the gravure ink, preferably within a range from 0.1% to 10% by mass, more preferably from 0.5% to 7% by mass, even more preferably from 0.5% to 5% by mass, and particularly preferably from 0.5% to 4% by mass.

[Silica Particles]

The gravure ink of the present embodiment can further contain silica particles. The inclusion of silica particles promotes wetting and spreading of the ink during layer printing, improves trapping property, and maintains highlight transfer property.

The silica particles may be a natural product or synthetic product, crystalline or non-crystalline, or hydrophobic or hydrophilic. There are a dry method and a wet method for synthesizing silica particles, the dry method includes a combustion method and arc method and the wet method includes a sedimentation method and gel method, and the silica particles may be synthesized using either method. The silica particles may be constituted by hydrophilic silica having a hydrophilic functional group on the surface, or hydrophobic silica obtained by modifying the hydrophilic functional group with alkylsilane or the like to make it hydrophobic. Preferably, the silica particles is constituted by hydrophilic silica.

Commercial products of such silica particles include, for example, the Nipgel series and the Nipsil series manufactured by TOSOH SILICA CORPORATION, and the Mizukasil series manufactured by Mizusawa Industrial Chemicals, Ltd.

Since the silica particles form irregularities on the surface of the ink layer, the average particle diameter is preferably within a range from 1 to 10 µm. More preferably, it is within a range from 1 to 8 µm, and even more preferably from 1 to 6 µm. The average particle size of the silica particles refers to the particle size at an integrated value of 50% ($D_{50}$) in the particle size distribution and can be determined using the Coulter counter method.

The specific surface area of the silica particles measured using the BET method is preferably within a range from 50 to 600 m²/g. More preferably, it is within a range from 100 to 450 m²/g. The silica particles used in the gravure ink of the present embodiment can be a combination of two or more types having different average particle sizes or BET method specific surface areas.

The content of the silica particles is, on the basis of the mass of the gravure ink, preferably within a range from 0.1% to 3% by mass, more preferably from 0.2% to 2.5% by mass, even more preferably from 0.2% to 2% by mass, and particularly preferably from 0.2% to 1.5% by mass.

[Other Additives]

The gravure ink of the present embodiment can include another additive such as a constitutional pigment, pigment dispersant, leveling agent, anti-foaming agent, wax, plasticizer, infrared absorber, ultraviolet absorber, air freshener, and flame retardant, as necessary.

<Aqueous Flexographic Ink>

An aqueous flexographic ink according to one embodiment of the present invention contains a colorant composition (pigment composition, resin, and water). Various types of substrates can be selected, and application to impermeable substrates other than ordinary printing paper is also possible. The aqueous flexographic ink is also suitable for printing on coated paper and plastic films (including plastic sheets), for example.

The content of the pigment composition in the aqueous flexographic ink is preferably, but not particularly limited to, within a range from 10% to 30% by mass and more preferably from 15% to 25% by mass.

Each component contained in the aqueous flexographic ink and, as necessary, the synthesis method thereof will be described below.

[Binder Resin]

The aqueous flexographic ink preferably contains a binder resin. Examples of the binder resin include aqueous urethane resins, polyester resins, acrylic resins, styrene-acrylic resins, styrene-maleic anhydride resins, rosin-modified maleic acid resins, cellulose-based resins, and water-soluble resins such as chlorinated polyolefin. Thereamong, it is preferable to include at least an aqueous urethane resin. The binder resin can be used alone or in combination of two or more types.

[Aqueous Urethane Resin]

A urethane resin is generally obtained by reacting a polyisocyanate having two or more isocyanate groups in one molecule with a hydroxy group-containing compound having two or more hydroxy groups in one molecule. The aqueous urethane resin of the present embodiment has the structure described below. Such a structure can preferably be introduced by appropriately selecting the structure and type of the hydroxy group-containing compound, as described below.

The urethane bond number (mmol/g) of the aqueous urethane resin is preferably, but not particularly limited to, within a range from 2.2 to 3.0 mmol/g and more preferably from 2.3 to 2.9 mmol/g, from the viewpoint of adjusting the molecular weight of the resin and the hardness of the coating film. The urethane bond number can be set to a desired range by appropriately adjusting the amounts of the hydroxy group-containing compound and polyisocyanate and the reaction conditions.

The glass transition temperature (Tg) of the aqueous urethane resin is not particularly limited, but is preferably −70° C. or less, and more preferably within a range from −70° C. to −90° C. When the Tg of the aqueous urethane resin is −70° C. or less, the film-forming property of the ink is improved, and the adhesion of the coating film is improved.

The weight average molecular weight (GPC measurement, standard polystyrene equivalent) of the aqueous urethane resin is preferably, but not particularly limited to, within a range from 10,000 to 100,000 and more preferably from 30,000 to 70,000.

The hydroxyl value (mgKOH/g) of the aqueous urethane resin is preferably, but not particularly limited to, within a range from 0.0 to 3.0 mgKOH/g and more preferably from 0.0 to 2.0 mgKOH/g, from the viewpoint of water resistance and the like.

The aqueous urethane resin is preferably contained, on the basis on the aqueous flexographic ink, in an amount of 3% by mass or more, more preferably 5% by mass or more, and even more preferably 7% by mass or more. In contrast, the content of the aqueous urethane resin is, in the total mass of the aqueous flexographic ink, preferably 25% by mass or less, more preferably 20% by mass or less, and even more preferably 17% by mass or less.

The content of the hydrocarbon-based wax in the aqueous flexographic ink is preferably within a range from 0.5% to 7% by mass and more preferably from 1% to 4% by mass.

The aqueous flexographic ink preferably contains an aqueous solvent. Examples of the aqueous solvent include water and an alcohol. Examples of the alcohol include n-propanol and an isopropyl alcohol.

The content of the aqueous solvent is preferably within a range from 40% to 60% by mass in the aqueous flexographic ink.

[Other Components]

The aqueous flexographic ink can include a known additive such as an anti-foaming agent, thickener, leveling agent, pigment dispersant, and ultraviolet absorber, as necessary. Non-aqueous solvent other than alcohols (for example, ketone-based solvent and ester-based solvent) can also be included as long as the issue can be solved. The content of the non-aqueous solvent is, in the aqueous flexographic ink, preferably 20% by mass or less and more preferably 10% by mass or less.

<Active Energy Ray-Curable Ink>

The active energy ray-curable ink of one embodiment of the present invention contains a colorant composition (pigment composition and resin), a polymerizable compound, and a photopolymerization initiator.

In addition to the pigment composition of the present embodiment, any combination of known colorants may be used in the active energy ray-curable ink, as necessary, without departing from the effects of the present invention.

The pigment composition of the present invention is, in the active energy ray-curable ink, preferably within a range from 5% to 30% by mass and more preferably from 10% to 25% by mass.

Components which are included or can be included in the active energy ray-curable ink of the present embodiment will be described below.

[Polymerizable Compound]

A polymerizable compound is a compound having one or more ethylenically unsaturated bonds in the molecule. As the polymerizable compound, a monomer and an oligomer are contained.

(Monomer)

The monomer has a polymerizable group such as a (meth)acryloyl group, allyl group, vinyl group, and vinyl ether group in the molecule. The monomer preferably includes a monomer having either a (meth)acryloyl group or vinyl group in terms of curability. The above monomer more preferably includes a monomer having three to six (meth) acryloyl groups in the molecule, and even more preferably contains a monomer having six (meth)acryloyl groups in the molecule.

Specific examples of a monomer having a (meth)acryloyl group include: a monofunctional (meth)acrylate monomer having one (meth)acryloyl group in the molecule such as 2-ethylhexyl (meth)acrylate, 2-hydroxyethyl (meth)acrylate, 2-hydroxypropyl (meth)acrylate, β-carboxylethyl (meth) acrylate, 4-tert-butylcyclohexyl (meth)acrylate, tetrahydrofurfuryl (meth)acrylate, alkoxylated tetrahydrofurfuryl acrylate, caprolactone (meth)acrylate, lauryl (meth)acrylate, stearyl (meth)acrylate, isoamyl (meth)acrylate, 2-phenoxyethyl (meth)acrylate, isodecyl (meth)acrylate, 3,3,5-trimethylcyclohexanol (meth)acrylate, cyclohexyl (meth)acrylate, isobornyl (meth)acrylate, norbornyl (meth)acrylate, dicyclopentanyl (meth)acrylate, dicyclopentenyl (oxyethyl) (meth) acrylate, 1,4-cyclohexanedimethanol (meth)acrylate, cyclic trimethylolpropane formal (meth)acrylate, benzyl (meth) acrylate, EO-modified (2) nonylphenol acrylate, (2-methyl-2-ethyl-1,3-dioxolane-4-yl) methyl acrylate, and acryloyl morpholine;

a difunctional (meth)acrylate monomer having two (meth)acryloyl groups in the molecule such as 1,3-butylene glycol di(meth)acrylate, 1,4-butanediol di(meth)acrylate, 3-methyl-1,5-pentanediol di(meth) acrylate, 1,6-hexanediol di(meth)acrylate, 1,9-nonanediol di(meth)acrylate, 1,10-decanediol di(meth)acrylate, 1,12-dodecanediol di(meth)acrylate, neopentyl glycol di(meth)acrylate, polyethylene glycol (200) di(meth)acrylate, polyethylene glycol (300) di(meth) acrylate, polyethylene glycol (400) di(meth)acrylate, polyethylene glycol (600) di(meth)acrylate, hydroxypivalic acid neopentyl glycol di(meth)acrylate, dipropylene glycol di(meth)acrylate, tripropylene glycol di(meth)acrylate, EO-modified (2) 1,6-hexanediol di(meth) acrylate, PO-modified (2) neopentyl glycol di(meth) acrylate, (neopentyl glycol-modified) trimethylolpropane di(meth)acrylate, dimethyloltricyclodecan di(meth)acrylate, EO-modified (4) bisphenol A di(meth)acrylate, PO-modified (4) bisphenol A di(meth)acrylate, cyclohexanedimethanol di(meth)acrylate, dimethylol-tricyclodecane di(meth) acrylate, and dicyclopentanyl di(meth)acrylate;

a trifunctional (meth)acrylate monomer having three (meth)acryloyl groups in the molecule such as trimethylolpropane tri(meth)acrylate, EO-modified (3) trimethylolpropane tri(meth)acrylate, EO-modified (6) trimethylolpropane tri(meth)acrylate, PO-modified (3) trimethylolpropane tri(meth)acrylate, s-caprolactone-modified tris-(2-acryloxyethyl) isocyanurate, ethoxylated isocyanuric acid tri(meth)acrylate, tris (2-hydroxyethyl) isocyanurate tri(meth)acrylate, and pentaerythritol tri(meth)acrylate;

a tetrafunctional (meth)acrylate monomer having four (meth)acryloyl groups in the molecule such as pentaerythritol tetra(meth)acrylate, EO-modified (4) pentaerythritol tetra(meth)acrylate, and ditrimethylolpropane tetra(meth)acrylate;

a pentafunctional (meth)acrylate monomer having five (meth)acryloyl groups in the molecule such as dipentaerythritol penta(meth)acrylate; and a hexafunctional (meth)acrylate monomer having six (meth)acryloyl groups in the molecule such as dipentaerythritol hexa(meth)acrylate.

Specific examples of the monomer having a vinyl group include N-vinyl-2-pyrrolidone, and N-vinyl caprolactam.

(Oligomer)

Examples of the oligomer include a urethane (meth) acrylate oligomer such as aliphatic urethane (meth)acrylate oligomer and aromatic urethane (meth)acrylate oligomer, (meth)acrylic ester oligomer, polyester (meth)acrylate oligomer, and epoxy (meth)acrylate oligomer. The oligomer preferably includes about 2 to 16 ethylenically unsaturated bonds. In particular, the urethane (meth)acrylate oligomer is preferable, and a urethane (meth)acrylate oligomer having 6 to 12 (meth)acryloyl groups is more preferable.

The weight average molecular weight (Mw) of the oligomer is preferably within a range from 400 to 10,000, more preferably from 500 to 5,000, more preferably from 800 to 4,000, and more preferably from 1,000 to 2,000. Here, "weight average molecular weight (Mw)" can be obtained as a polystyrene equivalent molecular weight using general gel permeation chromatography (GPC).

Specific examples of urethane (meth)acrylate oligomers having 6 to 12 functions described above include EBECRYL1290 (hexafunctional, Mw1,000), EBECRYL5129 (hexafunctional, Mw800), EBECRYL8254 (hexafunctional, Mw1,200), KRM8200 (hexafunctional, Mw1,000), KRM8904 (nonafunctional, Mw1,800), EBECRYL8602 (nonafunctional, Mw2,000), KRM8452 (decafunctional, Mw1,200), EBECRYL225 (decafunctional, Mw1,200), and EBECRYL8415 (decafunctional, Mw1,200), manufactured by DAICEL-ALLNEX LTD. Also included are MiramerPU5000 (hexafunctional, Mw1,800), MiramerPU610 (hexafunctional, Mw1,800), MiramerPU6140 (hexafunctional, Mw1,500), MiramerMU9800 (nonafunctional, Mw3,500), MiramerMU9500 (decafunctional, Mw3,200), manufactured by Miwon Speacialty Chemical Co., Ltd.

The polymerizable compound can be used alone or in combination of two or more types.

The content of the polymerizable compound is, in the active energy ray-curable ink, preferably within a range from 25% to 90% by mass and more preferably from 35% to 80% by mass.

(Polymerization Initiator)

In one embodiment, the active energy ray-curable ink contains a polymerization initiator. The above polymerization initiator preferably contains a polymerizable initiator for radical polymerization, and more preferably contains a photopolymerization initiator. The polymerization initiator in the present embodiment is a compound that causes a chemical change and generates radicals through the action of light or interaction with the electronically excited state of a sensitizing dye. In particular, a photo-radical polymerization initiator is preferable from the viewpoint that polymerization can be initiated by means of exposure.

In the present embodiment, the above photo-radical polymerization initiator is not particularly limited, and a known photo-radical polymerization initiator can be used. Specific examples include benzophenone-based compounds, dialkoxyacetophenone-based compounds, α-hydroxyalkylphenone-based compounds, α-aminoalkylphenone-based compounds, acylphosphinoxide-based compounds, and thioxanthone-based compounds.

Examples of the above benzophenone-based compounds include benzophenone, 4-methylbenzophenone, 4-phenylbenzophenone, 4,4'-bis(diethylamino)benzophenone, 4,4-bis(dimethylamino)benzophenone, and [4-(methylphenylthio)phenyl]-phenylmethanone.

Examples of the above dialkoxyacetophenone-based compounds include 2,2-dimethoxy-2-phenylacetophenone, dimethoxyacetophenone, and diethoxyacetophenone.

Examples of the above α-hydroxyalkylphenone-based compounds include 1-hydroxy-cyclohexylphenyl ketone, 2-hydroxy-2-methyl-1-phenyl-propane-1-one, 1-[4-(2-hydroxymethoxy)-phenyl]-2-hydroxy-2-methyl-1-propane-1-one, and 2-hydroxy-1-{4-[4-(2-hydroxy-2-methyl-propionyl)-benzyl]phenyl}-2-methyl-propane-1-one.

Examples of the above α-aminoalkylphenone-based compounds include 2-methyl-1-[4-(methoxythio)-phenyl]-2-morpholinopropane-1-one, 2-benzyl-2-(dimethylamino)-1-(4-morpholinophenyl)-1-butanone, and 2-(dimethylamino)-2-[(4-methylphenyl)methyl]-1-[4-(4-morpholinyl)phenyl]-1-butanone.

Examples of the above acylphosphinoxide-based compounds include diphenylacylphenylphosphinoxide, 2,4,6-trimethylbenzoyl-diphenylphosphinoxide, and bis(2,4,6-trimethylbenzoyl)-phenylphosphinoxide.

Examples of the above thioxanthone-based compounds include 2-isopropylthioxanthone, 2,4-dimethylthioxanthone, and 2,4-diethylthioxanthone.

In the present invention, the above polymerization initiator can be used alone or in combination of two or more types.

The content of the polymerization initiator is, in the active energy ray-curable ink, preferably within a range from 0.5% to 20% by mass and more preferably from 5% to 15% by mass.

[Dispersant]

In one embodiment, the active energy ray-curable ink preferably contains a dispersant for better pigment dispersibility. As the dispersant, there are no particular limitations, and a known dispersant may be used.

Specific examples include polymer dispersants mainly including polyoxyalkylene polyalkylene polyamines, vinyl-based polymers and copolymers, acrylic-based polymers and copolymers, polyester, polyamide, polyimide, polyurethane, and amine-based polymers. In particular, from the viewpoint of dispersion stability of pigments, a pigment dispersant containing a basic functional group having a block structure or a comb structure is preferable.

Commercially available products include the AJISPER series (AJISPER PB821, PB822, PB824, etc.) manufactured by Ajinomoto Fine-Techno Co., Inc., the SOLSPER series (SOLSPERSE24000, SOLSPERSE32000, SOLSPERSE38500, SOLSPERSE39000, etc.) manufactured by The Lubrizol Corporation, and the DISPERBYK series (BYK-162, BYK-168, BYK-183, etc.) manufactured by BYK-Chemie GmbH.

The content of the above dispersant is preferably within a range from 0.1% to 10% by mass in the active energy ray-curable ink.

[Polymerization Initiation Aid]

In one embodiment, the active energy ray-curable ink can also contain a polymerization initiation aid. The containing of the polymerization initiation aid can further improve curability. Examples of the polymerization initiator aid include triethanolamine, methyldiethanolamine, triisopropanolamine, aliphatic amine, ethyl 2-dimethylaminobenzoate, ethyl 4-dimethylaminobenzoate, isoamyl 4-dimethylaminobenzoate, and dibutylethanolamine.

The content of the above polymerization initiation aid is, in the active energy ray-curable ink, preferably within a range from 0.1% to 5% by mass and more preferably from 0.5% to 3% by mass.

[Wax]

In one embodiment, the active energy ray-curable ink preferably contains a wax to provide better anti-friction, anti-blocking, anti-slip, and anti-scratch properties. As the wax, there are no particular limitations, and known waxes can be used. For example, there are a natural wax and a synthetic wax. Examples of the natural wax include carnauba wax, wood wax, lanolin, montan wax, paraffin wax, and microcrystalline wax. Examples of the synthetic wax include Fisher-Tropsch wax, polyethylene wax, polypropylene wax, polytetrafluoroethylene wax, and polyamide wax silicone compound.

The content of the wax is, in the active energy ray-curable ink, preferably within a range from 0.1% to 5% by mass and more preferably from 0.5% to 4% by mass, from the viewpoint of the balance of friction resistance, gloss, and piling.

[Binder Resin]

In one embodiment, the active energy ray-curable ink may include a binder resin. The inclusion of the binder resin reduces the shrinkage of the coating film during curing, suppresses the curling of the substrate, and improves adhesion to the substrate.

Examples of the binder resin include polyvinyl chloride, poly (meth)acrylate ester, epoxy resins, polyester resins, polyurethane resins, cellulose derivatives (for example, ethylcellulose, cellulose acetate, and nitrocellulose), vinyl chloride-vinyl acetate copolymers, polyamide resins, polyvinyl acetal resins, diallyl phthalate resins, alkyd resins, rosin-modified alkyd resins, rosin-modified alkyd resins, petroleum resins, urea resins, and synthetic rubber such as butadiene-acrylonitrile copolymers. Thereamong, diallyl phthalate resins and polyester resins are preferable. Diallyl phthalate resins are more preferable.

The weight average molecular weight of the binder resin is preferably within a range from 1,000 to 100,000. A range from 2,000 to 70,000 is more preferable.

The above binder resin can be used alone or in combination with two or more types. From the viewpoint of curability, the content of the binder resin is preferably within a range from 1% to 15% by mass in the active energy ray-curable ink. A range from 1% to 5% by mass is more preferable.

(Polymerization Inhibitor)

In one embodiment, the active energy ray-curable ink may include a polymerization inhibitor. Examples of the polymerization inhibitor include 4-methoxyphenol, hydroquinone, methyl hydroquinone, t-butyl hydroquinone, 2,6-di-t-butyl-4-methylphenol, phenothiazine, and an aluminum salt of N-nitrosophenyl hydroxylamine.

The content of the polymerization inhibitor is preferably within a range from 0.01% to 2% by mass relative to the total mass of the active energy ray-curable ink from the viewpoint of enhancing the storage stability of the active energy ray-curable ink while maintaining the curability.

[Other Components]

In one embodiment, to the active energy ray-curable ink, extender pigments, leveling agents, anti-static agents, surfactants, anti-foaming agents, ultraviolet absorbers, and antioxidants can be added as necessary to the extent that the effect of the embodiment of the present invention is not reduced.

Note that the active energy ray-curable ink preferably does not substantially contain water. Not substantially containing is preferably 1% by mass or less relative to the total mass of the active energy ray-curable ink.

<VII> Inkjet Ink

The ink jet ink according to one embodiment of the present invention preferably contains a pigment composition and a dispersion medium. The ink jet ink can be roughly classified into (solvent-based) inkjet ink, aqueous inkjet ink, and solvent-free ink jet ink, depending on the presence or absence of a solvent and the type thereof. In one embodiment, it is preferable to use an aqueous inkjet ink that provides good dispersibility of the isoindoline compound (1) and the isoindoline compound (2). The aqueous inkjet ink will be mainly described below.

The content of the pigment composition is, relative to 100% by mass of the aqueous inkjet ink, preferably within a range from 0.5% to 30% by mass and more preferably from 1% to 15% by mass.

The resin used in the aqueous inkjet ink is important for obtaining the fixability of the ink to the printed matter (substrate).

Examples of the resin include acrylic-based resins, styrene-acrylic-based resins, polyester-based resins, polyamide-based resins, and polyurethane-based resins. The resin forms include water-soluble resins, and emulsion particles. Among these, emulsion particles are preferable. Emulsion particles include single composition particles and core-shell type particles and can be optionally selected and used. By using emulsion particles, it is easy to reduce the viscosity of the aqueous inkjet ink, and recorded matter having excellent water resistance can be easily obtained. As necessary, the resin can be used by neutralizing an acidic functional group with a pH adjuster such as ammonia, various amines, and various inorganic alkalis.

The content of the resin is, relative to 100% by mass of the non-volatile fraction of the ink jet ink, preferably within a range from 2% to 30% by mass and more preferably from 3% to 20% by mass. When the resin is appropriately contained, the jetting stability is improved and the fixing property is also improved.

Examples of the solvent include a water-insoluble solvent, water, and water-soluble solvent. Examples of the water-soluble solvent include glycol ether and diols, which penetrate into substrates very rapidly and also penetrate into low or non-absorbent substrates, such as coated paper, art paper, vinyl chloride sheets, films, and fabric. Thus, drying in printing is fast, and accurate printing can be realized. The water-soluble solvent also acts as a wetting agent due to its high boiling point.

The water-soluble solvent is important for preventing drying and solidification at the nozzle part of the printer head for the aqueous inkjet ink, and for achieving ink jetting stability. Examples of the water-soluble solvent include an ethylene glycol, diethylene glycol, propylene glycol, triethylene glycol, polyethylene glycol, glycerin, tetraethylene glycol, dipropylene glycol, ketone alcohol, diethylene glycol monobutyl ether, ethylene glycol monobutyl ether, ethylene glycol monoethyl ether, 1,2-hexanediol, N-methyl-2-pyrrolidone, substituted pyrrolidone, 2,4,6-hexanetriol, tetrafurfuryl alcohol, and 4-methoxy-4 methylpentanone.

The content of the water-soluble solvent containing water is preferably within a range from 15% to 50% by mass relative to 100% by mass of the inkjet ink.

The inkjet ink can further contain an additive. Examples of the additive include a drying accelerator, penetrant, preservative, chelating agent, and pH adjuster.

The drying accelerator is used to accelerate the drying of the aqueous inkjet ink after printing. Examples of the drying accelerator include alcohols such as methanol, ethanol, and isopropyl alcohol. The content of the drying accelerator is preferably within a range from 1% to 50% by mass relative to 100% by mass of the aqueous inkjet ink.

When the substrate is a permeable material such as paper, the penetrant is used to accelerate the penetration of the ink into the substrate and to accelerate the apparent dryness. Examples of the penetrant include surfactants such as polyethylene glycol monolauryl ether, sodium lauryl sulfate, sodium dodecylbenzene sulfonate, sodium oleate, and sodium dioctyl sulfosuccinate, in addition to the water-soluble solvent. The amount of the penetrant used is preferably within a range from 0.1% to 5% by mass relative to 100% by mass of the aqueous inkjet ink. When an appropriate amount of the penetrant is used, defects such as blurring of printing and bleed-through of ink are unlikely to occur.

Examples of the preservative include sodium dehydroacetate, sodium benzoate, sodium pyridinethione-1-oxide, zinc pyridinethione-1-oxide, 1,2-benzisothiazoline-3-one, and amine salts of 1-benzisothiazoline-3-one and the like. The amount of preservative used is preferably within a range from 0.05% to 1.0% by mass relative to 100% by mass of the aqueous inkjet ink.

The chelating agent can be used to trap metal ions contained in the aqueous inkjet ink and prevent the precipitation of insoluble matter in the nozzle part or ink. Examples of the chelating agent include ethylenediaminetetra acetic acid, sodium salt of ethylenediaminetetra acetic acid, diammonium salt of ethylenediaminetetra acetic acid, and tetraammonium salt of ethylenediaminetetra acetic acid. The amount of the chelating agent used is preferably within a range from 0.005% to 0.5% by mass relative to 100% by mass of the aqueous inkjet ink.

Examples of the pH adjuster include various amines, inorganic bases, ammonia, and various buffer solutions.

The inkjet ink is made by blending various materials and mixing them. Examples of mixing includes a stirrer using a blade, various dispersion devices, and an emulsifier. The order of addition of each material and the mixing method are optional.

The inkjet ink is preferably produced through filtration or centrifugation after mixing to remove coarse particles. As a result, jetting from inkjet printers is improved. For filtration and centrifugation, known methods can be used.

In one embodiment, for the inkjet ink, various inkjet methods can be used. Examples of inkjet methods include a charge control type, continuous jetting type such as a spray type, piezo type, thermal type, electrostatic suction type, and single pass type used for commercial printing.

<VIII> Ink Set

An ink set according to one embodiment of the present invention is an ink set including at least a yellow ink, a cyan ink, and a magenta ink, and the yellow ink preferably contains an ink including the colorant composition.

In one embodiment, the ink set can further contain another ink such as a black ink, white ink, and special color ink.

The ink set of the present embodiment can be used for printing ink sets such as offset printing inks, flexographic printing inks (flexographic inks), gravure printing inks (gravure inks), and screen printing inks (silk screen inks), and ink sets of inkjet inks. Among these, flexographic ink sets, gravure ink sets, and inkjet ink sets used for packaging materials are preferable, and gravure ink sets are more preferable.

(Yellow Ink)

The yellow ink in the present embodiment includes the above pigment composition and a binder resin. The yellow ink includes two types of isoindoline compounds as described above, and thus can improve dispersibility and storage stability, which have been conventionally required to be improved for isoindoline compounds.

[Binder Resin]

Examples of the binder resin include polyurethane resins, ethylene-vinyl acetate copolymer resins, vinyl acetate resins, nitrocellulose resins, polyamide resins, polyvinyl acetal resins, cellulose ester resins, polystyrene resins, acrylic resins, polyester resins, alkyd resins, rosin-based resins, rosin-modified maleic acid resins, ketone resins, cyclized rubber, butyral, petroleum resins, and chlorinated polyolefin resin.

The content of the binder resin is, relative to the yellow ink, preferably within a range from 4% to 25% by mass and more preferably from 6% to 20% by mass.

The yellow ink can further contain another pigment, a resin, organic solvent, and optionally an additive such as a pigment dispersant, leveling agent, anti-foaming agent, wax, plasticizer, infrared absorber, and ultraviolet absorber.

(Cyan Ink)

The cyan ink in the present embodiment is an ink for obtaining a cyan color and includes a pigment and a binder resin. Note that the binder resin can be a resin described above.

(Magenta Ink)

The magenta ink in the present embodiment is an ink for obtaining a magenta color and contains a pigment and a binder resin. Note that the binder resin can be a resin described above.

Pigments that can be used in inks will be described below.

[Pigment]

Examples of the pigment include organic pigments and inorganic pigments. In the present embodiment, for example, the following pigments can be used.

[Organic Pigments]

The pigment is preferably an organic pigment. Examples of the organic pigment include soluble azo-based, insoluble azo-based, azo-based, phthalocyanine-based, halogenated phthalocyanine-based, anthraquinone-based, anthanthrone-based, dianthraquinonyl-based, anthrapyrimidine-based, perylene-based, perinone-based, quinacridone-based, thioindigo-based, dioxazine-based, isoindolinone-based, quinophthalone-based, azomethine azo-based, flavanthrone-based, diketopyrrolopyrrole-based, isoindoline-based, and indanethrone-based organic pigments.

Examples of pigments are indicated using C.I. Pigment number.

Examples of the indigo pigment include C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, and C.I. Pigment Blue 60. Also included are phthalocyanine pigments such as aluminum phthalocyanine (compound (11)) and titanyl phthalocyanine (compound (12)). The cyan ink preferably includes the above indigo pigment. Among these, C.I. Pigment Blue 15:3, C.I. Pigment Blue 15:4, and C.I. Pigment Blue 16 are more preferable.

[Chemical formula 7]

(11)

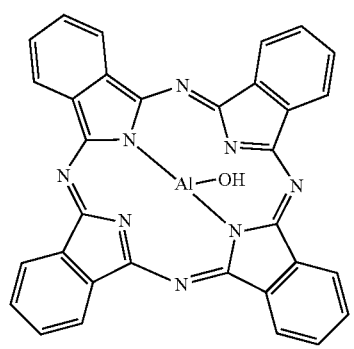

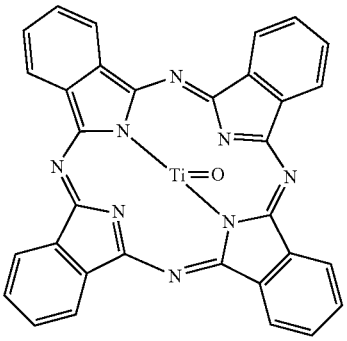
(12)

Examples of the red pigment include C.I. Pigment Red 2. C.I. Pigment Red 32, C.I. Pigment Red 48:1, C.I. Pigment Red 48:2, C.I. Pigment Red 48:3, C.I. Pigment Red 53:1, C.I. Pigment Red 57:1, C.I. Pigment Red 63:1, C.I. Pigment Red 81, C.I. Pigment Red 122, C.I. Pigment Red 144, C.I. Pigment Red 146, C.I. Pigment Red 149, C.I. Pigment Red 150, C.I. Pigment Red 166, C.I. Pigment Red 170, C.I. Pigment Red 174, C.I. Pigment Red 178, C.I. Pigment Red 179, C.I. Pigment Red 184, C.I. Pigment Red 185, C.I. Pigment Red 188, C.I. Pigment Red 190, C.I. Pigment Red 202, C.I. Pigment Red 207, C.I. Pigment Red 208, C.I. Pigment Red 209, C.I. Pigment Red 214, C.I. Pigment Red 220, C.I. Pigment Red 221, C.I. Pigment Red 224, C.I. Pigment Red 238, C.I. Pigment Red 242, C.I. Pigment Red 254, C.I. Pigment Red 255, C.I. Pigment Red 260, C.I. Pigment Red 264, C.I. Pigment Red 269, C.I. Pigment Red 272, and C.I. Pigment Violet 19.

The magenta ink preferably contains the above red pigment. Among these, C.I. Pigment Red 48:3, C.I. Pigment Red 57:1, C.I. Pigment Red 122, C.I. Pigment Red 146, C.I. Pigment Red 185, and C.I. Pigment Violet 19 are more preferable.

Examples of the yellow pigment include C.I. Pigment Yellow 12, C.I. Pigment Yellow 13, C.I. Pigment Yellow 14, C.I. Pigment Yellow 17, C.I. Pigment Yellow 83, C.I. Pigment Yellow 93, C.I. Pigment Yellow 95, C.I. Pigment Yellow 109, C.I. Pigment Yellow 110, C.I. Pigment Yellow 120, C.I. Pigment Yellow 138, C.I. Pigment Yellow 139, C.I. Pigment Yellow 151, C.I. Pigment Yellow 155, C.I. Pigment Yellow 174, C.I. Pigment Yellow 180, C.I. Pigment Yellow 185, and C.I. Pigment Yellow 234.

In the case of use for the yellow ink included in the ink set of the present embodiment, the above yellow pigment may be included.

Examples of the purple pigment include C.I. Pigment Violet 23, C.I. Pigment Violet 32, and C.I. Pigment Violet 37.

An example of the green pigment is C.I. Pigment Green 7.

Examples of the orange pigment include C.I. Pigment Orange 13, C.I. Pigment Orange 34, C.I. Pigment Orange 38, C.I. Pigment Orange 43, and C.I. Pigment Orange 64.

Examples of the special color ink include inks of purple, grass, red, and the like, other than cyan, magenta, and yellow, and the special color ink preferably includes the above purple pigment, green pigment, orange pigment, and the like.

[Inorganic Pigment]

Examples of the inorganic pigment include white inorganic pigments such as titanium oxide, zinc oxide, zinc sulfide, barium sulfate, calcium carbonate, chromium oxide, silica, lithobon, antimony white, and gypsum, black inorganic pigments such as carbon black, iron black, and copper-chromium complex oxide, aluminum particles, mica (mica), bronze powder, chrome vermillion, yellow lead, cadmium yellow, cadmium red, ultramarine, deep blue, bengala, yellow iron oxide, and zircon.

For the black ink, carbon black is preferably used from the viewpoint of excellent tinting strength, covering power, chemical resistance, and weather resistance, and an example thereof is C.I. Pigment Black 7. For the white ink, titanium oxide is preferably used from the viewpoint of excellent tinting strength, covering power, chemical resistance, and weather resistance. Titanium oxide is preferably subjected to a surface treatment with silica and/or alumina from the viewpoint of printing performance.

For each ink, a single pigment or a combination of two or more pigments can be used to obtain a desired color tone.

The average primary particle diameter of the pigment is preferably within a range from 10 to 200 nm and more preferably within a range from 50 to 150 nm.

In order to ensure the concentration and tinting strength of the ink, the content of the pigment in the ink is preferably within a range from 1% to 60% by mass on the basis of the mass of the ink, and preferably within a range from 10% to 90% by mass on the basis of the non-volatile amount of the ink.

<Gravure Ink Set>

A gravure ink set according to one embodiment of the present invention preferably includes the above ink set. Respective color gravure inks constituting the gravure ink set according to the present embodiment are as described above.

(Clear Ink)

In one embodiment, the gravure ink set can further contain a clear ink. A detachable layer formed using the clear ink has a function of being neutralized with an alkaline aqueous solution, dissolving or swelling, and separating from the substrate.

Examples of a basic compound used in the above alkaline aqueous solution include sodium hydroxide (NaOH), potassium hydroxide (KOH), calcium hydroxide (Ca(OH)$_2$), ammonia, barium hydroxide (Ba(OH)$_2$), and sodium carbonate (Na$_2$CO$_3$). At least one selected from the group consisting of sodium hydroxide and potassium hydroxide is more preferable.

Note that in the present description, the process of neutralizing with an alkaline aqueous solution and dissolving or swelling is sometimes referred to as "alkali treatment". In addition, a layer having detachability due to alkali treatment is sometimes referred to as "detachable layer". That is, the printed layer formed using a clear ink having detachability corresponds to a layer having detachability (detachable layer).

[Carboxy Group-Containing Resin]

The clear ink preferably contains a carboxy group-containing resin, which functions as a primer composition for printing on a substrate prior to color inks, for example.

Examples of the carboxy group-containing resin include acrylic resins, urethane resins, polyester resins, amino resins, phenol resins, epoxy resins, and cellulose. Among these, urethane resin is preferable because of its good lamination suitability.

The hydroxyl value of the carboxy group-containing urethane resin is preferably within a range from 1 to 35 mgKOH/g and more preferably from 10 to 30 mgKOH/g. A value of 1 mgKOH/g or more is preferable because detachability due to the alkaline aqueous solution is good, and a value of 35 mgKOH/g or less is preferable because adhesion to substrates is good.

The acid value of the carboxy group-containing urethane resin is preferably 15 mgKOH/g or more, more preferably within a range from 15 to 70 mgKOH/g, and even more preferably from 20 to 50 mgKOH/g. A value of 15 mgKOH/g or more is preferable because detachability due to the alkaline aqueous solution is good, and a value of 70 mgKOH/g or less improves adhesion to substrates and improves the retort resistance when packaging materials are produced. Note that both the hydroxyl value and the acid value are values measured in accordance with JISK0070.

The weight average molecular weight of the carboxy group-containing urethane resin is preferably within a range from 10,000 to 100,000, more preferably from 15,000 to 70,000, and even more preferably from 15,000 to 50,000.

The molecular weight distribution (Mw/Mn) of the carboxy group-containing urethane resin is preferably 6 or less. When the molecular weight distribution is 6 or less, effects caused by excess high molecular weight components, unreacted components, side-reacted components, and other low molecular weight components can be avoided, and the detachability, dryness of the primer composition, and retort resistance are improved.

In addition, it is preferable that the molecular weight distribution be smaller, that is, the molecular weight distribution be sharper because the dissolution and separating action due to the alkaline aqueous solution occurs uniformly and detachability is improved. The molecular weight distribution is more preferably 5 or less, and more preferably 4 or less. The molecular weight distribution is preferably 1.2 or more, and more preferably 1.5 or more.

The above carboxy group-containing urethane resin may have an amine value. When the carboxy group-containing urethane resin has an amine value, the amine value is preferably within a range from 0.1 to 20 mgKOH/g, and more preferably from 1 to 10 mgKOH/g.

The carboxy group-containing urethane resin is not particularly limited, and is preferably a resin obtained by reacting a polyol, a hydroxy acid, and a polyisocyanate, for example. By using a hydroxy acid, the urethane resin can be given an acid value, and detachability can be improved. More preferably, the resin is obtained by reacting a polyol, a hydroxy acid, and a polyisocyanate and further reacting a polyamine.

The clear ink can further contain a polyisocyanate as a curing component. The polyisocyanate is not particularly limited and can be selected from conventionally known polyisocyanates, and examples include aliphatic polyisocyanates and aromatic aliphatic polyisocyanates.

The clear ink may contain another component other than hydroxyl group-containing resins and polyisocyanates, and may contain an additive such as an organic solvent and an anti-blocking agent, in a similar manner to the cyan, yellow, and magenta inks described above.

<Flexographic Ink Set>

A flexographic ink set according to one embodiment of the present invention preferably includes the above ink set. The flexographic inks constituting the flexographic ink set of the present embodiment are as described above.

<Inkjet Ink Set>

An inkjet ink set according to one embodiment of the present invention preferably includes the above ink set. The inkjet inks constituting the inkjet ink set according to the present embodiment are as described above.

<IX> Printed Matter

A printed matter according to one embodiment of the present invention includes a substrate and a printed layer that is formed using a printing ink, an inkjet ink, or an ink set according to the present embodiment. The printed layer is formed by printing each ink on the substrate.

As the ink set, a gravure ink set, an aqueous flexographic ink set, an active energy ray-curable flexographic ink set, and an inkjet ink set are preferable, and a gravure ink set is more preferable.

<Printed Matter with Gravure Ink>

The method for gravure printing is not particularly limited and can be appropriately selected from known methods. The method for gravure printing is roughly divided into front printing and back printing. For example, when the substrate is white paper or white film in front printing, a printed matter can be obtained by performing printing on the substrate in the order of yellow ink, magenta ink, cyan ink, and black ink.

For example, when the substrate is transparent film in back printing, for example, a printed matter is preferably produced by performing printing on the substrate in the order of black ink, cyan ink, magenta ink, yellow ink, and white ink.

When the ink set of the present embodiment includes a clear ink, the clear ink is preferably printed on the substrate before color inks.

The thickness of the printed layer can be appropriately selected depending on the application, the type and number of inks used, and the number of times of layered printing, and is generally within a range of 0.5 to 10 μm.

[Substrate]

Various known substrates can be employed as the substrate. Examples include: polyolefin substrates such as polyethylene and polypropylene; polycarbonate substrates; polyester substrates such as polyethylene terephthalate and polylactic acid; polystyrene substrates; polystyrene-based resins such as and ABS; polyamide substrates such as nylon; polyvinyl chloride substrates; polyvinylidene chloride substrates; cellophane substrates; paper substrates; aluminum foil substrates; and composite substrates made from these composite materials. The substrate may be in the form of a film or a sheet. In particular, a polyester substrate and a polyamide substrate having high glass transition points are preferably used.

The surface of the above substrate may be subjected to vapor deposition treatment with a metal oxide or the like, or coating treatment with a polyvinyl alcohol or the like. Examples of such surface-treated substrates include GL-AE manufactured by Toppan Printing Co., Ltd., and IB-PET-PXB manufactured by Dai Nippon Printing Co., Ltd., wherein aluminum oxide is deposited on the surface. The substrate may be treated with an additive such as an antistatic agent or an ultraviolet inhibitor, or may be subjected to a corona treatment or a low temperature plasma treatment, as necessary.

The thickness of the substrate is not particularly limited and is usually within a range from 5 to 100 μm.

[Detachable Layer]

The printed matter of the present embodiment may contain a detachable layer. The term "detachable layer" herein refers to a material that is neutralized with an alkaline aqueous solution and has the property of being separated from the substrate through dissolution or swelling. The layer having detachability is preferably a layer formed using the clear ink described above, but any other layer may be a detachable layer.

The thickness of the detachable layer is not particularly limited and is usually within a range from 0.5 to 5 µm.

<Printed Matter with Flexographic Ink>

The method for flexographic printing is not particularly limited and can be appropriately selected from known methods. Examples include a two roll system, a doctor system, and a doctor chamber system. In the doctor system and the doctor chamber system, a flexographic ink is supplied to an anilox roll having cells formed on the surface, and the excess flexographic ink on the surface of the anilox roll is scraped off using a doctor blade, and finally printed on a substrate through a resin plate.

As the anilox used for flexographic printing, a ceramic anilox roll having cell engraving, a chrome plated anilox roll, or the like can be used. Cell shapes include a honeycomb pattern, diamond pattern, and helical pattern, and any of these patterns can be used.

As plates used for flexographic printing, a photosensitive resin plate using ultraviolet curing by means of a UV light source, an elastomer material plate using a direct laser engraving method, or the like can be mentioned. Any sleeves and cushion tapes can be used for applying a plate.

The flexographic printing machine includes a CI type multicolor flexographic printing machine, and a unit type multicolor flexographic printing machine. Examples of an ink supply system include a chamber system and a two-roll system, and an appropriate printing machine can be used.

[Substrate]

Various substrates known in the art can be employed as the substrate. Examples include plastic films such as polyethylene, polypropylene, polyethylene terephthalate, and nylon, cellophane, paper, aluminum foil, and films and sheets made of composite materials thereof. The paper substrate is preferably selected from uncoated paper, single-gloss kraft paper treated on one side of the substrate, bleached kraft paper, unbleached kraft paper, and the like. Other substrates such as a plastic film can be the same as those for gravure ink printed matters.

<Printed Matter with Active Energy Ray-Curable Ink>

The printed matter with an active energy ray-curable ink can be obtained by printing the active energy ray-curable ink on a substrate and curing using active energy rays.

The method for curing the active energy ray-curable ink is not particularly limited, and known methods can be used. In particular, an offset printing method and a flexographic printing method are preferable to perform printing on a recording medium. As the recording medium, there is no particular limitation, and a known one can be used. Specific examples include coated paper such as art paper, coated paper, and cast paper, uncoated paper such as high-quality paper, medium-quality paper, and newsprint, synthetic paper such as yupo paper, and plastic films such as PET (polyethylene terephthalate), PP (polypropylene), and OPP (biaxially stretched polypropylene).

The method for curing the active energy ray-curable ink can be performed by irradiating the ink with alpha rays, gamma rays, electron rays, X-rays, ultraviolet rays, visible light, or infrared light, for example, and performing curing. Thereamong, ultraviolet rays and electron rays are preferable, and ultraviolet rays are more preferable. The peak wavelength of active energy rays is preferably within a range from 200 to 600 nm, and more preferably from 350 to 420 nm.

Examples of active energy sources include mercury lamps, xenon lamps, metal hydride lamps, LEDs (light emitting diodes) such as ultraviolet light emitting diodes (UV-LEDs) and ultraviolet laser diodes (UV-LDs), and gas/solid-state lasers.

<X> Packaging Material

A packaging material according to one embodiment of the present invention includes a printed matter in at least part thereof. An examples of the packaging material is a structure in which a printed matter, an adhesive layer, and a sealant substrate are sequentially layered. The packaging material can be suitably used for a packaging having various shapes such as a four-side seal packaging, three-side seal packaging, pillow packaging, stick bag, gusset bag, square bottom bag, standing pouch, deep drawing container, vacuum packaging, skin pack, chuck bag, spout pouch, twist packaging, wrap packaging, shrink packaging, label, liquid paper pack, and paper tray.

Examples of items to be packaged with the packaging material include foodstuffs (e.g., rice, confectionery, seasonings, edible oils and fats, cooked foods, etc.), beverages (e.g., alcoholic beverages, soft drinks, mineral water, etc.), household and cultural goods (e.g., pharmaceuticals, cosmetics, stationery, etc.), and electronic components.

[Adhesive Layer]

Adhesive components usable for forming the above adhesive layer include a thermoplastic resin in addition to a laminate adhesive and a hot-melt adhesive. Among the adhesive components, examples of the laminate adhesive and hot-melt adhesive include polyether-based adhesives, polyurethane-based adhesives, epoxy-based adhesives, polyvinyl acetate adhesives, cellulose-based adhesives, and (meth)acrylic-based adhesives. Among these adhesive components, a polyurethane-based adhesive is preferably used.

The adhesive components can be used alone or in combination of two or more types.

The above polyurethane-based adhesive is a reactive adhesive containing a polyol and a polyisocyanate, and may have detachability. An example of the polyurethane adhesive having detachability is a laminate adhesive described in JP 2020-084130 A.

Such a polyurethane adhesive having detachability preferably has an acid value of 5 to 45 mgKOH/g. Tt is preferable that the polyol constituting the polyurethane-based adhesive include a polyester polyol and that the polyisocyanate include one selected from the group consisting of an aliphatic polyisocyanate and an aromatic aliphatic polyisocyanate.

The thickness of the adhesive layer is usually within a range from 1 to 6 µm.

[Sealant Substrate]

The sealant substrate is a substrate that constitutes the innermost layer of a laminate film, and a resin material that can be fused to each other by heat (having heat sealing property) is used. Examples of the sealant substrate include unstretched polypropylene (CPP), aluminum-deposited unstretched polypropylene film (VMCPP), low-density polyethylene (LDPE), linear low-density polyethylene (LLDPE), and ethylene-vinyl acetate copolymer (EVA).

The thickness of the sealant substrate is not particularly limited. The range from 10 to 200 µm is preferable, and the range from 15 to 150 µm is more preferable, in consideration of processability to the packaging material, heat sealability, and the like. In addition, by providing the sealant substrate with unevenness having a height difference of 5 to 20 µm, it is possible to impart slipperiness to the sealant substrate and tearability of the packaging material.

The method for layering the sealant substrate is not particularly limited. Examples include a method for thermally laminating an adhesive layer and a sealant substrate film (thermal laminate, and dry laminate), and a method for performing lamination by melting a sealant substrate resin, extruding it onto the adhesive layer, and cooling and solidifying it (extrusion lamination method).

EXAMPLES

Hereinafter, the present invention will be described in detail using examples, but the present invention is not limited to the examples. Note that "parts" means "parts by mass" and "%" means "% by mass".

Note that the hydroxyl value, acid value, amine value, and weight average molecular weight of resins used in examples and comparative examples were determined using the following methods.

(Hydroxyl Value)

Determined according to JIS K0070.

(Acid Value)

Determined according to JIS K0070.

(Amine Value)

The amine value is the number of mg of potassium hydroxide equal to the equivalent weight of hydrochloric acid required to neutralize the amino group contained in 1 g of the resin, and is determined according to JIS K0070 using the following method.

An amount of 0.5 to 2 g of the sample was weighed accurately (sample non-volatile fraction: Sg). To the accurately weighed sample, 50 mL of a mixed solution of methanol/methyl ethyl ketone=60/40 (mass ratio) was added and dissolved. Bromophenol blue was added to the obtained solution as an indicator, and the obtained solution was titrated with a 0.2 mol/L ethanolic hydrochloric acid solution (potency: f). The point where the color of the solution changed from green to yellow was taken as the end point, and using the titer (A mL) at this point, the amine value was determined using the formula below.

Amine value=$(A \times f \times 0.2 \times 56.108)/S$[mgKOH/g]

(Weight Average Molecular Weight)

The weight average molecular weight was determined by measuring the molecular weight distribution using a GPC (gel permeation chromatography) apparatus (HLC-8220 manufactured by Tosoh Corporation), and determined as an equivalent molecular weight using a polystyrene as a standard. The measurement conditions are described below.

Column: the following columns were used connected in series.
Guard column HXL-H manufactured by Tosoh Corporation
TSKgelG5000HXL manufactured by Tosoh Corporation
TSKgelG4000HXL manufactured by Tosoh Corporation
TSKgelG3000HXL manufactured by Tosoh Corporation
TSKgelG2000HXL manufactured by Tosoh Corporation
Detector: RI (differential refractometer)
Measurement condition: column temperature: 40° C.
Eluent: tetrahydrofuran
Flow rate: 1.0 mL/min (Glass Transition Temperature)

The glass transition temperature (Tg) was determined using differential scanning calorimetry (DSC). Note that the measurement device used was a DSC8231 manufactured by Rigaku Corporation. The measurement temperature range was −70 to 250° C., the temperature rise rate was 10° C./min, and the midpoint between the endothermic start temperature and the end temperature based on the glass transition in the DSC curve was set to the glass transition temperature.

<I> Pigment Composition and its Characteristic Evaluation
<Production of Isoindoline Compound>

Example 1-1

(Step 1)

To a four-neck flask fitted with a reflux condenser, a dropping funnel, and a stirrer, 800 parts of water, 60 parts of 1,3-diiminoisoindoline, and 120 parts of a 28% ammonia solution were added in this order and stirred. A solution of 42.58 parts of 2-cyano-N-methylacetamide dissolved in 160 parts of water was added dropwise over 30 minutes using a dropping funnel. The mixture was heated and stirred at 30° C. until the 1,3-diiminoisoindoline of the raw material disappeared. The reaction slurry was filtered using a Buchner funnel. The filtrate was added to 1,600 parts of water and stirred at 40° C. for 30 minutes, and unreacted 2-cyano-N-methylacetamide was removed. The slurry was filtered to obtain a non-volatile fraction. Note that the disappearance of 1,3-diiminoisoindoline was confirmed using UPLC (ultra-high-speed high-separation liquid chromatography manufactured by Waters Corporation).

(Step 2)

To a four-neck flask fitted with a reflux condenser, a dropping funnel, and a stirrer, 60 parts equivalent of the above non-volatile fraction and 480 parts of water were added and stirred. To this, 4.32 parts of a 40% methylamine aqueous solution were added and stirred at 40° C. Next, 400 parts of water and 170 parts of 80% acetic acid were added to the flask, and 28.54 parts of barbituric acid were added and stirred at 65° C. The heated solution of this mixture was put into the stirred liquid of the above non-volatile fraction, and further the temperature was increased to 85° C. and stirring was performed to complete the reaction. The heating and stirring was performed until the above non-volatile fraction used as the raw material disappeared. The disappearance of the raw material was confirmed using UPLC.

After that, washing with 2,400 parts of water was performed three times to obtain a non-volatile fraction. The non-volatile fraction was dried in a hot air dryer at 80° C. to obtain 80.09 parts of an isoindoline compound (1-1).

Example 1-2

In step 2 of example 1-1, 4.32 parts of a 40% methylamine aqueous solution were changed to 2.16 parts, and 28.54 parts of barbituric acid were changed to 32.10 parts. Other than this, the reaction operation was performed in the same manner as in example 1-1 to obtain 82.54 parts of an isoindoline compound (1-2).

Example 1-3

In step 2 of example 1-1, 4.32 parts of a 40% methylamine aqueous solution were changed to 1.08 parts, and 28.54 parts of barbituric acid were changed to 33.89 parts. Other than this, the reaction operation was performed in the same manner as in example 1-1 to obtain 83.76 parts of an isoindoline compound (1-3).

Example 1-4

In step 2 of example 1-1, 4.32 parts of a 40% methylamine aqueous solution were changed to 0.22 parts, and 28.54 parts of barbituric acid were changed to 35.31 parts. Other than this, the reaction operation was performed in the same manner as in example 1-1 to obtain 84.74 parts of an isoindoline compound (1-4).

Example 1-5

In step 2 of example 1-1, 4.32 parts of a 40% methylamine aqueous solution were changed to 0.02 parts, and 28.54 parts of barbituric acid were changed to 35.63 parts. Other than this, the reaction operation was performed in the same manner as in example 1-1 to obtain 84.96 parts of an isoindoline compound (1-5).

Example 1-6

In step 2 of example 1-1, 4.32 parts of a 40% methylamine aqueous solution were changed to 0.18 parts of a 70% ethylamine aqueous solution, and 28.54 parts of barbituric acid were changed to 35.31 parts. Other than this, the reaction operation was performed in the same manner as in example 1-1 to obtain 84.77 parts of an isoindoline compound (I-6).

Example 1-7

In step 2 of example 1-1, 4.32 parts of a 40% methylamine aqueous solution were changed to 0.22 parts, and 28.54 parts of barbituric acid were changed to 39.18 parts of 1-methylbarbituric acid. Other than this, the reaction operation was performed in the same manner as in example 1-1 to obtain 88.65 parts of an isoindoline compound (1-7).

Example 1-8

In step 2 of example 1-1, 4.32 parts of a 40% methylamine aqueous solution were changed to 0.22 parts, and 28.54 parts of barbituric acid were changed to 43.05 parts of 1,3-dimethylbarbituric acid. Other than this, the reaction operation was performed in the same manner as in example 1-1 to obtain 91.65 parts of an isoindoline compound (1-8).

Example 1-9

In step 2 of example 1-1, 4.32 parts of a 40% methylamine aqueous solution were changed to 0.22 parts, and 28.54 parts of barbituric acid were changed to 50.78 parts of 1,3-diethylbarbituric acid. Other than this, the reaction operation was performed in the same manner as in example 1-1 to obtain 98.63 parts of an isoindoline compound (1-9).

Example 1-10

In step 2 of example 1-1, 4.32 parts of a 40% methylamine aqueous solution were changed to 0.22 parts, and 28.54 parts of barbituric acid were changed to 80.60 parts of 1,3-dicyclohexylbarbituric acid. Other than this, the reaction operation was performed in the same manner as in example 1-1 to obtain 125.82 parts of an isoindoline compound (1-10).

Example 1-11

In step 2 of example 1-1, 4.32 parts of a 40% methylamine aqueous solution were changed to 0.22 parts, and 28.54 parts of barbituric acid were changed to 77.27 parts of 1,3-diphenylbarbituric acid. Other than this, the reaction operation was performed in the same manner as in example 1-1 to obtain 122.58 parts of an isoindoline compound (1-11).

Example 1-12

In step 2 of example 1-1, 4.32 parts of a 40% methylamine aqueous solution were changed to 0.25 parts of N,N-dimethylethylenediamine, and 28.54 parts of barbituric acid were changed to 35.31 parts. Other than this, the reaction operation was performed in the same manner as in example 1-1 to obtain 84.88 parts of an isoindoline compound (1-24).

Example 1-13

In step 2 of example 1-1, 4.32 parts of a 40% methylamine aqueous solution were changed to 0.45 parts of N-(3-aminopropyl)diethanolamine, and 28.54 parts of barbituric acid were changed to 35.31 parts. Other than this, the reaction operation was performed in the same manner as in example 1-1 to obtain 85.07 parts of an isoindoline compound (1-25).

Example 1-14

In step 2 of example 1-1, 4.32 parts of a 40% methylamine aqueous solution were changed to 0.36 parts of N-octylamine, and 28.54 parts of barbituric acid were changed to 35.31 parts. Other than this, the reaction operation was performed in the same manner as in example 1-1 to obtain 84.99 parts of an isoindoline compound (1-26).

Example 1-15

In step 2 of example 1-1, 4.32 parts of a 40% methylamine aqueous solution were changed to 0.75 parts of stearylamine, and 28.54 parts of barbituric acid were changed to 35.31 parts. Other than this, the reaction operation was performed in the same manner as in example 1-1 to obtain 85.34 parts of an isoindoline compound (1-27).

Example 1-16

In step 2 of example 1-1, 4.32 parts of a 40% methylamine aqueous solution were changed to 0.36 parts of 2-ethylhexylamine, and 28.54 parts of barbituric acid were changed to 35.31 parts. Other than this, the reaction operation was performed in the same manner as in example 1-1 to obtain 84.99 parts of an isoindoline compound (1-28).

Example 1-17

In step 2 of example 1-1, 4.32 parts of a 40% methylamine aqueous solution were changed to 0.20 parts of tert-butylamine, and 28.54 parts of barbituric acid were changed to 35.31 parts. Other than this, the reaction operation was performed in the same manner as in example 1-1 to obtain 84.84 parts of an isoindoline compound (1-29).

Example 1-18

In step 2 of example 1-1, 4.32 parts of a 40% methylamine aqueous solution were changed to 0.28 parts of cyclohexylamine, and 28.54 parts of barbituric acid were changed to 35.31 parts. Other than this, the reaction operation was performed in the same manner as in example 1-1 to obtain 84.91 portions of the isoindoline compound (1-30).

Example 1-19

In step 2 of example 1-1, 4.32 parts of a 40% methylamine aqueous solution were changed to 0.25 parts of 2-ethoxyethylamine, and 28.54 parts of barbituric acid were changed to 35.31 parts. Other than this, the reaction operation was performed in the same manner as in example 1-1 to obtain 84.88 parts of an isoindoline compound (1-31).

The structures included in the isoindoline compounds obtained in examples 1-1 to 1-19 are shown in Table 1. Note that in the table, (1) represents the isoindoline compound (1), and (2) represents the isoindoline compound (2). In the table, H represents hydrogen, Me represents a methyl group, Et represents an ethyl group, Cy represents a cyclohexyl group, Ph represents a phenyl group, Oct represents an n-octyl group, OD represents an octadecyl group, 2EH represents a 2-ethylhexyl group, and t-Bu represents a tert-butyl group.

TABLE 1

| | | (1) | | | | | | | (2) | | |
|---|---|---|---|---|---|---|---|---|---|---|---|
| | Isoindoline compound | R1 | Theoretical molecular weight | Measured value | Content | R2 | R3 | R4 | X | Theoretical molecular weight | Measured value | Content |
| Example 1-1 | (1-1) | Me | 240 | 239 | 20% | H | H | Me | NH | 337 | 336 | 80% |
| Example 1-2 | (1-2) | Me | 240 | 239 | 10% | H | H | Me | NH | 337 | 336 | 90% |
| Example 1-3 | (1-3) | Me | 240 | 239 | 5% | H | H | Me | NH | 337 | 336 | 95% |
| Example 1-4 | (1-4) | Me | 240 | 239 | 1% | H | H | Me | NH | 337 | 336 | 99% |
| Example 1-5 | (1-5) | Me | 240 | 239 | 0.1% | H | H | Me | NH | 337 | 336 | 99.9% |
| Example 1-6 | (1-6) | Et | 254 | 253 | 1% | H | H | Me | NH | 337 | 336 | 99% |
| Example 1-7 | (1-7) | Me | 240 | 239 | 1% | H | Me | Me | NH | 353 | 352 | 99% |
| Example 1-8 | (1-8) | Me | 240 | 239 | 1% | Me | Me | Me | NH | 365 | 364 | 99% |
| Example 1-9 | (1-9) | Me | 240 | 239 | 1% | Et | Et | Me | NH | 393 | 392 | 99% |
| Example 1-10 | (1-10) | Me | 240 | 239 | 1% | Cy | Cy | Me | NH | 502 | 501 | 99% |
| Example 1-11 | (1-11) | Me | 240 | 239 | 1% | Ph | Ph | Me | NH | 489 | 488 | 99% |
| Example 1-12 | (1-24) | B | 297 | 296 | 1% | H | H | Me | NH | 337 | 336 | 99% |
| Example 1-13 | (1-25) | C | 371 | 370 | 1% | H | H | Me | NH | 337 | 336 | 99% |
| Example 1-14 | (1-26) | Oct | 338 | 337 | 1% | H | H | Me | NH | 337 | 336 | 99% |
| Example 1-15 | (1-27) | OD | 479 | 478 | 1% | H | H | Me | NH | 337 | 336 | 99% |
| Example 1-16 | (1-28) | 2EH | 338 | 337 | 1% | H | H | Me | NH | 337 | 336 | 99% |
| Example 1-17 | (1-29) | t-Bu | 282 | 281 | 1% | H | H | Me | NH | 337 | 336 | 99% |
| Example 1-18 | (1-30) | Cy | 308 | 307 | 1% | H | H | Me | NH | 337 | 336 | 99% |
| Example 1-19 | (1-31) | D | 298 | 297 | 1% | H | H | Me | NH | 337 | 336 | 99% |

In the table, B of example 1-12 has a structure (13) below, C of example 1-13 has a structure (14) below, and D of example 1-19 has a structure (15) below.

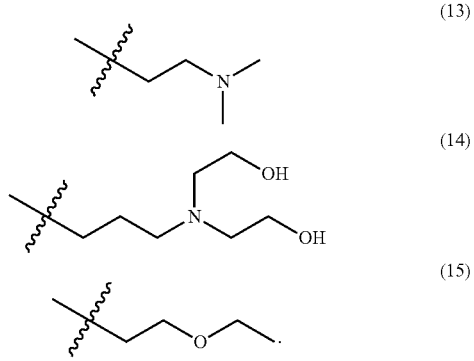

Identification of the obtained isoindoline compounds was performed by comparing the molecular ion peak in the mass spectrum with the mass number (theoretical value) obtained through calculation. Measurement of the molecular ion peak in the mass spectrum was performed using ACQUITY UPLS H-Class (column used: ACQUITY UPLC BEH C18 Column 130A, 1.7 μm, 2.1 mm×50 mm), Ms TAP XEVO TQD manufactured by Waters Corporation.

For the isoindoline compounds (examples 1-1 to 1-19), table 1 shows the theoretical molecular weights and respective measured values obtained through mass spectrometry. Due to the nature of the measurement, H (protons) of the compound are eliminated, so if the measured value is the mass number of the theoretical molecular weight − (minus) 1, the compounds match.

Production Example 1-1

(Step 1)

To a four-neck flask fitted with a reflux condenser, a dropping funnel, and a stirrer, 800 parts of water, 60 parts of 1,3-diiminoisoindoline, and 120 parts of a 28% ammonia solution were added in this order and stirred. A solution of 42.58 parts of 2-cyano-N-methylacetamide dissolved in 160 parts of water was added dropwise over 30 minutes using a dropping funnel. The mixture was heated and stirred at 30° C. until the 1,3-diiminoisoindoline of the raw material disappeared. The reaction slurry was filtered using a Buchner funnel. The filtrate was added to 1,600 parts of water and stirred at 40° C. for 30 minutes, and unreacted 2-cyano-N-methylacetamide was removed. The slurry was filtered to obtain a non-volatile fraction. Note that the disappearance of 1,3-diiminoisoindoline was confirmed using UPLC (ultra-high-speed high-resolution liquid chromatography manufactured by Waters Corporation).

(Step 2)

To a four-neck flask fitted with a reflux condenser, a dropping funnel, and a stirrer, 60 parts equivalent of the above non-volatile fraction and 480 parts of water were added and stirred. In contrast, to a glass flask, 461 parts of water, 194 parts of 80% acetic acid, and 35.67 parts of barbituric acid were added and stirred at 65° C. The heated solution of this mixture was put into the stirred liquid of the above non-volatile fraction, and further the temperature was increased to 85° C. and stirring was performed to complete the reaction. The heating and stirring was performed until the above non-volatile fraction used as the raw material disappeared. The disappearance of the raw material was confirmed using UPLC.

After that, washing with 2,400 parts of water was performed three times to obtain a non-volatile fraction. The non-volatile fraction was dried in a hot air dryer at 80° C. to obtain 84.91 parts of an isoindoline compound (1-12).

Production Example 1-2

An amount of 43.48 parts of barbituric acid in production example 1-1 was changed to 39.57 parts of 1-methylbarbituric acid. Other than this, the reaction operation was performed all in the same manner to obtain 88.94 parts of an isoindoline compound (1-13).

Production Example 1-3

An amount of 43.48 parts of barbituric acid in production example 1-1 was changed to 43.48 parts of 1,3-dimethylbarbituric acid. Other than this, the reaction operation was performed all in the same manner as in production example 1-1 to obtain 91.96 parts of an isoindoline compound (1-14).

Production Example 1-4

An amount of 43.48 parts of barbituric acid in production example 1-1 was changed to 51.29 parts of 1,3-diethylbarbituric acid. Other than this, the reaction operation was performed all in the same manner as in production example 1-1 to obtain 99.02 parts of an isoindoline compound (1-15).

Production Example 1-5

An amount of 43.48 parts of barbituric acid in production example 1-1 was changed to 81.42 parts of 1,3-dicyclohexylbarbituric acid. Other than this, the reaction operation was performed all in the same manner as in production example 1-1 to obtain 126.48 parts of an isoindoline compound (1-16).

Production Example 1-6

An amount of 43.48 parts of barbituric acid in production example 1-1 was changed to 78.05 parts of 1,3-diphenylbarbituric acid. Other than this, the reaction operation was performed all in the same manner as in production example 1-1 to obtain 123.20 parts of an isoindoline compound (1-17).

The structures included in the isoindoline compounds obtained in production examples 1-1 to 1-6 are shown in Table 2. Note that in the table, (1) represents the isoindoline compound (1), and (2) represents the isoindoline compound (2). In the table, H represents hydrogen, Me represents a methyl group, Et represents an ethyl group, Cy represents a cyclohexyl group, and Ph represents a phenyl group.

TABLE 2

| | Isoindoline compound | (1) | | | | (2) | | | | | | |
| | | R1 | Theoretical molecular weight | Measured value | Content | R2 | R3 | R4 | X | Theoretical molecular weight | Measured value | Content |
| --- | --- | --- | --- | --- | --- | --- | --- | --- | --- | --- | --- | --- |
| Production example 1-1 | (1-12) | — | — | — | — | H | H | Me | NH | 337 | 336 | 100% |
| Production example 1-2 | (1-13) | — | — | — | — | H | Me | Me | NH | 353 | 352 | 100% |
| Production example 1-3 | (1-14) | — | — | — | — | Me | Me | Me | NH | 365 | 364 | 100% |
| Production example 1-4 | (1-15) | — | — | — | — | Et | Et | Me | NH | 393 | 392 | 100% |
| Production example 1-5 | (1-16) | — | — | — | — | Cy | Cy | Me | NH | 502 | 501 | 100% |
| Production example 1-6 | (1-17) | — | — | — | — | Ph | Ph | Me | NH | 489 | 488 | 100% |

Identification of the obtained isoindoline compounds was performed by comparing the molecular ion peak in the mass spectrum with the mass number (theoretical value) obtained through calculation in the same manner as described above.

Production Example 1-7

To a four-neck flask fitted with a reflux condenser, a dropping funnel and a stirrer, 800 parts of water and 800 parts of 80% acetic acid were added and stirred. To this, 111.18 parts of barbituric acid were added and stirred at 65° C. to obtain a solution in which the barbituric acid was dissolved. In contrast, to a glass flask, 800 parts of water and 60.00 parts of 1,3-diiminoisoindoline were added and stirred at 30° C. The stirred liquid was put into the above solution, and further the temperature was increased to 85° C. and stirring was performed to complete the reaction. The heating and stirring was performed until the above non-volatile fraction used as the raw material disappeared. The disappearance of the raw material was confirmed using UPLC.

After that, washing with 2,000 parts of water was performed three times to obtain a non-volatile fraction. The non-volatile fraction was dried in a hot air dryer at 80° C. to obtain 133.59 parts of an isoindoline compound (1-18).

Production Example 1-8

An amount of 111.18 parts of barbituric acid in production example 1-7 was changed to 135.53 parts of 1,3-dimethylbarbituric acid. Other than this, the reaction operation was performed all in the same manner as in production example 1-7 to obtain 154.00 parts of an isoindoline compound (1-19).

The structures included in the isoindoline compounds obtained in production examples 1-7 and 1-8 are shown in Table 3. Note that in the table, (2) represents the isoindoline compound (2). In the table, H represents hydrogen and Me represents a methyl group.

TABLE 3

| | Isoindoline compound | R2 | R3 | R5 | R6 | Theoretical molecular weight | Measured value | Content |
|---|---|---|---|---|---|---|---|---|
| Production example 1-7 | (1-18) | H | H | H | H | 367 | 366 | 100% |
| Production example 1-8 | (1-19) | Me | Me | Me | Me | 423 | 422 | 100% |

Identification of the obtained isoindoline compounds was performed by comparing the molecular ion peak in the mass spectrum with the mass number (theoretical value) obtained through calculation.

Production Example 1-9

To a four-neck flask fitted with a reflux condenser, a dropping funnel, and a stirrer, 800 parts of water, 60 parts of 1,3-diiminoisoindoline, and 120 parts of a 28% ammonia solution were added in this order and stirred. A solution of 80.38 parts of 2-(4-oxo-3,4-dihydroxoline-2-yl) acetonitrile dissolved in 160 parts of water was added dropwise over 30 minutes using a dropping funnel. The mixture was heated and stirred at 30° C. until the 1,3-diiminoisoindoline of the raw material disappeared. The reaction slurry was filtered using a Buchner funnel to obtain a non-volatile fraction. Note that the disappearance of the raw material was confirmed using UPLC.

To a four-neck flask fitted with a reflux condenser, a dropping funnel, and a stirrer, 480 parts of water and 162 parts of 80% acetic acid were added relative to the non-volatile fraction 60 parts equivalent obtained in the previous preparation as the raw material, and stirred. In contrast, to a flask, 480 parts of water and 162 parts of 80% acetic acid were added, and 29.44 parts of barbituric acid were added thereto and stirred at 65° C. The heated solution of this mixture was put into the stirred liquid of the above non-volatile fraction, and further the temperature was increased to 85° C. and stirring was performed to complete the reaction. The heating and stirring was performed until the above non-volatile fraction used as the raw material disappeared. The disappearance of the raw material was confirmed using UPLC.

After that, washing with 2,400 parts of water was performed three times to obtain a non-volatile fraction. The non-volatile fraction was dried in a hot air dryer at 80° C. to obtain 75.20 parts of an isoindoline compound (1-20).

The structure included in the isoindoline compound obtained in production example 1-9 is shown in Table 4. In the table, (2) represents the isoindoline compound (2). In the table, H represents hydrogen.

Identification of the obtained isoindoline compound was performed by comparing the molecular ion peak in the mass spectrum with the mass number (theoretical value) obtained through calculation.

Production Example 1-10

(Step 1)

To a four-neck flask fitted with a reflux condenser, a dropping funnel, and a stirrer, 800 parts of water, 60 parts of 1,3-diiminoisoindoline, and 120 parts of a 28% ammonia water were added in this order and stirred. A solution of 42.58 parts of 2-cyano-N-methylacetamide dissolved in 160 parts of water was added dropwise over 30 minutes using a dropping funnel. The mixture was heated and stirred at 30° C. until the 1,3-diiminoisoindoline of the raw material disappeared. The reaction slurry was filtered using a Buchner funnel to obtain a non-volatile fraction. Note that the disappearance of 1,3-diiminoisoindoline was confirmed using UPLC (ultra-high-speed high-separation liquid chromatography manufactured by Waters Corporation).

(Step 2)

To a four-neck flask fitted with a reflux condenser, a dropping funnel, and a stirrer, 60 parts equivalent of the above non-volatile fraction and 480 parts of water were added and stirred. To this, 53.54 parts of a 40% methylamine aqueous solution were added and stirred at 40° C. The stirring was performed until the above non-volatile fraction used as the raw material disappeared. The disappearance of the raw material was confirmed using UPLC.

After that, washing with 2,400 parts of water was performed three times to obtain a non-volatile fraction. The non-volatile fraction was dried in a hot air dryer at 80° C. to obtain 58.62 parts of an isoindoline compound (1-21).

Production Example 1-11

The same reaction operation as in production example 1 described in JP 2006-206737 A was performed to obtain an isoindoline compound (1-22).

TABLE 4

| | Isoindoline compound | R2 | R3 | R7 | R8 | R9 | R10 | R11 | Theoretical molecular weight | Measured value | Content |
|---|---|---|---|---|---|---|---|---|---|---|---|
| Production example 1-9 | (1-20) | H | H | H | H | H | H | H | 424 | 423 | 100% |

Production Example 1-12

The same reaction operation as in production example 2 described in JP 2006-206737 A was performed to obtain an isoindoline compound (1-23).

The structures included in the isoindoline compounds obtained in examples 1-10 to 1-12 are shown in Table 5.

TABLE 5

| | Isoindoline compound | Structure | Theoretical molecular weight | Measured value | Content |
|---|---|---|---|---|---|
| Production example 1-10 | (1-21) | | 240 | 239 | 100% |
| Production example 1-11 | (1-22) | | 226 | 225 | 100% |
| Production example 1-12 | (1-23) | | 227 | 226 | 100% |

Identification of the obtained isoindoline compounds was performed by comparing the molecular ion peak in the mass spectrum with the mass number (theoretical value) obtained through calculation.

Example 2-1

One part of the isoindoline compound (1-21), 99 parts of the isoindoline compound (1-12), 1,000 parts of sodium chloride, and 150 parts of diethylene glycol were charged in a stainless steel one gallon kneader (manufactured by INOUE MFG., INC.) and kneaded at 60° C. for 8 hours (h). The kneaded mixture was then put into hot water at about 70° C., stirred for 1 hour to form a slurry, filtered and washed with water to remove salt and diethylene glycol, dried at 80° C. for one day and night, and pulverized to obtain 95 parts of a micronized isoindoline compound (2-1).

Examples 2-2 to 2-5

One part of the isoindoline compound (1-21) was changed to raw materials A with amounts to be charged as shown in Table 6, and 99 parts of the isoindoline compound (1-12) were changed to raw materials B with amounts to be charged as shown in Table 6. Other than this, isoindoline compounds (2-2) to (2-5) were obtained in the same manner as in example 2-1 in the amounts shown in Table 6.

Production Examples 2-1 to 2-5

One part of the isoindoline compound (1-21) and 99 parts of the isoindoline compound (1-12) were changed to raw materials B with amounts to be charged as shown in Table 6. Other than this, isoindoline compounds (2-6) to (2-10) were obtained in the same manner as in example 2-1 in the amounts shown in Table 6.

TABLE 6

| | Raw material A | | | Raw material B | |
|---|---|---|---|---|---|
| | Isoindoline compound | Isoindoline compound | Charged amount (part) | Isoindoline compound | Charged amount (part) | Generated amount (part) |
| Example 2-1 | (2-1) | (1-21) | 1 | (1-12) | 99 | 95 |
| Example 2-2 | (2-2) | (1-21) | 1 | (1-14) | 99 | 95 |
| Example 2-3 | (2-3) | (1-21) | 1 | (1-18) | 99 | 95 |
| Example 2-4 | (2-4) | (1-21) | 1 | (1-19) | 99 | 95 |
| Example 2-5 | (2-5) | (1-21) | 1 | (1-20) | 99 | 95 |
| Production example 2-1 | (2-6) | — | — | (1-12) | 100 | 95 |
| Production example 2-2 | (2-7) | — | — | (1-14) | 100 | 95 |
| Production example 2-3 | (2-8) | — | — | (1-18) | 100 | 95 |
| Production example 2-4 | (2-9) | — | — | (1-19) | 100 | 95 |
| Production example 2-5 | (2-10) | — | — | (1-20) | 100 | 95 |

Example 3-1

An amount of 0.4 parts of the isoindoline compound (1-21) and 36.6 parts of the isoindoline compound (1-12) were gradually added to 1,000 parts of 98% sulfuric acid under stirring, and the mixture was dissolved through stirring for 4 hours. The solution was then gradually added dropwise to 8,000 parts of water at 10° C. over 30 minutes under stirring, filtered, washed with warm water, and dried at 80° C. to obtain 38.5 parts of a micronized isoindoline compound (3-1).

<II> Colorant compositions and characteristics evaluations Using obtained pigment compositions, colorant compositions for various applications were prepared, and physical properties were evaluated.

<1> Evaluation of Compositions for Molding

Examples A-1 to A-19, Comparative Examples A-1 to A-11

[Hue Evaluation]

Using obtained isoindoline compounds and a high-density polyethylene resin (product name: Hizex 2208J manufactured by Prime Polymer Co., Ltd.), melt kneading was performed at a temperature of 200° C. using a biaxial extruder, injection molding was performed under the condition that the temperature in a barrel was 200° C., and tinting strength was adjusted to be a concentration of SD1/3, and 11 colored plates of 3 mm thickness were produced. Note that injection molding was performed under the condition that the residence time of the composition in the barrel was shortened as much as possible. The isoindoline compounds used are shown in Table 7. In order to detect the average color difference, color measurement was performed for each of six colored plates, 6th to 11th, using a colorimeter (manufactured by KONICA MINOLTA, INC., CM-700d) capable of measuring the total luminous flux, and the average of the obtained colorimetric values was used as a control (reference value). The colorimetric values were compared with a colored plate using only the isoindoline compound (2) and color differences ($\Delta E^*$) were determined, and evaluation was performed according to the following criteria. Specifically, evaluation was performed according to the criteria described in Table 7.

(Evaluation Criteria)
5: $\Delta E^*$ is less than 1.0. Very good
4: $\Delta E^*$ is 1.0 or more and less than 2.0. Good
3: $\Delta E^*$ is 2.0 or more and less than 3.0. Practical
2: $\Delta E^*$ is 3.0 or more and less than 5.0. Practical
1: $\Delta E^*$ is 5.0 or more. Not practical
-: Not measured

[Heat Resistance Evaluation]

The heat resistance test was conducted in accordance with German Industrial Standard DIN12877-1. After adjusting the molding condition so that the residence time in the barrel was 5 minutes, II colored plates were each formed at 300° C. The color measurement was performed for the obtained six colored plates, 6th to 11th, and the average value of the colorimetrical values was calculated. The color difference ($\Delta E^*$) between the control and the measured values of the plates formed at 300° C. was determined and evaluated according to the following criteria. The results are shown in Table 7. Note that the heat resistance is good as the color difference is smaller.

(Evaluation Criteria)
5: $\Delta E^*$ is less than 2.0. Very good
4: $\Delta E^*$ is 2.0 or more and less than 4.5. Good
3: $\Delta E^*$ is 4.5 or more and less than 7.5. Practical
2: $\Delta E^*$ is 7.5 or more and less than 10.0. Practical
1: $\Delta E^*$ is 10.0 or more. Not practical
-: Not evaluated

TABLE 7

| | Isoindoline compound | Reference comparative example | Hue evaluation $\Delta E^*$ | Heat resistance test $\Delta E^*$ |
|---|---|---|---|---|
| Example A-1 | (1-1) | Comparative example A-1 | 3 | 5 |
| Example A-2 | (1-2) | | 4 | 5 |
| Example A-3 | (1-3) | | 4 | 5 |
| Example A-4 | (1-4) | | 5 | 5 |
| Example A-5 | (1-5) | | 5 | 4 |
| Example A-6 | (1-6) | | 5 | 5 |
| Example A-7 | (1-7) | Comparative example A-2 | 4 | 4 |
| Example A-8 | (1-8) | Comparative example A-3 | 5 | 5 |
| Example A-9 | (1-9) | Comparative example A-4 | 5 | 5 |
| Example A-10 | (1-10) | Comparative example A-5 | 5 | 5 |

TABLE 7-continued

| | Isoindoline compound | Reference comparative example | Hue evaluation ΔE* | Heat resistance test ΔE* |
|---|---|---|---|---|
| Example A-11 | (1-11) | Comparative example A-6 | 5 | 5 |
| Example A-12 | (1-24) | Comparative example A-1 | 5 | 5 |
| Example A-13 | (1-25) | Comparative example A-1 | 5 | 5 |
| Example A-14 | (2-1) | Comparative example A-7 | 5 | 5 |
| Example A-15 | (2-2) | Comparative example A-8 | 5 | 5 |
| Example A-16 | (2-3) | Comparative example A-9 | 4 | 4 |
| Example A-17 | (2-4) | Comparative example A-10 | 4 | 4 |
| Example A-18 | (2-5) | Comparative example A-11 | 4 | 4 |
| Example A-19 | (3-1) | Comparative example A-1 | 5 | 5 |
| Comparative example A-1 | (1-12) | | Reference | 1 |
| Comparative example A-2 | (1-13) | | Reference | 1 |
| Comparative example A-3 | (1-14) | | Reference | 1 |
| Comparative example A-4 | (1-15) | | Reference | 1 |
| Comparative example A-5 | (1-16) | | Reference | 1 |
| Comparative example A-6 | (1-17) | | Reference | 1 |
| Comparative example A-7 | (2-6) | | Reference | 1 |
| Comparative example A-8 | (2-7) | | Reference | 1 |
| Comparative example A-9 | (2-8) | | Reference | 1 |
| Comparative example A-10 | (2-9) | | Reference | 1 |
| Comparative example A-11 | (2-10) | | Reference | 1 |

(Example A-20) [Production of Molded Body]

One part of the isoindoline compound (1-4) and 1,000 parts of a polypropylene resin (product name: Prime Polypro J105, manufactured by Prime Polymer Co., Ltd.) were melt kneaded at 220° C. using a biaxial extruder, and the mixture was then cut with a pelletizer to obtain a pellet-like composition for molding. The obtained composition for molding was then melt kneaded at 220° C., and injection molding was performed using an injection molding machine with a molding temperature set at 220° C. and a die temperature set at 40° C. to obtain a molded body (plate) with a thickness of 1 mm.

As a result of visual observation of the molded body, no coarse grains were observed even when looked through in the light, and a yellow plate with a good degree of coloring was obtained.

(Example A-21) [Production of Molded Body]

An amount of 0.5 parts of the isoindoline compound (1-4) and 1,000 parts of a pre-dried polyethylene terephthalate resin (product name: Vylopet EMC-307, manufactured by TOYOBO Co., Ltd.) were melt kneaded at 275° C. using a biaxial extruder, and then cut with a pelletizer to obtain a pellet-like composition for molding. The obtained composition for molding was then melt kneaded and injection molding was performed using an injection molding machine with a molding temperature set at 275° C. and a die temperature set at 85° C. to obtain a molded body (plate) with a thickness of 3 mm.

As a result of visual observation of the molded body, no coarse grains were observed even when looked through in the light, and a yellow plate with a good degree of coloring was obtained.

<2> Toner Evaluation (Example A-22) [Production of Negatively Charged Toner]

An amount of 2,500 parts of the isoindoline compound (1-4) and 2,500 parts of a polyester resin (product name: M-325, manufactured by Sanyo Chemical Industries, Ltd.) were kneaded using a pressure kneader at 120° C. for 15 minutes. The obtained mixture was then removed from the pressure kneader and further kneaded using three rolls with a roll temperature of 95° C. A colorant composition was obtained by coarsely grinding the obtained mixture to 10 mm or less after cooling.

An amount of 500 parts of the colorant composition, 4,375 parts of a polyester resin, 50 parts of a calcium salt compound (charge control agent) of 3,5-di-tert-butyl salicylic acid, and 75 parts of an ethylene homopolymer (release agent, molecular weight 850, Mw/Mn=1.08, melting point 107° C.) were mixed (3,000 rpm for 3 minutes) using a Henschel mixer with a volume of 20 L, and then melt kneaded using a twin-screw kneading extruder at a discharge temperature of 120° C. The kneaded material was then cooled and solidified, and then coarsely ground using a hammer mill. The obtained coarsely ground material was then finely ground using a type I jet mill (IDS-2), and then classified to obtain toner base particles.

Then, 2,500 parts of the toner base particles obtained above and 12.5 parts of hydrophobic titanium oxide (STT-30 A, manufactured by Titan Kogyo, Ltd.) were mixed using a Henschel mixer with a volume of 10 L to obtain a negatively charged toner 1.

In contrast, as a comparison object, a negatively charged toner 2 was obtained in the same manner as in example A-22 except that the isoindoline compound (1-4) of example A-22 was changed to the isoindoline compound (1-12).

The obtained negatively charged toner 1 and negatively charged toner 2 were respectively sliced into 0.9 μm thick slices using a microtome to form samples. Then, the dispersion state of the pigment was observed using a transmission electron microscope for each sample. As a result, it was confirmed that the negatively charged toner 1 using the compound of the isoindoline compound (1-4) has the pigment distributed more uniformly and has better dispersibility than the negatively charged toner 2 using the isoindoline compound (1-12).

<3> Coating Material Evaluation
<3-1> Preparation of Solvent-Based Coating Material
1. Preparation of Base Coating Material (Example B-1) [Preparation of Base Coating Material 1]

First, the following raw materials and 230 parts of steel beads were charged in a 225 ml glass bottle and dispersed using a paint shaker manufactured by Red Devil, Inc. for 60 minutes to obtain a mixture.

Isoindoline compound (1-1): 19 parts
Acrylic resin (manufactured by DIC Corporation, ACRYDIC 47-712): 7.7 parts
Dispersion solvent (a mixed solvent of toluene, xylene, butyl acetate, and T-SOL150 FLUID manufactured by ENEOS Corporation in a mass ratio of 3:3:2:2): 40.7 parts Then, 75.4 parts of ACRYDIC 47-712 and 17.2 parts of a melamine resin (manufactured by DIC Corporation, AMIDIR L-117-60) were added to the above mixture, and the mixture was dispersed for another 10 minutes to obtain a dispersion.

The steel beads were then removed from the above dispersion to obtain a base coating material 1 of the isoindoline compound (1-1).

(Examples B-2 to B-19, Comparative Examples B-1 to B-11) [Production of Base Coating Materials 2 to 30]

Base coating materials 2 to 30 were obtained in the same manner as in example B-1 except that in the preparation method of the base coating material 1 described in example B-1, the isoindoline compound (1-1) was changed to isoindoline compounds described in Table 8.

TABLE 8

|  | Base coating material | Isoindoline compound |
| --- | --- | --- |
| Example B-1 | Base coating material 1 | (1-1) |
| Example B-2 | Base coating material 2 | (1-2) |
| Example B-3 | Base coating material 3 | (1-3) |
| Example B-4 | Base coating material 4 | (1-4) |
| Example B-5 | Base coating material 5 | (1-5) |
| Example B-6 | Base coating material 6 | (1-6) |
| Example B-7 | Base coating material 7 | (1-7) |
| Example B-8 | Base coating material 8 | (1-8) |
| Example B-9 | Base coating material 9 | (1-9) |
| Example B-10 | Base coating material 10 | (1-10) |
| Example B-11 | Base coating material 11 | (1-11) |
| Example B-12 | Base coating material 12 | (1-24) |
| Example B-13 | Base coating material 13 | (1-25) |
| Example B-14 | Base coating material 14 | (2-1) |
| Example B-15 | Base coating material 15 | (2-2) |
| Example B-16 | Base coating material 16 | (2-3) |
| Example B-17 | Base coating material 17 | (2-4) |
| Example B-18 | Base coating material 18 | (2-5) |
| Example B-19 | Base coating material 19 | (3-1) |
| Comparative example B-1 | Base coating material 20 | (1-12) |
| Comparative example B-2 | Base coating material 21 | (1-13) |
| Comparative example B-3 | Base coating material 22 | (1-14) |
| Comparative example B-4 | Base coating material 23 | (1-15) |
| Comparative example B-5 | Base coating material 24 | (1-16) |
| Comparative example B-6 | Base coating material 25 | (1-17) |
| Comparative example B-7 | Base coating material 26 | (2-6) |
| Comparative example B-8 | Base coating material 27 | (2-7) |
| Comparative example B-9 | Base coating material 28 | (2-8) |
| Comparative example B-10 | Base coating material 29 | (2-9) |
| Comparative example B-11 | Base coating material 30 | (2-10) |

2. Preparation of White Coating Material

The following relates to an example of preparation of a white coating material used for a solid base coating material.

First, the following raw materials and 900 parts of steel beads were charged in a 900 ml glass bottle and dispersed using a paint shaker manufactured by Red Devil, Inc. for 60 minutes to obtain a dispersion.

Titanium oxide (titanium oxide manufactured by ISHIHARA SANGYO KAISHA, LTD., TIPAQUE CR90): 66.6 parts
Acrylic resin (manufactured by DIC Corporation, ACRYDIC 47-712): 101.7 parts
Melamine resin (manufactured by DIC Corporation, AMIDIR L-117-60): 21.3 parts
Dispersed solvent (a mixed solvent of toluene, xylene, butyl acetate, and T-SOL150 FLUID manufactured by ENEOS Corporation in a mass ratio of 3:3:2:2): 20.9 parts The steel beads were then removed from the above dispersion to obtain a white coating material.

3. Preparation of Solid Base Coating Material (Example C-1) [Production of Solid Base Coating Material 1]

The following components were stirred using a high-speed stirrer to obtain a solid base coating material 1.
Base coating material 1 produced in example B-1: 10 parts
Obtained white coating material: 31.9 parts (Examples C-2 to C-19, Comparative Examples C-1 to C-11) [Production of Solid Base Coating Materials 2 to 30]

Solid base coating materials 2 to 30 were obtained in the same manner as in example C-1 except that the base coating material 1 of example C-1 was changed to base coating materials 2 to 30, respectively.

Note that the isoindoline compounds of the base coating materials used in the solid base coating materials prepared in each example and comparative example are shown in Table 9.

TABLE 9

|  | Solid base coating material | Base coating material | Isoindoline compound |
| --- | --- | --- | --- |
| Example C-1 | Solid base coating material 1 | base coating material 1 | (1-1) |
| Example C-2 | Solid base coating material 2 | base coating material 2 | (1-2) |
| Example C-3 | Solid base coating material 3 | base coating material 3 | (1-3) |
| Example C-4 | Solid base coating material 4 | base coating material 4 | (1-4) |
| Example C-5 | Solid base coating material 5 | base coating material 5 | (1-5) |
| Example C-6 | Solid base coating material 6 | base coating material 6 | (1-6) |

TABLE 9-continued

|  | Solid base coating material | Base coating material | Isoindoline compound |
|---|---|---|---|
| Example C-7 | Solid base coating material 7 | base coating material 7 | (1-7) |
| Example C-8 | Solid base coating material 8 | base coating material 8 | (1-8) |
| Example C-9 | Solid base coating material 9 | base coating material 9 | (1-9) |
| Example C-10 | Solid base coating material 10 | base coating material 10 | (1-10) |
| Example C-11 | Solid base coating material 11 | base coating material 11 | (1-11) |
| Example C-12 | Solid base coating material 12 | base coating material 12 | (2-1) |
| Example C-13 | Solid base coating material 13 | base coating material 13 | (2-2) |
| Example C-14 | Solid base coating material 14 | base coating material 14 | (2-3) |
| Example C-15 | Solid base coating material 15 | base coating material 15 | (2-4) |
| Example C-16 | Solid base coating material 16 | base coating material 16 | (2-5) |
| Example C-17 | Solid base coating material 17 | base coating material 17 | (3-1) |
| Example C-18 | Solid base coating material 18 | base coating material 18 | (1-24) |
| Example C-19 | Solid base coating material 19 | base coating material 19 | (1-25) |
| Comparative example C-1 | Solid base coating material 20 | base coating material 20 | (1-12) |
| Comparative example C-2 | Solid base coating material 21 | base coating material 21 | (1-13) |
| Comparative example C-3 | Solid base coating material 22 | base coating material 22 | (1-14) |
| Comparative example C-4 | Solid base coating material 23 | base coating material 23 | (1-15) |
| Comparative example C-5 | Solid base coating material 24 | base coating material 24 | (1-16) |
| Comparative example C-6 | Solid base coating material 25 | base coating material 25 | (1-17) |
| Comparative example C-7 | Solid base coating material 26 | base coating material 26 | (2-6) |
| Comparative example C-8 | Solid base coating material 27 | base coating material 27 | (2-7) |
| Comparative example C-9 | Solid base coating material 28 | base coating material 28 | (2-8) |
| Comparative example C-10 | Solid base coating material 29 | base coating material 29 | (2-9) |
| Comparative example C-11 | Solid base coating material 30 | base coating material 30 | (2-10) |

4. Preparation of Top Coat Clear Coating Material

The following raw materials were stirred using a high-speed stirrer to obtain a top coat clear coating material.
  Acrylic resin (manufactured by DIC Corporation, ACRYDIC 44-179): 120 parts
  Melamine resin (manufactured by DIC Corporation, AMIDIR L117-60): 30 parts
  Dilution solvent (a mixed solvent of toluene, xylene, T-SOL150 FLUID manufactured by ENEOS Corporation, ethyl 3-ethoxypropionate, and ethyl acetate in a mass ratio of 3:2:2:1:2): 50 parts 5. Production of Solid Base Coated Plates and Weather Resistance Evaluation (Example D-1) [Production of Solid Base Coated Plate 1]

The solid base coating material 1 was sprayed with a spray gun and coated on a steel plate whose surface was adjusted with sandpaper #1,000. In order to adjust the viscosity to make it easy to spray, a dilution solvent (a mixed solvent of toluene, xylene, T-SOL150 FLUID manufactured by ENEOS Corporation, ethyl 3-ethoxypropionate, and ethyl acetate in a mass ratio of 3:2:2:1:2) was appropriately mixed with the solid base coating material in the same mass as a guide.

The coating was performed in nine times, and then a topcoat clear coating material was sprayed in six times.

Drying was performed at 25° C. for 8 hours and then performed at 140° C. for 30 minutes to obtain a solid base coated plate 1.

(Examples D-2 to D-19, Comparative Examples D-1 to D-11) [Production of Solid Base Coated Plates 2 to 30]

Solid base coated plates 2 to 30 were obtained in the same manner as in example D-1 except that the solid base coating material 1 of example D-1 was respectively changed to solid base coating materials 2 to 30.

[Weather Resistance Evaluation]

The obtained solid base coated plates 1 to 30 were subjected to a weather resistance test according to the following.

The weather resistance test was performed using an ultra-acceleration type weather resistance tester (EYE SUPER XENON TESTER SUV-W151 manufactured by IWASAKI ELECTRIC CO., LTD.) with one cycle of luminous intensity 90 mW/cm$^2$, irradiation (day) conditions: 12 hours, temperature 63° C., and humidity 70%, and irradiation suspension (night) conditions: 12 hours, temperature 70° C., and humidity 99%, under the conditions of 48 hours (two cycles of 12 hours day and night) and 96 hours (four cycles of 12 hours day and night). The coated plates before and after the weather resistance test were visually observed, and the weather resistance was evaluated according to the following criteria. The results are shown in Table 10. It is thought that the weather resistance is better as the color change is smaller, and evaluations of "5", "4", "3", and "2" in the following evaluation criteria are thought to be a practical level.

(Evaluation Criteria)
  5: $\Delta E^*$ is less than 4.0. Very good
  4: $\Delta E^*$ is 4.0 or more and less than 6.0. Good
  3: $\Delta E^*$ is 6.0 or more and less than 7.5. Practical
  2: $\Delta E^*$ is 7.5 or more and less than 10.0. Practical
  1: $\Delta E^*$ is 10.0 or more. Not practical
  -: Not measured

TABLE 10

|  |  | Weather resistance | |
|---|---|---|---|
|  | Solid base coated plate | 48 hrs | 96 hrs |
| Example D-1 | Solid base coated plate 1 | 3 | 3 |
| Example D-2 | Solid base coated plate 2 | 3 | 2 |
| Example D-3 | Solid base coated plate 3 | 4 | 3 |
| Example D-4 | Solid base coated plate 4 | 5 | 5 |
| Example D-5 | Solid base coated plate 5 | 4 | 4 |
| Example D-6 | Solid base coated plate 6 | 4 | 5 |
| Example D-7 | Solid base coated plate 7 | 3 | 3 |

TABLE 10-continued

| | | Weather resistance | |
|---|---|---|---|
| | Solid base coated plate | 48 hrs | 96 hrs |
| Example D-8 | Solid base coated plate 8 | 5 | 5 |
| Example D-9 | Solid base coated plate 9 | 4 | 4 |
| Example D-10 | Solid base coated plate 10 | 4 | 4 |
| Example D-11 | Solid base coated plate 11 | 4 | 4 |
| Example D-12 | Solid base coated plate 12 | 4 | 5 |
| Example D-13 | Solid base coated plate 13 | 3 | 3 |
| Example D-14 | Solid base coated plate 14 | 3 | 3 |
| Example D-15 | Solid base coated plate 15 | 3 | 3 |
| Example D-16 | Solid base coated plate 16 | 3 | 4 |
| Example D-17 | Solid base coated plate 17 | 3 | 3 |
| Example D-18 | Solid base coated plate 18 | 5 | 5 |
| Example D-19 | Solid base coated plate 19 | 5 | 5 |
| Comparative example D-1 | Solid base coated plate 20 | 1 | 1 |
| Comparative example D-2 | Solid base coated plate 21 | 1 | 1 |
| Comparative example D-3 | Solid base coated plate 22 | 1 | 1 |
| Comparative example D-4 | Solid base coated plate 23 | 1 | 1 |
| Comparative example D-5 | Solid base coated plate 24 | 1 | 1 |
| Comparative example D-6 | Solid base coated plate 25 | 1 | 1 |
| Comparative example D-7 | Solid base coated plate 26 | 1 | 1 |
| Comparative example D-8 | Solid base coated plate 27 | 1 | 1 |
| Comparative example D-9 | Solid base coated plate 28 | 1 | 1 |
| Comparative example D-10 | Solid base coated plate 29 | 1 | 1 |
| Comparative example D-11 | Solid base coated plate 30 | 1 | 1 |

<4> Evaluation of Water-Based Colorant Compositions
1. Preparation of Water-Based Colorant Compositions (Example E-1) Preparation of Water-Based Colorant Composition E-1

The following raw materials and 70 parts of 1.25 mm diameter zirconia beads were charged in a 70 ml glass bottle and dispersed using a paint shaker manufactured by Red Devil, Inc. for 60 minutes to obtain a dispersion.

Isoindoline compound (1-1): 3.15 parts

Polyester-modified acrylate polymer (manufactured by Allnex GMBH, ADDITOL XW 6528): 5.25 parts Wetting agent (manufactured by Allnex GMBH, ADDITOL XW 6374): 0.95 parts Anti-foaming agent (manufactured by Allnex GMBH, ADDITOL XW 6211): 0.63 parts Ion exchanged water: 21.52 parts The zirconia beads were then removed from the above dispersion to obtain a water-based colorant composition E-1.

(Examples E-2 to E-17, E-20 to E-21, Comparative Examples E-1 to E-11) [Production of Water-Based Colorant Compositions E-2 to 17 and Water-Based Colorant Compositions E-20 to E-32]

Water-based colorant compositions E-2 to 17 and water-based colorant compositions E-20 to E-32 were obtained in the same manner as in example E-1 except that the isoindoline compound (1-1) of example E-1 was changed as shown in Table 11.

(Example E-18) [Production of Water-Based Colorant Composition E-18]

A water-based colorant composition E-18 was obtained in the same manner as in example E-1 except that 3.15 parts of the isoindoline compound (1-1) of example E-1 were changed to 3.12 parts of the isoindoline compound (1-12) and 0.03 parts of the isoindoline compound (1-21).

(Example E-19) [Production of Water-Based Colorant Composition E-19]

A water-based colorant composition E-19 was obtained in the same manner as in example E-1 except that 3.15 parts of the isoindoline compound (1-1) of example E-1 were changed to 3.06 parts of the isoindoline compound (1-12), 0.03 parts of (1-21), 0.03 parts of (1-22), and 0.03 parts of the isoindoline compound (1-23).

(Comparative Example E-12) [Production of Water-Based Colorant Composition E-33]

A water-based colorant composition E-33 was obtained in the same manner as in example E-1 except that 3.15 parts of the isoindoline compound (1-1) of example E-1 were changed to 3.09 parts of the isoindoline compound (1-12), 0.03 parts of (1-22), and 0.03 parts of the isoindoline compound (1-23).

2. Evaluation of Dispersion Stability

[Evaluation of Initial Viscosity and Viscosity Stability]

The initial viscosity at 25° C. of the obtained water-based colorant compositions was measured using an E-type viscometer ("ELD type viscometer" manufactured by Toki Sangyo Co., Ltd.). In the same manner, the viscosity after aging at 25° C. for 1 week and the viscosity after aging at 50° C. for 1 week were measured, respectively. Based on the obtained values, the viscosity change ratio with respect to the initial viscosity was calculated and evaluated according to the following evaluation criteria as an index of viscosity stability. The results are shown in Table 11. The dispersibility is better as the initial viscosity is lower. The dispersion stability is better as the viscosity change ratio is smaller. Evaluations of "4", "3", and "2" in the following evaluation criteria represent a practicable level.

Viscosity change ratio (%) =

$$|(\text{viscosity over time/initial viscosity}) - 1| \times 100$$

(Evaluation Criteria for Initial Viscosity)

4: initial viscosity is less than 5.0 mPa·s. Very good

3: initial viscosity is 5.0 mPa·s or more and less than 7.5 mPa·s. Good

2: initial viscosity is 7.5 mPa·s or more and less than 10.0 mPa·s. Practical

1: initial viscosity is 10.0 mPa·s or more. Not practical (Evaluation Criteria for Viscosity Stability)

4: viscosity change ratio is less than 20%. Very good

3: viscosity change ratio is 20% or more and less than 30%. Good

2: viscosity change ratio is 30% or more and less than 40%. Practical

1: viscosity change ratio is 40% or more. Not practical

TABLE 11

| Table 11 | Name | Isoindoline compound | Initial viscosity | Dispersion stability 25° C. After 1 week | 50° C. After 1 week |
|---|---|---|---|---|---|
| Example E-1 | Water-based colorant composition E-1 | (1-1) | 3 | 3 | 3 |
| Example E-2 | Water-based colorant composition E-2 | (1-2) | 3 | 3 | 3 |
| Example E-3 | Water-based colorant composition E-3 | (1-3) | 3 | 3 | 3 |
| Example E-4 | Water-based colorant composition E-4 | (1-4) | 4 | 4 | 4 |
| Example E-5 | Water-based colorant composition E-5 | (1-5) | 4 | 4 | 4 |
| Example E-6 | Water-based colorant composition E-6 | (1-6) | 4 | 4 | 3 |
| Example E-7 | Water-based colorant composition E-7 | (1-7) | 3 | 3 | 3 |
| Example E-8 | Water-based colorant composition E-8 | (1-8) | 4 | 4 | 4 |
| Example E-9 | Water-based colorant composition E-9 | (1-9) | 3 | 4 | 4 |
| Example E-10 | Water-based colorant composition E-10 | (1-10) | 4 | 4 | 3 |
| Example E-11 | Water-based colorant composition E-11 | (1-11) | 4 | 4 | 3 |
| Example E-12 | Water-based colorant composition E-12 | (2-1) | 3 | 4 | 3 |
| Example E-13 | Water-based colorant composition E-13 | (2-2) | 3 | 4 | 3 |
| Example E-14 | Water-based colorant composition E-14 | (2-3) | 4 | 4 | 4 |
| Example E-15 | Water-based colorant composition E-15 | (2-4) | 4 | 4 | 4 |
| Example E-16 | Water-based colorant composition E-16 | (2-5) | 3 | 3 | 4 |
| Example E-17 | Water-based colorant composition E-17 | (3-1) | 3 | 4 | 3 |
| Example E-18 | Water-based colorant composition E-18 | (1-12) + (1-21) | 4 | 4 | 4 |
| Example E-19 | Water-based colorant composition E-19 | (1-12) + (1-21) + (1-22) + (1-23) | 4 | 4 | 4 |
| Example E-20 | Water-based colorant composition E-20 | (1-24) | 4 | 4 | 4 |
| Example E-21 | Water-based colorant composition E-21 | (1-25) | 4 | 4 | 4 |
| Comparative example E-1 | Water-based colorant composition E-22 | (1-12) | 1 | 1 | 1 |
| Comparative example E-2 | Water-based colorant composition E-23 | (1-13) | 1 | 1 | 1 |
| Comparative example E-3 | Water-based colorant composition E-24 | (1-14) | 1 | 1 | 1 |
| Comparative example E-4 | Water-based colorant composition E-25 | (1-15) | 1 | 1 | 1 |
| Comparative example E-5 | Water-based colorant composition E-26 | (1-16) | 1 | 1 | 1 |
| Comparative example E-6 | Water-based colorant composition E-27 | (1-17) | 1 | 1 | 1 |
| Comparative example E-7 | Water-based colorant composition E-28 | (2-6) | 1 | 1 | 1 |
| Comparative example E-8 | Water-based colorant composition E-29 | (2-7) | 1 | 1 | 1 |
| Comparative example E-9 | Water-based colorant composition E-30 | (2-8) | 1 | 1 | 1 |
| Comparative example E-10 | Water-based colorant composition E-31 | (2-9) | 1 | 1 | 1 |
| Comparative example E-11 | Water-based colorant composition E-32 | (2-10) | 1 | 1 | 1 |
| Comparative example E-12 | Water-based colorant composition E-33 | (1-12) + (1-22) + (1-23) | 2 | 2 | 1 |

<5> Evaluation of Aqueous Coating Materials

Aqueous coating materials were produced using water-based colorant compositions produced in the upper stage and were evaluated.

<5-1> Preparation of Aqueous Coating Materials

Example F-1

(1) Preparation of Aqueous Coating Material 1-1

After blending to have the following composition in non-volatile amounts, the mixture was stirred using a high-speed stirrer to obtain an aqueous coating material 1-1 (stored at 25° C. for 1 week).

Water-based colorant composition E-1 (stored at 25° C. for 1 week): 4.8 parts
Waterzole S-751 (acrylic resin for baking coating material manufactured by DIC Corporation): 60.0 parts
CYMEL 303 (melamine resin manufactured by Mitsui Cytec Corporation): 45.0 parts (2) Preparation of Aqueous Coating Material 1-2

After blending to have the following composition in non-volatile amounts, the mixture was stirred using a high-speed stirrer to obtain an aqueous coating material 1-2 (stored at 50° C. for 1 week).

Water-based colorant composition E-1 (stored at 50° C. for 1 week): 4.8 parts
Waterzole S-751 (acrylic resin for baking coating material manufactured by DIC Corporation): 60.0 parts
CYMEL 303 (melamine resin manufactured by Mitsui Cytec Corporation): 45.0 parts Examples F-2 to F-21, Comparative Examples F-1 to F-12

Aqueous coating materials 2-1 to 33-1 were obtained in the same manner as in example F-1 except that the water-based colorant composition E-1 (stored at 25° C. for 1 week) of example F-1 was successively changed to water-based colorant compositions E-2 to 33 (each stored at 25° C. for 1 week). Aqueous coating materials 2-2 to 33-2 were obtained in the same manner as in example F-1 except that the water-based colorant composition E-1 (stored at 50° C. for 1 week) of example F-1 was successively changed to water-based colorant compositions E-2 to 33 (each stored at 50° C. for 1 week).

TABLE 12

| | Water-based colorant composition | Aqueous coating material | Isoindoline compound |
|---|---|---|---|
| Example F-1 | E-1 | Aqueous coating material 1-1<br>Aqueous coating material 1-2 | (1-1) |
| Example F-2 | E-2 | Aqueous coating material 2-1<br>Aqueous coating material 2-2 | (1-2) |

TABLE 12-continued

|  | Water-based colorant composition | Aqueous coating material | Isoindoline compound |
|---|---|---|---|
| Example F-3 | E-3 | Aqueous coating material 3-1<br>Aqueous coating material 3-2 | (1-3) |
| Example F-4 | E-4 | Aqueous coating material 4-1<br>Aqueous coating material 4-2 | (1-4) |
| Example F-5 | E-5 | Aqueous coating material 5-1<br>Aqueous coating material 5-2 | (1-5) |
| Example F-6 | E-6 | Aqueous coating material 6-1<br>Aqueous coating material 6-2 | (1-6) |
| Example F-7 | E-7 | Aqueous coating material 7-1<br>Aqueous coating material 7-2 | (1-7) |
| Example F-8 | E-8 | Aqueous costing material 8-1<br>Aqueous coating material 8-2 | (1-8) |
| Example F-9 | E-9 | Aqueous coating material 9-1<br>Aqueous coating material 9-2 | (1-9) |
| Example F-10 | E-10 | Aqueous coating material 10-1<br>Aqueous coating material 10-2 | (1-10) |
| Example F-11 | E-11 | Aqueous coating material 11-1<br>Aqueous coating material 11-2 | (1-11) |
| Example F-12 | E-12 | Aqueous coating material 12-1<br>Aqueous coating material 12-2 | (2-1) |
| Example F-13 | E-13 | Aqueous coating material 13-1<br>Aqueous coating material 13-2 | (2-2) |
| Example F-14 | E-14 | Aqueous coating material 14-1<br>Aqueous coating material 14-2 | (2-3) |
| Example F-15 | E-15 | Aqueous coating material 15-1<br>Aqueous coating material 15-2 | (2-4) |
| Example F-16 | E-16 | Aqueous coating material 16-1<br>Aqueous coating material 16-2 | (2-5) |
| Example F-17 | E-17 | Aqueous coating material 17-1<br>Aqueous coating material 17-2 | (3-1) |
| Example F-18 | E-18 | Aqueous coating material 18-1<br>Aqueous coating material 18-2 | (1-12) + (1-21) |
| Example F-19 | E-19 | Aqueous coating material 19-1<br>Aqueous coating material 19-2 | (1-12) + (1-21) +<br>(1-22) + (1-23) |
| Example F-20 | E-20 | Aqueous coating material 20-1<br>Aqueous coating material 20-2 | (1-24) |
| Example F-21 | E-21 | Aqueous coating material 21-1<br>Aqueous coating material 21-2 | (1-25) |
| Comparative example F-1 | E-22 | Aqueous coating material 22-1<br>Aqueous coating material 22-2 | (1-12) |
| Comparative example F-2 | E-23 | Aqueous coating material 23-1<br>Aqueous coating material 23-2 | (1-13) |
| Comparative example F-3 | E-24 | Aqueous coating material 24-1<br>Aqueous coating material 24-2 | (1-14) |
| Comparative example F-4 | E-25 | Aqueous coating material 25-1<br>Aqueous coating material 25-2 | (1-15) |
| Comparative example F-5 | E-26 | Aqueous coating material 26-1<br>Aqueous coating material 26-2 | (1-16) |
| Comparative example F-6 | E-27 | Aqueous coating material 27-1<br>Aqueous coating material 27-2 | (1-17) |
| Comparative example F-7 | E-28 | Aqueous coating material 28-1<br>Aqueous coating material 28-2 | (2-6) |
| Comparative example F-8 | E-29 | Aqueous costing material 29-1<br>Aqueous coating material 29-2 | (2-7) |
| Comparative example F-9 | E-30 | Aqueous coating material 30-1<br>Aqueous coating material 30-2 | (2-8) |
| Comparative example F-10 | E-31 | Aqueous coating material 31-1<br>Aqueous coating material 31-2 | (2-9) |
| Comparative example F-11 | E-32 | Aqueous coating material 32-1<br>Aqueous coating material 32-2 | (2-10) |
| Comparative example F-12 | E-33 | Aqueouscoating material 33-1<br>Aqueous coating material 33-2 | (1-12) + (1-22) +<br>(1-23) |

<5-2> Production of PET Film Coating (Example G-1) [Production of PET Film Coating 1]

The aqueous coating material 1-1 and aqueous coating material 1-2 were coated together on Lumirror 100 T60 (manufactured by Toray Industries, Inc., polyester terephthalate (PET) film, 100 μm thick) using a six mil applicator. After the coating, the PET film was dried at room temperature for 18 hours. After that, the film was dried at 60° C. for 5 minutes and at 140° C. for 20 minutes to obtain a PET film coating 1 having a film thickness of 70 μm.

(Examples G-2 to G-21, Comparative Examples G-1 to G-12) [Production of PET Film Coating 2 to 33]

PET film coating materials 2 to 33 were obtained in the same manner as in example G-1 except that the aqueous coating material 1-1 and aqueous coating material 1-2 of example G-1 were changed to 2-1 to 33-1 and 2-2 to 33-2.

<5-3> Evaluation of PET Film Coating

Each PET film coating obtained in examples G-1 to G-21 and comparative examples G-1 to G-12 was evaluated for hue and hue stability according to the following method.

[Hue Stability Evaluation]

A color measurement device (manufactured by KONICA MINOLTA, INC., CM-700d) was used to perform the color measurement on each of a coating formed using a coating material of a water-based colorant composition stored at 25° C. for 1 week and a coating material formed using a coating material of a water-based colorant composition stored at 50° C. for 1 week coated on PET films coatings 1 to 33, and the color difference (ΔE*) was determined and determined on the basis of the following criteria. The results are shown in Table 13. It is though that a coloring material has better dispersion stability as the color difference is smaller, and evaluations of "4", "3", and "2" in the following criteria are thought to be a practicable level.

(Evaluation Criteria)
4: ΔE* is less than 1.0.
3: ΔE* is 1.0 or more and less than 2.0.
2: ΔE* is 2.0 or more and less than 3.0.
1: ΔE* is 3.0 or more.

TABLE 13

| Name | | Isoindoline compound | ΔE* |
|---|---|---|---|
| Example G-1 | PET film coating 1 | (1-1) | 2 |
| Example G-2 | PET film coating 2 | (1-2) | 3 |
| Example G-3 | PET film coating 3 | (1-3) | 3 |
| Example G-4 | PET film coating 4 | (1-4) | 4 |
| Example G-5 | PET film coating 5 | (1-5) | 3 |
| Example G-6 | PET film coating 6 | (1-6) | 4 |
| Example G-7 | PET film coating 7 | (1-7) | 4 |
| Example G-8 | PET film coating 8 | (1-8) | 4 |
| Example G-9 | PET film coating 9 | (1-9) | 4 |
| Example G-10 | PET film coating 10 | (1-10) | 4 |
| Example G-11 | PET film coating 11 | (1-11) | 4 |
| Example G-12 | PET film coating 12 | (2-1) | 4 |
| Example G-13 | PET film coating 13 | (2-2) | 4 |
| Example G-14 | PET film coating 14 | (2-3) | 4 |
| Example G-15 | PET film coating 15 | (2-4) | 4 |
| Example G-16 | PET film coating 16 | (2-5) | 4 |
| Example G-17 | PET film coating 17 | (3-1) | 4 |
| Example G-18 | PET film coating 18 | (1-12) + (1-21) | 4 |
| Example G-19 | PET film coating 19 | (1-12) + (1-21) + (1-22) + (1-23) | 4 |
| Example G-20 | PET film coating 20 | (1-24) | 4 |
| Example G-21 | PET film coating 21 | (1-25) | 4 |
| Comparative example G-1 | PET film coating 22 | (1-12) | 1 |
| Comparative example G-2 | PET film coating 23 | (1-13) | 1 |
| Comparative example G-3 | PET film coating 24 | (1-14) | 1 |
| Comparative example G-4 | PET film coating 25 | (1-15) | 1 |
| Comparative example G-5 | PET film coating 26 | (1-16) | 1 |
| Comparative example G-6 | PET film coating 27 | (1-17) | 1 |
| Comparative example G-7 | PET film coating 28 | (2-6) | 1 |
| Comparative example G-8 | PET film coating 29 | (2-7) | 1 |
| Comparative example G-9 | PET film coating 30 | (2-8) | 1 |
| Comparative example G-10 | PET film coating 31 | (2-9) | 1 |
| Comparative example G-11 | PET film coating 32 | (2-10) | 1 |
| Comparative example G-12 | PET film coating 33 | (1-12) + (1-22) + (1-23) | 1 |

<6> Gravure Ink Evaluation (Synthesis Example 1) Polyurethane Resin [PU1]

An amount of 200 parts of polypropylene glycol ("PPG 700" below) having a number average molecular weight of 700, 127 parts of isophorone diisocyanate ("IPDI" below), and 81.8 parts of ethyl acetate were reacted under nitrogen flow at 80° C. for 4 hours to obtain a resin solution of a terminal isocyanate urethane prepolymer. To a mixture of 49.5 parts of isophorone diamine ("IPDA" below), 3 parts of 2-ethanolamine, and 803.9 parts of a mixed solvent of ethyl acetate/isopropanol ("IPA")=50/50 (mass ratio), a resin solution of the obtained terminal isocyanate urethane prepolymer was gradually added at 40° C., and then reacted at 80° C. for 1 hour to obtain a polyurethane resin solution [PU1] having a non-volatile fraction of 30%, an amine value of 3.5 mgKOH/g, a hydroxyl value of 7.3 mgKOH/g, and a weight average molecular weight of 40,000. The glass transition temperature was −32° C.

(Example H-1) [Production of Gravure Ink 1]

An amount of 30 parts of the polyurethane resin solution [PU1] (30% non-volatile fraction) as a binder resin, 0.8 parts of polyethylene wax (A-C400A manufactured by Honeywell International Inc.) as a hydrocarbon-based wax in terms of the non-volatile fraction equivalent, 0.5 parts of a chlorinated polypropylene resin (product name: 370M manufactured by Nippon Paper Industries Co., Ltd., chlorine content 30%, non-volatile fraction 50%) in terms of the non-volatile fraction equivalent, 10 parts of the isoindoline compound (1-1), and 58.7 parts of a solution of methyl ethyl ketone ("MEK" below)/n-propyl acetate ("NPAC" below)/IPA=40/40/20 (mass ratio) were mixed and dispersed in an Eiger mill for 15 minutes to obtain a gravure ink 1.

(Examples H-2 to 17, H-20 to H-27, Comparative Examples H-1 to 11) [Production of Gravure Inks 2 to 17 and Gravure Inks 20 to 38]

Gravure inks 2 to 17 and gravure inks 20 to 38 were obtained in the same manner as in example H-1 except that the isoindoline compound (1-1) was changed in the method for preparing the gravure ink 1 described in example H-1 as shown in Table 14.

(Example H-18) [Production of Gravure Ink 18]

A gravure ink 18 was obtained in the same manner as in example H-1 except that 10 parts of the isoindoline compound (1-1) of example H-1 were changed to 9.9 parts of the isoindoline compound (1-12) and 0.1 parts of (1-21).

(Example H-19) [Production of Gravure Ink 19]

A gravure ink 19 was obtained in the same manner as in example H-1 except that 10 parts of the isoindoline compound (1-1) of example H-1 were changed to 9.7 parts of the isoindoline compound (1-12), 0.1 parts of (1-21), 0.1 parts of (1-22), and 0.1 parts of (1-23).

(Comparative Example H-12) [Production of Gravure Ink 39]

A gravure ink 39 was obtained in the same manner as in example H-1 except that 10 parts of the isoindoline compound (1-1) of example H-1 were changed to 9.8 parts of the isoindoline compound (1-12), 0.1 parts of (1-22), and 0.1 parts of (1-23).

[Evaluation Method and Evaluation Criteria]
[Evaluation of Stability Over Time]

Gravure inks 1 to 39 were each stored in an airtight container at 40° C. for 10 days. Viscosity was then measured to evaluate the change in viscosity from before storage. Note that viscosity was measured at 25° C. with Zahn Cup No. 4 in outflow seconds. Note that the viscosity of any of the inks in the B-type viscometer before storage was within the range of 40 to 500 cps (25° C.).
(Evaluation Criteria)
- 5: viscosity change is less than 2 seconds (good)
- 4: viscosity change is 2 seconds or more and less than 5 seconds (practical)
- 3: viscosity change is 5 seconds or more and less than 10 seconds (slightly poor)
- 2: viscosity change is 10 seconds or more and less than 15 seconds (poor)
- 1: viscosity change is 15 seconds or more (extremely poor)

Note that evaluations of 5 and 4 represent the range that causes no practical issues.

<Evaluation of Printed Matters with Gravure Ink>

(Example I-1) [Production of Printed Matters I1-1, I1-2]

The gravure ink 1 obtained above was diluted with a mixed solvent consisting of MEK/NPACA/IPA=40/40/20 (mass ratio) so that the viscosity was 16 seconds (25° C., Zahn Cup No. 3), and printing was performed on the following substrate (corona discharge treatment surface in the case of OPP) at a printing speed of 80 in/min using a gravure printing machine equipped with a helio 175 line gradation plate (printing type compression, gradation 100% to 3%) to obtain printed matters I1-1 (OPP) and I1-2 (CPP).
<Substrate>
- OPP: Biaxially stretched polypropylene (OPP) film with one side corona discharge treatment (FOR thickness 25 μm, manufactured by Futamura Chemical Co., Ltd.)
- CPP: Unstretched polypropylene (CPP) film without corona treatment (CP-S thickness 30 μm, manufactured by Mitsui Chemicals Tohcello, Inc.)

TABLE 14

|  | Gravure ink | Isoindoline compound | Stability over time | Transparency | Reference comparative example |
|---|---|---|---|---|---|
| Example H-1 | Gravure ink 1 | (1-1) | 4 | 4 | Comparative example H-1 |
| Example H-2 | Gravure ink 2 | (1-2) | 4 | 4 |  |
| Example H-3 | Gravure ink 3 | (1-3) | 4 | 5 |  |
| Example H-4 | Gravure ink 4 | (1-4) | 5 | 5 |  |
| Example H-5 | Gravure ink 5 | (1-5) | 5 | 4 |  |
| Example H-6 | Gravure ink 6 | (1-6) | 5 | 5 |  |
| Example H-7 | Gravure ink 7 | (1-7) | 4 | 5 | Comparative example H-2 |
| Example H-8 | Gravure ink 8 | (1-8) | 5 | 4 | Comparative example H-3 |
| Example H-9 | Gravure ink 9 | (1-9) | 4 | 5 | Comparative example H-4 |
| Example H-10 | Gravure ink 10 | (1-10) | 4 | 5 | Comparative example H-5 |
| Example H-11 | Gravure ink 11 | (1-11) | 5 | 4 | Comparative example H-6 |
| Example H-12 | Gravure ink 12 | (2-1) | 4 | 5 | Comparative example H-7 |
| Example H-13 | Gravure ink 13 | (2-2) | 4 | 5 | Comparative example H-8 |
| Example H-14 | Gravure ink 14 | (2-3) | 5 | 4 | Comparative example H-9 |
| Example H-15 | Gravure ink 15 | (2-4) | 5 | 5 | Comparative example H-10 |
| Example H-16 | Gravure ink 16 | (2-5) | 4 | 5 | Comparative example H-11 |
| Example H-17 | Gravure ink 17 | (3-1) | 4 | 5 | Comparative example H-1 |
| Example H-18 | Gravure ink 18 | (1-12) + (1-21) | 4 | 4 |  |
| Example H-19 | Gravure ink 19 | (1-12) + (1-21) + (1-22) + (1-23) | 5 | 5 | Comparative example H-12 |
| Example H-20 | Gravure ink 20 | (1-24) | 5 | 5 | Comparative example H-1 |
| Example H-21 | Gravure ink 21 | (1-25) | 5 | 5 |  |
| Example H-22 | Gravure ink 22 | (1-26) | 5 | 5 |  |
| Example H-23 | Gravure ink 23 | (1-27) | 4 | 4 |  |
| Example H-24 | Gravure ink 24 | (1-28) | 5 | 5 |  |
| Example H-25 | Gravure ink 25 | (1-29) | 5 | 5 |  |
| Example H-26 | Gravure ink 26 | (1-30) | 4 | 4 |  |
| Example H-27 | Gravure ink 27 | (1-31) | 5 | 5 |  |
| Comparative example H-1 | Gravure ink 28 | (1-12) | 1 | Reference |  |
| Comparative example H-2 | Gravure ink 29 | (1-13) | 1 | Reference |  |
| Comparative example H-3 | Gravure ink 30 | (1-14) | 2 | Reference |  |
| Comparative example H-4 | Gravure ink 31 | (1-15) | 2 | Reference |  |
| Comparative example H-5 | Gravure ink 32 | (1-16) | 2 | Reference |  |
| Comparative example H-6 | Gravure ink 33 | (1-17) | 2 | Reference |  |
| Comparative example H-7 | Gravure ink 34 | (2-6) | 1 | Reference |  |
| Comparative example H-8 | Gravure ink 35 | (2-7) | 2 | Reference |  |
| Comparative example H-9 | Gravure ink 36 | (2-8) | 1 | Reference |  |
| Comparative example H-10 | Gravure ink 37 | (2-9) | 1 | Reference |  |
| Comparative example H-11 | Gravure ink 38 | (2-10) | 1 | Reference |  |
| Comparative example H-12 | Gravure ink 39 | (1-12) + (1-22) + (1-23) | 3 | Reference |  |

(Examples I-2 to 27, Comparative Examples I-1 to 12) [Production of Printed Matters I2-1 to I39-1, I2-2 to I39-2]

The gravure inks 2 to 39 described in Table 14 were printed with printing structures described in Table 15, and the printed matters I2-1 to I39-1 (OPP) and I2-2 to I39-2 (CPP) were obtained.

[Evaluation Method and Evaluation Criteria]

The following evaluation was performed using printed matters I1-1 to I39-1 (OPP) and printed matters I1-2 to I39-2 (CPP).

[Transparency Evaluation]

After spreading color to a black band provided on colored paper, the transparency was determined by looking at the degree of transparency on the black band and then comparing with a comparative example having a similar hue.

(Evaluation Criteria)
- 5: extremely transparent
- 4: transparent
- 3: similar
- 2: opaque
- 1: very opaque

[Scratch Resistance Evaluation]

Using printed matters I1-1 to I39-1 (OPP) and printed matters I1-2 to I39-2 (CPP), the surface of a printed layer was rubbed at three places with a nail, and the scratch resistance was evaluated according to the degree of damage of the printed layer.

(Evaluation Criteria)
- 5: the printed layer is not damaged (good)
- 4: the printed layer is not damaged but a slight nail mark remains (practical)
- 3: the printed layer is scratched and the surface of the printed layer is slightly gouged (slightly poor)
- 2: the printed layer is scratched and the substrate is slightly visible (poor)
- 1: the printed layer is scratched and the substrate is clearly visible (extremely poor)

Note that evaluations of 5 and 4 represent the range that causes no practical issues.

[Adhesiveness Evaluation]

For each of the printed matters I1-1 to I39-1 (OPP) and printed matters I1-2 to I39-2 (CPP) three hours after printing, an adhesive tape (cellophane tape manufactured by Nichiban Co., Ltd.) with a width of 12 mm was bonded to the printed matter, and the state of appearance of the printed matter was visually determined when the adhesive tape was rapidly peeled off. Note that the criteria are as follows.

(Evaluation Criteria)
- 5: the ink coating film on the printing surface underwent absolutely no detachment (good).
- 4: the detached area of the ink coating film is 1% or more and less than 5% (practicable)
- 3: the detached area of the ink coating film is 5% or more and less than 20% (slightly poor)
- 2: the detached area of the ink coating film is 20% or more and less than 50% (poor)
- 1: the ink coating film detached 50% or more (extremely poor)

Note that evaluations of "5" and "4" represent the range that causes no practical issues.

TABLE 15

| | Printed matter | Film | Scratch resistance | Adhesiveness |
|---|---|---|---|---|
| Example I-1 | Printed matter I1-1 | OPP | 4 | 4 |
| | Printed matter I1-2 | CPP | 4 | 4 |
| Example I-2 | Printed matter I2-1 | OPP | 4 | 4 |
| | Printed matter I2-2 | CPP | 4 | 4 |
| Example I-3 | Printed matter I3-1 | OPP | 4 | 5 |
| | Printed matter I3-2 | CPP | 4 | 5 |
| Example I-4 | Printed matter I4-1 | OPP | 5 | 5 |
| | Printed matter I4-2 | CPP | 5 | 5 |
| Example I-5 | Printed matter I5-1 | OPP | 4 | 5 |
| | Printed matter I5-2 | CPP | 4 | 5 |
| Example I-6 | Printed matter I6-1 | OPP | 5 | 5 |
| | Printed matter I6-2 | CPP | 5 | 5 |
| Example I-7 | Printed matter I7-1 | OPP | 4 | 4 |
| | Printed matter I7-2 | CPP | 4 | 4 |
| Example I-8 | Printed matter I8-1 | OPP | 5 | 5 |
| | Printed matter I8-2 | CPP | 5 | 5 |
| Example I-9 | Printed matter I9-1 | OPP | 5 | 5 |
| | Printed matter I9-2 | CPP | 5 | 5 |
| Example I-10 | Printed matter I10-1 | OPP | 5 | 5 |
| | Printed matter I10-2 | CPP | 5 | 4 |
| Example I-11 | Printed matter I11-1 | OPP | 5 | 4 |
| | Printed matter I11-2 | CPP | 5 | 4 |
| Example I-12 | Printed matter I12-1 | OPP | 4 | 5 |
| | Printed matter I12-2 | CPP | 4 | 4 |
| Example I-13 | Printed matter I13-1 | OPP | 4 | 4 |
| | Printed matter I13-2 | CPP | 4 | 4 |
| Example I-14 | Printed matter I14-1 | OPP | 5 | 5 |
| | Printed matter I14-2 | CPP | 5 | 4 |
| Example I-15 | Printed matter I15-1 | OPP | 5 | 5 |
| | Printed matter I15-2 | CPP | 4 | 5 |
| Example I-16 | Printed matter I16-1 | OPP | 4 | 5 |
| | Printed matter I16-2 | CPP | 4 | 4 |
| Example I-17 | Printed matter I17-1 | OPP | 4 | 4 |
| | Printed matter I17-2 | CPP | 4 | 4 |
| Example I-18 | Printed matter I18-1 | OPP | 5 | 5 |
| | Printed matter I18-2 | CPP | 5 | 4 |
| Example I-19 | Printed matter I19-1 | OPP | 5 | 5 |
| | Printed matter I19-2 | CPP | 5 | 5 |
| Example I-20 | Printed matter I20-1 | OPP | 5 | 5 |
| | Printed matter I20-2 | CPP | 5 | 5 |
| Example I-21 | Printed matter I21-1 | OPP | 5 | 5 |
| | Printed matter I21-2 | CPP | 5 | 5 |
| Example I-22 | Printed matter I22-1 | OPP | 4 | 5 |
| | Printed matter I22-2 | CPP | 4 | 5 |
| Example I-23 | Printed matter I23-1 | OPP | 4 | 4 |
| | Printed matter I23-2 | CPP | 4 | 4 |
| Example I-24 | Printed matter I24-1 | OPP | 4 | 5 |
| | Printed matter I24-2 | CPP | 4 | 5 |
| Example I-25 | Printed matter I25-1 | OPP | 5 | 5 |
| | Printed matter I25-2 | CPP | 5 | 5 |
| Example I-26 | Printed matter I26-1 | OPP | 4 | 5 |
| | Printed matter I26-2 | CPP | 4 | 5 |
| Example I-27 | Printed matter I27-1 | OPP | 5 | 5 |
| | Printed matter I27-2 | CPP | 5 | 5 |
| Comparative example I-1 | Printed matter I28-1 | OPP | 1 | 2 |
| | Printed matter I28-2 | CPP | 1 | 2 |
| Comparative example I-2 | Printed matter I29-1 | OPP | 2 | 2 |
| | Printed matter I29-2 | CPP | 2 | 1 |
| Comparative example I-3 | Printed matter I30-1 | OPP | 2 | 2 |
| | Printed matter I30-2 | CPP | 1 | 1 |
| Comparative example I-4 | Printed matter I31-1 | OPP | 2 | 1 |
| | Printed matter I31-2 | CPP | 1 | 2 |
| Comparative example I-5 | Printed matter I32-1 | OPP | 1 | 2 |
| | Printed matter I32-2 | CPP | 2 | 2 |
| Comparative example I-6 | Printed matter I33-1 | OPP | 1 | 2 |
| | Printed matter I33-2 | CPP | 1 | 2 |
| Comparative example I-7 | Printed matter I34-1 | OPP | 1 | 2 |
| | Printed matter I34-2 | CPP | 1 | 1 |
| Comparative example I-8 | Printed matter I35-1 | OPP | 1 | 2 |
| | Printed matter I35-2 | CPP | 2 | 2 |
| Comparative example I-9 | Printed matter I36-1 | OPP | 1 | 1 |
| | Printed matter I36-2 | CPP | 1 | 2 |
| Comparative example I-10 | Printed matter I37-1 | OPP | 2 | 2 |
| | Printed matter I37-2 | CPP | 1 | 1 |

TABLE 15-continued

|  | Printed matter | Film | Scratch resistance | Adhesiveness |
|---|---|---|---|---|
| Comparative example I-11 | Printed matter I38-1 | OPP | 2 | 1 |
|  | Printed matter I38-2 | CPP | 2 | 1 |
| Comparative example I-12 | Printed matter I39-1 | OPP | 3 | 3 |
|  | Printed matter I39-2 | CPP | 3 | 3 |

<7> Evaluation of Aqueous Flexographic Ink (Synthesis Example 2) Aqueous Urethane Resin [B]

To a four-neck 2,000 ml flask fitted with a reflux condenser, a dropping funnel, a gas inlet tube, a stirrer, and a thermometer, 82.3 parts of polytetramethylene glycol having a number average molecular weight of 2,000, 3 parts of polyethylene glycol having a number average molecular weight of 2,000, 13 parts of dimethylolbutanoic acid, and 1.7 parts of 1,4-cyclohexanedimethanol were charged, the flask was flushed with dry nitrogen, and the temperature was raised to 100° C. Under stirring, 33.3 parts of isophorone diisocyanate were added dropwise over 20 minutes, and the temperature was gradually raised to 140° C. (NCO/OH=0.98). Further, the reaction operation was performed for 30 minutes to obtain a urethane resin. Next, 399.8 parts of distilled water containing 5.3 parts of 28% ammonia water were added while cooling to obtain an aqueous urethane resin [B](weight average molecular weight about 40,000, non-volatile fraction 25%, acid value 36.9 (mgKOH/g), hydroxyl value 11.1 (mgKOH/g)).

(Example P-1) [Production of Aqueous Flexographic Ink [P-1]]

An amount of 45 parts of an aqueous urethane resin [B], 15 parts of the isoindoline compound (I-1), 2 parts of polyethylene wax (W310 manufactured by Mitsui Chemicals, Inc., particle diameter 9.5 μm, softening point 132° C., needle penetration method hardness 0.8), 0.2 parts of adipic acid dihydrazide, 0.2 parts of ammonia water (28%), 18.8 parts of water, and 18.8 parts of isopropanol were dispersed using an Eiger mill until the particle size was 10 μm or less with a grind gauge to obtain an aqueous flexographic ink [P-1].

(Examples P-2 to P-17, P-20 to P-27, Comparative Examples P-1 to P-11) [Production of Aqueous Flexographic Inks [P-2] to [P-17], [P-20] to [P-38]]

In the production method of the aqueous flexographic ink [P-1] described in example P-1, the isoindoline compound (1-1) was changed as shown in Table 16. Other than this, aqueous flexographic inks [P-2] to [P-17] and [P-20] to [P-38] were obtained in the same manner as in example P-1.

(Example P-18) [Production of Aqueous Flexographic Ink [P-18]]

In the production method of the aqueous flexographic ink [P-1] described in example P-1, 15 parts of the isoindoline compound (1-1) were changed to 14.85 parts of the isoindoline compound (1-12) and 0.15 parts of (1-21). Other than this, an aqueous flexographic ink [P-18] was obtained in the same manner as in example P-1.

(Example P-19) [Production of Aqueous Flexographic Ink [P-19]]

In the production method of the aqueous flexographic ink [P-1] described in example P-1, 15 parts of the isoindoline compound (1-1) were changed to 14.55 parts of the isoindoline compound (1-12), 0.15 parts of (1-21), 0.15 parts of (1-22), and 0.15 parts of (1-23). Other than this, an aqueous flexographic ink [P-19] was obtained in the same manner as in example P-1.

(Comparative Example P-12) [Production of Aqueous Flexographic Ink [P-39]]

In the production method of the aqueous flexographic ink [P-1] described in example P-1, 15 parts of the isoindoline compound (1-1) were changed to 14.7 parts of the isoindoline compound (1-12), 0.15 parts of (1-22), and 0.15 parts of (1-23). Other than this, an aqueous flexographic ink [P-39] was obtained in the same manner as in example P-1.

[Evaluation Method and Evaluation Criteria]
<Evaluation of Aqueous Flexographic Inks>
[Evaluation of Dispersibility]

The dispersibility is higher as the dispersion time of an aqueous flexographic ink is shorter. The dispersion time of the aqueous flexographic ink [P-28] of comparative example P-1 was set as a reference (100%), and the dispersibility of each aqueous flexographic ink was evaluated according to the following criteria. The practical level is 2 or higher.

(Evaluation Criteria)
5: dispersion time is less than 40%
4: dispersion time is 40% or more and less than 60%
3: dispersion time is 60% or more and less than 80%
2: dispersion time is 80% or more and less than 100%
1: dispersion time is 100% or more

[Evaluation of Stability Over Time]

The aqueous flexographic inks were each stored in an airtight container at 40° C. for 3 months. Viscosity was then measured to evaluate the change in viscosity from before storage. Note that viscosity was measured at 25° C. with Zahn Cup No. 4 in outflow seconds. Note that the viscosity of any of the inks in the B-type viscometer before storage was within the range of 40 to 500 cps (25° C.). The evaluation criteria are as follows. The practical level is 2 or higher.

(Evaluation Criteria)
4: viscosity change is less than 2 seconds
3: viscosity change is 2 seconds or more and less than 4 seconds
2: viscosity change is 4 seconds or more and less than 6 seconds
1: viscosity change is 6 seconds or more <Evaluation of Aqueous Flexographic Ink Prints>
(Production of Printed Matters)

Printed matters were produced with the following method using the obtained aqueous flexographic inks.

Flexographic rotary printing: aqueous flexographic inks were printed on plastic films at a speed of 100 m/min using a center drum type six color flexo printing machine "SOLO-FLEX" manufactured by Windmöller & Hölscher, and dried at 60 to 70° C. to obtain printed matters. An anilox roll with 350 lines/cm was used, and as a plate cylinder, a solid plate made of "Cyrel DPU" (thickness 1.14 mm) manufactured by DuPont. was used, which was attached with double-sided tape ("DF7382T" thickness 0.50 mm, manufactured by TOYOCHEM CO., LTD.).

[Hue Evaluation]

The obtained printed matter was superimposed on white colored paper (byko-chart coating free, N2C, manufactured by BYK-Chemie GmbH), and the color measurement was performed using a colorimeter (manufactured by KONICA MINOLTA, INC., CM-700d) capable of measuring the total luminous flux. The color difference (ΔE*) was determined on the basis of the comparative example described in Table 16, and evaluated according to the following criteria. The practical level is 2 or higher.

(Evaluation Criteria)
5: ΔE* is less than 0.5
4: ΔE* is 0.5 or more and less than 1.0
3: ΔE* is 1.0 or more and less than 1.5
2: ΔE* is 1.5 or more and less than 3.0
1: ΔE* is 3.0 or more.

Isoindoline compound (1-1): 18.0 parts
EBECRYL225: 8.4 parts (active component 5.0 parts) (10-functional urethane acrylate oligomer)
4-acryloylmorpholine: 15.0 parts (monofunctional monomer)
EO-modified trimethylolpropane triacrylate: 20.0 parts
Dipentaerythritol pentaacrylate: 5.0 parts
Dipentaerythritol hexa-acrylate: 16.6 parts
Irgacure 369: 3.0 parts (photopolymerization initiator)
Chemrk DEABP: 3.0 parts (photopolymerization initiator)
SB-P1718: 4.0 parts (photopolymerization initiator)
Ajisper PB821: 3.0 parts (dispersant)
T wax compound: 4.0 parts (wax)
Details of the materials used are as follows.

TABLE 16

|  | Water-based flexographic ink | Isoindoline compound | Dispersibility | Stability over time | Hue | Reference comparative example |
|---|---|---|---|---|---|---|
| Example P-1 | [P-1] | (1-1) | 3 | 2 | 4 | Comparative example P-1 |
| Example P-2 | [P-2] | (1-2) | 4 | 3 | 4 |  |
| Example P-3 | [P-3] | (1-3) | 4 | 3 | 5 |  |
| Example P-4 | [P-4] | (1-4) | 5 | 4 | 5 |  |
| Example P-5 | [P-5] | (1-5) | 5 | 4 | 4 |  |
| Example P-6 | [P-6] | (1-6) | 5 | 4 | 5 |  |
| Example P-7 | [P-7] | (1-7) | 4 | 3 | 5 | Comparative example P-2 |
| Example P-8 | [P-8] | (1-8) | 5 | 4 | 4 | Comparative example P-3 |
| Example P-9 | [P-9] | (1-9) | 4 | 3 | 5 | Comparative example P-4 |
| Example P-10 | [P-10] | (1-10) | 3 | 2 | 5 | Comparative example P-5 |
| Example P-11 | [P-11] | (1-11) | 5 | 4 | 4 | Comparative example P-6 |
| Example P-12 | [P-12] | (2-1) | 4 | 3 | 5 | Comparative example P-7 |
| Example P-13 | [P-13] | (2-2) | 4 | 3 | 5 | Comparative example P-8 |
| Example P-14 | [P-14] | (2-3) | 5 | 4 | 4 | Comparative example P-9 |
| Example P-15 | [P-15] | (2-4) | 5 | 4 | 4 | Comparative example P-10 |
| Example P-16 | [P-16] | (2-5) | 4 | 3 | 4 | Comparative example P-11 |
| Example P-17 | [P-17] | (3-1) | 4 | 3 | 5 | Comparative example P-1 |
| Example P-18 | [P-18] | (1-12) + (1-21) | 4 | 3 | 4 |  |
| Example P-19 | [P-19] | (1-12) + (1-21) + (1-22) + (1-23) | 5 | 4 | 5 | Comparative example P-12 |
| Example P-20 | [P-20] | (1-24) | 5 | 4 | 5 | Comparative example P-1 |
| Example P-21 | [P-21] | (1-25) | 5 | 4 | 5 |  |
| Example P-22 | [P-22] | (1-26) | 4 | 4 | 5 |  |
| Example P-23 | [P-23] | (1-27) | 4 | 3 | 5 |  |
| Example P-24 | [P-24] | (1-28) | 4 | 4 | 5 |  |
| Example P-25 | [P-25] | (1-29) | 4 | 4 | 5 |  |
| Example P-26 | [P-26] | (1-30) | 4 | 4 | 5 |  |
| Example P-27 | [P-27] | (1-31) | 5 | 4 | 5 |  |
| Comparative example P-1 | [P-28] | (1-12) | Reference | 1 | Reference |  |
| Comparative example P-2 | [P-29] | (1-13) | 1 | 1 | Reference |  |
| Comparative example P-3 | [P-30] | (1-14) | 1 | 1 | Reference |  |
| Comparative example P-4 | [P-31] | (1-15) | 1 | 1 | Reference |  |
| Comparative example P-5 | [P-32] | (1-16) | 1 | 1 | Reference |  |
| Comparative example P-6 | [P-33] | (1-17) | 1 | 1 | Reference |  |
| Comparative example P-7 | [P-34] | (2-6) | 1 | 1 | Reference |  |
| Comparative example P-8 | [P-35] | (2-7) | 1 | 1 | Reference |  |
| Comparative example P-9 | [P-36] | (2-8) | 1 | 1 | Reference |  |
| Comparative example P-10 | [P-37] | (2-9) | 1 | 1 | Reference |  |
| Comparative example P-11 | [P-38] | (2-10) | 1 | 1 | Reference |  |
| Comparative example P-12 | [P-39] | (1-12) + (1-22) + (1-23) | 2 | 1 | Reference |  |

<8> Evaluation of Active Energy Ray-Curable Ink (Example Q-1) [Production of Active Energy Ray-Curable Ink [Q-1]]

The following materials were stirred and mixed using a butterfly mixer, and dispersed using three rolls so that the maximum particle size was 15 μm or less to obtain an active energy ray-curable ink [Q-1].

[Acrylate Oligomer]
EBECRYL225: manufactured by DAICEL-ALLNEX LTD., 10-functional aliphatic urethane acrylate oligomer, Mw1, 200, active component 60% by mass

[Polymerization Initiator]
Irgacure 369: manufactured by BASF Corporation, 2-benzyl-2-(dimethylamino)-1-(4-morpholinophenyl)-1-butanone
Chemark DEABP: manufactured by Sort, 4,4'-bis(diethylamino)benzophenone SB-P1718: manufactured by Sort, 2, 4, 6-trimethylbenzoyl-diphenylphosphine oxide

[Dispersant]

Ajisper PB821: manufactured by Ajinomoto Fine-Techno Co., Inc., comb-shaped dispersant containing a basic functional group

[Wax]

T wax compound: manufactured by TOSHIN YUSHI CO., LTD., polyethylene wax (Examples Q-2 to Q-17, Q-20 to Q-21, Comparative Examples Q-1 to Q-11) [Production of Active Energy Ray-Curable Inks [Q-2] to [Q-17], [Q-20] to [QP-32]]

In the production method of the active energy ray-curable ink [Q-1] described in example Q-1, the isoindoline compound (1-1) was changed as shown in Table 17. Other than this, the active energy ray-curable inks [Q-2] to [Q-17] and [Q-20] to [QP-32] were obtained in the same manner as in example Q-1.

(Example Q-18) [Production of Active Energy Ray-Curable Ink [Q-18]]

In the production method of the active energy ray-curable ink [Q-1] described in example Q-1, 18.0 parts of the isoindoline compound (1-1) were changed to 17.82 parts of the isoindoline compound (1-12) and 0.18 parts of (1-21). Other than this, the active energy ray-curable ink [Q-18] was obtained in the same manner as in example Q-1.

(Example Q-19) [Production of Active Energy Ray-Curable Ink [Q-19]]

In the production method of the active energy ray-curable ink [Q-1] described in example Q-1, 18.0 parts of the isoindoline compound (1-1) were changed to 17.46 parts of the isoindoline compound (1-12), 0.18 parts of (1-21), 0.18 parts of (1-22), and 0.18 parts of (1-23). Other than this, the active energy ray-curable ink [Q-19] was obtained in the same manner as in example Q-1.

(Comparative Example Q-12) [Production of Active Energy Ray-Curable Ink [Q-33]]

In the production method of the active energy ray-curable ink [Q-1] described in example Q-1, 18.0 parts of the isoindoline compound (1-1) were changed to 17.64 parts of the isoindoline compound (1-12), 0.18 parts of (1-22), and 0.18 parts of (1-23). Other than this, the active energy ray-curable ink [Q-33] was obtained in the same manner as in example Q-1.

[Evaluation Method and Evaluation Criteria]

<Evaluation of Active Energy Ray-Curable Ink>

[Initial Viscosity Evaluation]

The viscosity of the obtained active-energy ray-curable ink was measured using an E-type viscometer (TVE-25 type viscometer, type E, manufactured by Toki Sangyo Co., Ltd.) at 25° C. and at a rotation speed of 100 rpm, and evaluated according to the following criteria. The practical level is 2 or higher.

(Evaluation Criteria)

4: 500 mPa·s or more and less than 1,400 mPa·s
3: 400 mPa·s or more and less than 500 mPa·s, or 1,400 mPa·s or more and less than 1,600 mPa·s
2: 200 mPa·s or more and less than 400 mPa·s, or 1,600 mPa s or more and less than 2,000 mPa·s
1: less than 200 mPa·s, or 2,000 mPa·s or more

[Thixotropic Index (TI) Value Evaluation]

The viscosity of the obtained active-energy ray-curable ink was measured using an E-type viscometer (TVE-25 type viscometer, type E, manufactured by Toki Sangyo Co., Ltd.) at 25° C. at rotation speeds of 50 rpm and 100 rpm. The TI value was calculated by dividing the viscosity at a rotation speed of 50 rpm by the viscosity at a rotation speed of 100 rpm, and evaluated using the following criteria. The practical level is 2 or higher.

(Evaluation Criteria)

4: 1.00 or more and less than 1.05
3: 1.05 or more and less than 1.10
2: 1.10 or more and less than 1.15
1: 1.15 or more

[Evaluation of Stability Over Time]

The obtained active energy ray-curable inks were each placed in a sealed container and stored at 25° C. for 10 days, and the viscosity (mPa·s) was measured using an E-type viscometer (TVE-25 type viscometer, type E, manufactured by Toki Sangyo Co., Ltd.) at 25° C. and at a rotation speed of 100 rpm. On the basis of the obtained values, the viscosity change ratio with respect to the initial viscosity (mPa·s) was calculated and evaluated using the following criteria. The practical level is 2 or higher.

Viscosity change ratio (%) =

$$|(\text{viscosity over time/initial viscosity}) - 1| \times 100$$

(Evaluation Criteria)

4: viscosity change ratio is less than 2%
3: viscosity change ratio is 2% or more and less than 5%
2: viscosity change ratio is 5% or more and less than 10%
1: viscosity change ratio is 10% or more <Evaluation of Printed Matter with Active Energy Ray-Curable Ink>

(Production of Printed Matter)

Using an RI tester (manufactured by TESTER SANGYO CO., LTD.), a solid image was printed on a substrate, Tokubishi art paper, with the obtained active-energy ray-curable ink in a quantity of 0.25 ml. Thereafter, the active energy ray-curable ink was cured with an LED lamp ("XP-9" manufactured by Air Motion System Co., Ltd., conditions: irradiation distance 10 mm, output 70%) at a conveyor speed of 60 m/min, and a printed matter as a test sample was produced. Note that the RI tester is a testing machine that prints ink on paper or film, and can adjust the amount of ink transfer and printing pressure.

[Hue Evaluation]

Color measurement of the obtained printed matter was performed using a colorimeter (manufactured by KONICA MINOLTA, INC., CM-700d) capable of measuring the total luminous flux, and the color difference ($\Delta E^*$) was determined on the basis of test samples obtained in comparative examples described in Table 17, and evaluated according to the following criteria. The practical level is 2 or higher.

(Evaluation Criteria)

4: $\Delta E^*$ is less than 1.0
3: $\Delta E^*$ is 1.0 or more and less than 1.5
2: $\Delta E^*$ is 1.5 or more and less than 3.0
1: $\Delta E^*$ is 3.0 or more

TABLE 17

| | Active energy ray-curable ink | Isoindoline compound | Viscosity | TI value | Stability over time | Hue | Reference comparative example |
|---|---|---|---|---|---|---|---|
| Example Q-1 | [Q-1] | (1-1) | 3 | 3 | 4 | 3 | Comparative example Q-1 |
| Example Q-2 | [Q-2] | (1-2) | 3 | 3 | 4 | 3 | |
| Example Q-3 | [Q-3] | (1-3) | 4 | 3 | 4 | 4 | |
| Example Q-4 | [Q-4] | (1-4) | 4 | 4 | 4 | 4 | |
| Example Q-5 | [Q-5] | (1-5) | 3 | 4 | 4 | 3 | |
| Example Q-6 | [Q-6] | (1-6) | 4 | 4 | 4 | 4 | |
| Example Q-7 | [Q-7] | (1-7) | 4 | 4 | 4 | 4 | Comparative example Q-2 |
| Example Q-8 | [Q-8] | (1-8) | 3 | 4 | 4 | 3 | Comparative example Q-3 |
| Example Q-9 | [Q-9] | (1-9) | 4 | 4 | 4 | 4 | Comparative example Q-4 |
| Example Q-10 | [Q-10] | (1-10) | 4 | 3 | 4 | 4 | Comparative example Q-5 |
| Example Q-11 | [Q-11] | (1-11) | 3 | 4 | 4 | 3 | Comparative example Q-6 |
| Example Q-12 | [Q-12] | (2-1) | 4 | 3 | 4 | 4 | Comparative example Q-7 |
| Example Q-13 | [Q-13] | (2-2) | 4 | 3 | 4 | 4 | Comparative example Q-8 |
| Example Q-14 | [Q-14] | (2-3) | 3 | 4 | 4 | 3 | Comparative example Q-9 |
| Example Q-15 | [Q-15] | (2-4) | 4 | 4 | 4 | 3 | Comparative example Q-10 |
| Example Q-16 | [Q-16] | (2-5) | 4 | 3 | 4 | 3 | Comparative example Q-11 |
| Example Q-17 | [Q-17] | (3-1) | 4 | 3 | 4 | 4 | Comparative example Q-1 |
| Example Q-18 | [Q-18] | (1-12) + (1-21) | 3 | 3 | 4 | 3 | |
| Example Q-19 | [Q-19] | (1-12) + (1-21) + (1-22) + (1-23) | 4 | 4 | 4 | 4 | Comparative example Q-12 |
| Example Q-20 | [Q-20] | (1-24) | 4 | 4 | 4 | 4 | Comparative example Q-1 |
| Example Q-21 | [Q-21] | (1-25) | 4 | 4 | 4 | 4 | |
| Comparative example Q-1 | [Q-22] | (1-12) | 1 | 1 | 1 | Reference | |
| Comparative example Q-2 | [Q-23] | (1-13) | 1 | 1 | 1 | Reference | |
| Comparative example Q-3 | [Q-24] | (1-14) | 2 | 1 | 2 | Reference | |
| Comparative example Q-4 | [Q-25] | (1-15) | 2 | 1 | 2 | Reference | |
| Comparative example Q-5 | [Q-26] | (1-16) | 1 | 1 | 2 | Reference | |
| Comparative example Q-6 | [Q-27] | (1-17) | 1 | 1 | 2 | Reference | |
| Comparative example Q-7 | [Q-28] | (2-6) | 1 | 1 | 1 | Reference | |
| Comparative example Q-8 | [Q-29] | (2-7) | 2 | 1 | 2 | Reference | |
| Comparative example Q-9 | [Q-30] | (2-8) | 1 | 1 | 1 | Reference | |
| Comparative example Q-10 | [Q-31] | (2-9) | 1 | 1 | 1 | Reference | |
| Comparative example Q-11 | [Q-32] | (2-10) | 1 | 1 | 1 | Reference | |
| Comparative example Q-12 | [Q-33] | (1-12) + (1-22) + (1-23) | 1 | 1 | 2 | Reference | |

<9> Evaluation of Aqueous Inkjet Ink
<9-1> Production of Aqueous Colorant Composition for Inkjet Ink ("IJ Aqueous Colorant Composition" Below)

(Example J-1) [Production of IJ Aqueous Colorant Composition 1]

Isoindoline compound (1-1): 19.0 parts
Styrene-acrylic acid copolymer (manufactured by BASF Japan Ltd., Joncryl 61J): 16.4 parts
Surfactant (manufactured by Kao Corporation, EMULGEN 420): 5.0 parts
Ion exchanged water: 59.6 parts The above components and 200 parts of 1.25 mm diameter zirconia beads were charged in a 200 ml glass bottle and dispersed using a paint shaker manufactured by Red Devil, Inc. for 6 hours.

The obtained solution was diluted with ion exchanged water, the zirconia beads for dispersion were filtered and separated, and was diluted with ion exchanged water so that the colorant content was 15% to obtain an IJ aqueous colorant composition 1 of the isoindoline compound (1-1).

(Examples J-2 to J-17, J-20 to J-21, Comparative Examples J-1 to J-11) [Production of IJ Aqueous Colorant Compositions 2 to 17 and IJ Aqueous Colorant Compositions 20 to 32]

In the production method of the water-based IJ dispersion 1 described in example J-1, the isoindoline compound (1-1) was modified as described in Table 18. Other than this, aqueous IJ colorant compositions 2 to 17 and aqueous IJ colorant compositions 20 to 32 were obtained in the same manner as in example J-1.

(Example J-18) [Production of IJ Aqueous Colorant Composition 18]

In the production method of the water-based IJ dispersion 1 described in example J-1, 19 parts of the isoindoline compound (1-1) were changed to 18.8 parts of the isoindoline (1-12) and 0.2 parts of the isoindoline (1-21). Other than this, an IJ aqueous colorant composition 18 was obtained in the same manner as in example J-1.

(Example J-19) [Production of IJ Aqueous Colorant Composition 19]

In the production method of the water-based IJ dispersion 1 described in example J-1, 19 parts of the isoindoline compound (1-1) were changed to 18.4 parts of the isoindoline (1-12), 0.2 parts of the isoindoline (1-21), 0.2 parts of the isoindoline (1-22), and 0.2 parts of the isoindoline (1-23). Other than this, an IJ aqueous colorant composition 19 was obtained in the same manner as in example J-1.

(Comparative Example J-12) [Production of IJ Aqueous Colorant Composition 31]

In the production method of the water-based IJ dispersion 1 described in example J-1, 19 parts of the isoindoline compound (1-1) were changed to 18.6 parts of the isoindoline (1-12), 0.2 parts of the isoindoline (1-22), and 0.2 parts of the isoindoline (1-23). Other than this, an IJ aqueous colorant composition 33 was obtained in the same manner as in example J-1.

(Synthesis Example 3) Styrene-Acrylic Acid Ester-Methacrylic Acid Ester Copolymer Having a Carboxy Group and a Hydroxyl Group [PA1]

To a three-liter four-neck flask fitted with a dropping funnel, a thermometer, a nitrogen gas inlet tube, a stirrer, and a reflux condenser, 1,000 parts of methyl ethyl ketone were charged and heated to 78° C., and then a mixed liquid of 100 parts of styrene, 538 parts of n-butyl methacrylate, 104 parts of n-butyl acrylate, 150 parts of 2-hydroxyethyl methacrylate, 108 parts of methacrylic acid, and 80 parts of tertiary butyl peroxy-2-ethyl hexanoate was added dropwise over 4 hours and reacted at the same temperature for 8 hours. After completion of the reaction, methyl ethyl ketone was further added and adjusted so that the non-volatile fraction was 50% to obtain a solution of the styrene-acrylic acid ester-methacrylic acid ester copolymer [PA1] having an acid value of 70 mgKOH/g and a number average molecular weight of 6,000.

(Example J-22) [Production of IJ Aqueous Colorant Composition 34]

An amount of 12.8 parts of a solution of the styrene-acrylic acid ester-methacrylic acid ester copolymer [PA1] (non-volatile fraction 50%) was neutralized using 0.71 parts of dimethylethanolamine, and then mixed with 2.29 parts of a methyletherized melamine resin (Nikalac MX-041 manufactured by Sanwa Chemical Industry Co., Ltd.) (1.6 parts as a resin). To this mixed solution, 50 parts of an aqueous slurry (non-volatile fraction 16%) of a previously produced isoindoline compound (1-3) were added while stirring. Then, 130 parts of 1.5 mm diameter glass beads were charged in a 250 ml glass bottle and dispersed using a paint shaker manufactured by Red Devil, Inc. for 4 hours to obtain a dispersion, and an equal amount of ion exchanged water was added to the mixture. Subsequently, a 1N hydrochloric acid aqueous solution was added with stirring, and the copolymer [PA1] was deposited and fixed on the surface of the isoindoline compound (1-3). Note that after the fixing, the pH of the mixed solution was 3 to 5.

After that, the mixed solution was subjected to suction filtration and washed with ion exchanged water until the pH of the washing solution exceeded 6 to obtain an isoindoline compound (1-3) to which the copolymer [PA1] was fixed.

Then, water was added until the isoindoline compound (1-3) to which the copolymer [PA1] was fixed flowed, 0.8 parts of dimethylethanolamine were added while stirring with a stirrer, and stirring was continued as it was for 1 hour to obtain a redispersion of the isoindoline compound (1-3) to which the copolymer [PA1] was fixed.

Water was added to the redispersion, the non-volatile fraction was adjusted to 19%, 0.5% of an acid crosslinking catalyst (Nacure 2500X manufactured by Kusumoto Chemicals, Ltd.) was added relative to the amount of the copolymer [PA1] contained in the redispersion, and the crosslinking reaction was performed at 95° C. for 1 hour to obtain a water-based colorant composition (IJ aqueous colorant composition 34) that includes pigment composition-containing crosslinked resin particles.

(Synthesis Example 4) Styrene-Acrylic Acid Ester-Methacrylic Acid Ester Copolymer Having a Carboxy Group and an Epoxy Group [PA2]

To a three-liter four-neck flask fitted with a dropping funnel, a thermometer, a nitrogen gas inlet tube, a stirrer, and a reflux condenser, 1,000 parts of methyl ethyl ketone were charged and heated to 78° C., and then a mixed liquid of 100 parts of styrene, 476 parts of n-butyl methacrylate, 116 parts of n-butyl acrylate, 150 parts of 2-hydroxyethyl methacrylate, 50 parts of glycidyl methacrylate, 108 parts of methacrylic acid, and 80 parts of terci-butyl peroxy-2-ethyl hexanoate was added dropwise over 4 hours and reacted at the same temperature for 8 hours. After completion of the reaction, methyl ethyl ketone was further added to adjust so that the non-volatile fraction was 50% to obtain a solution of the styrene-acrylic acid ester-methacrylic acid ester copolymer [PA2] having an acid value of 70 mgKOH/g and a number average molecular weight of 10,500.

(Example J-23) [Production of IJ Aqueous Colorant Composition 35]

An amount of 16 parts of the obtained styrene-acrylic acid ester-methacrylic acid ester copolymer [PA2] solution (non-volatile fraction 50%), 8 parts of the isoindoline compound (1-3), and 40 parts of methyl ethyl ketone were charged in a 250 ml glass bottle together with 130 parts of 1.5 mm diameter glass beads, and dispersed using a paint shaker manufactured by Red Devil, Inc. for 4 hours to obtain a dispersion. Then, 0.8 parts of a hydrophilic epoxy resin (CR-5L manufactured by DIC Corporation) and 24 parts of methyl ethyl ketone were added to the dispersion, and after stirring, the glass beads were filtered and separated. An amount of 87.2 parts of the thus obtained dispersion were put into a mixture of 1.2 parts of dimethylethanolamine and 100 parts of water while stirring, and then an equal amount of ion exchanged water was added to the mixture. Subsequently, a 1N phosphoric acid aqueous solution was added while stirring, and the copolymer [PA2] was deposited and fixed on the surface of the isoindoline compound (1-3). Note that after the fixing, the pH of the mixed solution was 5.

After that, the mixed solution was subjected to suction filtration and washed with ion exchanged water until the pH of the washing solution exceeded 6 to obtain an isoindoline compound (1-3) to which the copolymer [PA2] was fixed.

Then, water was added until the isoindoline compound (1-3) to which the copolymer [PA2] was fixed flowed, 0.8 parts of dimethylethanolamine were added while stirring with a stirrer, and stirring was continued as it was for 1 hour to obtain a redispersion of the isoindoline compound (1-3) to which the copolymer [PA2] was fixed.

Water was added to the redispersion, the non-volatile fraction was adjusted to 19%, and then the redispersion was heated to 95° C. and a crosslinking reaction was performed for 1 hour to obtain a water-based colorant composition (IJ aqueous colorant composition 35) that contains pigment composition-containing crosslinked resin particles.

(Synthesis Example 5) Styrene-Acrylic Acid Ester Copolymer [PA3]

A monomer mixed liquid was prepared by mixing 62 parts of acrylic acid, 129 parts of styrene, and 9 parts of α-methylstyrene. In a reaction container, 20 parts of methyl ethyl ketone, 0.3 parts of 2-mercaptoethanol (polymerization chain transfer agent), and 10% of the monomer mixed liquid were mixed, and the container was sufficiently flushed with nitrogen gas. Also, a mixed liquid of 90% of the remaining monomer mixed liquid, 0.27 parts of the polymerization chain transfer agent, 60 parts of methyl ethyl ketone, and 2.2 parts of an azo-based radical polymerization initiator (manufactured by Wako Pure Chemical Industries, Ltd., V-65, 2,2'-azobis(2,4-dimethylvaleronitrile)) was discharged in a dropping funnel.

The temperature of the mixture in the reaction container was raised to 65° C. while stirring under a nitrogen atmosphere, and then the mixture in the dropping funnel was dropped over 3 hours. After the completion of dropping, the reaction operation was performed at 65° C. for 1 hour, and then a solution in which 0.3 parts of the polymerization initiator were dissolved in 5 parts of methyl ethyl ketone was added, and the reaction was continued at 65° C. for 1 hour. After addition of the polymerization initiator solution and continuation of the reaction were performed two more times, the temperature was raised to 70° C. and the reaction operation was performed for another 1 hour, and then 200 parts of methyl ethyl ketone were added to obtain a solution of styrene-acrylic acid ester copolymer [PA3] with an acid value of 240 mgKOH/g, a number average molecular weight of 5,700, and a weight average molecular weight of 12,500 (non-volatile fraction concentration 40.9%).

The solution of the styrene-acrylic acid ester copolymer [PA3] was dried under reduced pressure, and the solvent was completely removed to obtain 32 parts of the resin, which was then mixed with 204 parts of ion exchanged water, and 11.1 parts of triethanolamine were further added to neutralize about 55 mol % of the carboxy group in the copolymer [PA3]. The mixed solution was heated to 90° C. and then stirred for 1 hour to obtain an aqueous dispersion of the copolymer [PA3] in which the copolymer [PA3] was dispersed in water.

(Example J-24) [Production of IJ Aqueous Colorant Composition 36]

After cooling an aqueous dispersion of the copolymer [PA3] to room temperature, 100 parts of the isoindoline compound (1-3) were added, and the mixture was stirred at 20° C. for 3 hours using a stirrer. An amount of 124 parts of ion exchanged water was added to the mixed solution, and a 15-pass dispersion treatment was performed at a pressure of 150 MPa using a microfluidizer. Then, the obtained dispersion was centrifuged for 20 minutes at 3,660 rpm at a set temperature of 20° C. using a high speed refrigerated centrifuge (manufactured by Hitachi Koki Co., Ltd., himac CR22G), and only the liquid layer part was recovered, and further filtered through a membrane filter having a pore size of 5 μm to obtain an aqueous dispersion of the isoindoline compound (1-3) (non-volatile fraction concentration 25%).

To 100 parts of the aqueous dispersion of the isoindoline compound (1-3), 32 parts of ion exchanged water were added, and 1.8 parts of trimethylolpropane polyglycidyl ether (DENACOL EX-321 manufactured by Nagase ChemteX Corporation) was further added as a crosslinking agent, and the mixture was heated at 70° C. for 5 hours while stirring. Then, the mixture was cooled to room temperature, filtered through a membrane filter with a pore size of 5 μm, and ion exchanged water was further added to adjust the non-volatile fraction to 19%, thereby obtaining a water-based colorant composition (IJ aqueous colorant composition 36) that contains pigment composition-containing crosslinked resin particles.

TABLE 18

| | IJ aqueous colorant composition | Isoindoline compound |
|---|---|---|
| Example J-1 | IJ aqueous colorant composition 1 | (1-1) |
| Example J-2 | IJ aqueous colorant composition 2 | (1-2) |
| Example J-3 | IJ aqueous colorant composition 3 | (1-3) |
| Example J-4 | IJ aqueous colorant composition 4 | (1-4) |
| Example J-5 | IJ aqueous colorant composition 5 | (1-5) |
| Example J-6 | IJ aqueous colorant composition 6 | (1-6) |
| Example J-7 | IJ aqueous colorant composition 7 | (1-7) |
| Example J-8 | IJ aqueous colorant composition 8 | (1-8) |
| Example J-9 | IJ aqueous colorant composition 9 | (1-9) |
| Example J-10 | IJ aqueous colorant composition 10 | (1-10) |
| Example J-11 | IJ aqueous colorant composition 11 | (1-11) |
| Example J-12 | IJ aqueous colorant composition 12 | (2-1) |
| Example J-13 | IJ aqueous colorant composition 13 | (2-2) |
| Example J-14 | IJ aqueous colorant composition 14 | (2-3) |
| Example J-15 | IJ aqueous colorant composition 15 | (2-4) |
| Example J-16 | IJ aqueous colorant composition 16 | (2-5) |
| Example J-17 | IJ aqueous colorant composition 17 | (3-1) |
| Example J-18 | IJ aqueous colorant composition 18 | (1-12) + (1-21) |
| Example J-19 | IJ aqueous colorant composition 19 | (1-12) + (1-21) + (1-22) + (1-23) |
| Example J-20 | IJ aqueous colorant composition 20 | (1-24) |
| Example J-21 | IJ aqueous colorant composition 21 | (1-25) |
| Comparative example J-1 | IJ aqueous colorant composition 22 | (1-12) |
| Comparative example J-2 | IJ aqueous colorant composition 23 | (1-13) |
| Comparative example J-3 | IJ aqueous colorant composition 24 | (1-14) |
| Comparative example J-4 | IJ aqueous colorant composition 25 | (1-15) |
| Comparative example J-5 | IJ aqueous colorant composition 26 | (1-16) |
| Comparative example J-6 | IJ aqueous colorant composition 27 | (1-17) |
| Comparative example J-7 | IJ aqueous colorant composition 28 | (2-6) |
| Comparative example J-8 | IJ aqueous colorant composition 29 | (2-7) |
| Comparative example J-9 | IJ aqueous colorant composition 30 | (2-8) |
| Comparative example J-10 | IJ aqueous colorant composition 31 | (2-9) |
| Comparative example J-11 | IJ aqueous colorant composition 32 | (2-10) |
| Comparative example J-12 | IJ aqueous colorant composition 33 | (1-12) + (1-22) + (1-23) |
| Example J-22 | IJ aqueous colorant composition 34 | (1-3) |
| Example J-23 | IJ aqueous colorant composition 35 | (1-3) |
| Example J-24 | IJ aqueous colorant composition 36 | (1-3) |

<9-2> Preparation of Aqueous Inkjet Ink (Aqueous IJ Ink Below)

Aqueous IJ inks of examples K-1 to K-26 and comparative examples K-1 to K-12 for evaluation tests were obtained by stirring and mixing the components listed in Table 19 and then filtering through a 3 μm membrane filter. In Table 19, any numerical value indicating the amount of a component is a "part" number, and the description of "-" means that the component is not included. Ion exchanged water was used for "water." Other abbreviations in the table indicate the following meanings.

PG: propylene glycol
TEA: triethanolamine
AMP: 2-amino-2-methyl-1-propanol
NH$_3$ 28% aq: 28% ammonia aqueous solution

[Evaluation of Color Change During Long-Term Storage]

Aqueous IJ inks produced in each example and comparative example were filled into mayonnaise bottles and stored in an oven at 50° C. for 4 weeks. Each ink before and after the storage of the ink was coated using a K control coater manufactured by Matsuo Sangyo Co., Ltd. on an OK top coat with a wet film thickness of 6 μm, and then the coated product was dried in an oven at 70° C. for 1 minute to produce the coated product.

Calculation of the color difference (ΔE value) before and after the storage:

Using the obtained coated product, the L*, a*, and b* values of the ink coating film before and after the long-term storage were measured using X-rite eXact manufactured by X-Rite, Incorporated. From the values, the color difference (ΔE* value) before and after the storage was calculated and evaluated. Evaluations of "4", "3", and "2" according to the following evaluation criteria are a practicable grade.

(Evaluation Criteria)

4: color difference (ΔE* value) is less than 2

3: color difference (ΔE* value) is 2 or more and less than 3

2: color difference (ΔE* value) is 3 or more and less than 5

1: color difference (ΔE* value) is 5 or more.

TABLE 19

| | | Example K-1 | Example K-2 | Example K-3 | Example K-4 | Example K-5 | Example K-6 | Example K-7 | Example K-8 | Example K-9 | Example K-10 | Example K-11 |
|---|---|---|---|---|---|---|---|---|---|---|---|---|
| IJ aqueous colorant composition | 1 | 26.67 | — | — | — | — | — | — | — | — | — | — |
| | 2 | — | 26.67 | — | — | — | — | — | — | — | — | — |
| | 3 | — | — | 26.67 | — | — | — | — | — | — | — | — |
| | 4 | — | — | — | 26.67 | 26.67 | 26.67 | — | — | — | — | — |
| | 5 | — | — | — | — | — | — | 26.67 | — | — | — | — |
| | 6 | — | — | — | — | — | — | — | 26.67 | — | — | — |
| | 7 | — | — | — | — | — | — | — | — | 26.67 | — | — |
| | 8 | — | — | — | — | — | — | — | — | — | 26.67 | — |
| | 9 | — | — | — | — | — | — | — | — | — | — | 26.67 |
| PG | | 25.00 | 25.00 | 25.00 | 25.00 | 25.00 | 25.00 | 25.00 | 25.00 | 25.00 | 25.00 | 25.00 |
| TEA | | — | — | — | 1.00 | — | — | — | — | — | — | — |
| AMP | | 1.00 | 1.00 | 1.00 | — | 1.00 | — | 1.00 | 1.00 | 1.00 | 1.00 | 1.00 |
| NH₃ 28% aq | | — | — | — | — | — | 1.00 | — | — | — | — | — |
| Water | | Remaining amount | Remaining amount | Remaining amount | Remaining amount | Remaining amount | Remaining amount | Remaining amount | Remaining amount | Remaining amount | Remaining amount | Remaining amount |
| Total | | 100 | 100 | 100 | 100 | 100 | 100 | 100 | 100 | 100 | 100 | 100 |
| Ink pH value | | 10.5 | 10.5 | 10.5 | 7.8 | 10.5 | 12.1 | 10.5 | 10.5 | 10.5 | 10.5 | 10.5 |
| Color change (ΔE value) | | 2 | 3 | 3 | 3 | 4 | 3 | 3 | 4 | 3 | 4 | 4 |

| | | Example K-12 | Example K-13 | Example K-14 | Example K-15 | Example K-16 | Example K-17 | Example K-18 | Example K-19 | Example K-20 | Example K-21 | Example K-22 | Example K-23 |
|---|---|---|---|---|---|---|---|---|---|---|---|---|---|
| IJ aqueous colorant composition | 10 | 26.67 | — | — | — | — | — | — | — | — | — | — | — |
| | 11 | — | 26.67 | — | — | — | — | — | — | — | — | — | — |
| | 12 | — | — | 26.67 | — | — | — | — | — | — | — | — | — |
| | 13 | — | — | — | 26.67 | — | — | — | — | — | — | — | — |
| | 14 | — | — | — | — | 26.67 | — | — | — | — | — | — | — |
| | 15 | — | — | — | — | — | 26.67 | — | — | — | — | — | — |
| | 16 | — | — | — | — | — | — | 26.67 | — | — | — | — | — |
| | 17 | — | — | — | — | — | — | — | 26.67 | — | — | — | — |
| | 18 | — | — | — | — | — | — | — | — | 26.67 | — | — | — |
| | 19 | — | — | — | — | — | — | — | — | — | 26.67 | — | — |
| | 20 | — | — | — | — | — | — | — | — | — | — | 26.67 | — |
| | 21 | — | — | — | — | — | — | — | — | — | — | — | 26.67 |
| PG | | 25.00 | 25.00 | 25.00 | 25.00 | 25.00 | 25.00 | 25.00 | 25.00 | 25.00 | 25.00 | 25.00 | 25.00 |
| TEA | | — | — | — | — | — | — | — | — | — | — | — | — |
| AMP | | 1.00 | 1.00 | 1.00 | 1.00 | 1.00 | 1.00 | 1.00 | 1.00 | 1.00 | 1.00 | 1.00 | 1.00 |
| NH₃ 28% aq | | — | — | — | — | — | — | — | — | — | — | — | — |
| Water | | Remaining amount | Remaining amount | Remaining amount | Remaining amount | Remaining amount | Remaining amount | Remaining amount | Remaining amount | Remaining amount | Remaining amount | Remaining amount | Remaining amount |
| Total | | 100 | 100 | 100 | 100 | 100 | 100 | 100 | 100 | 100 | 100 | 100 | 100 |
| Ink pH value | | 6.5 | 7.8 | 10.5 | 12.1 | 10.5 | 10.5 | 10.5 | 10.5 | 10.5 | 10.5 | 10.5 | 10.5 |
| Color change (ΔE value) | | 3 | 4 | 3 | 4 | 3 | 4 | 4 | 3 | 4 | 4 | 4 | 4 |

| | | Comparative example K-1 | Comparative example K-2 | Comparative example K-3 | Comparative example K-4 | Comparative example K-5 | Comparative example K-6 | Comparative example K-7 | Comparative example K-8 | Comparative example K-9 | Comparative example K-10 | Comparative example K-11 | Comparative example K-12 |
|---|---|---|---|---|---|---|---|---|---|---|---|---|---|
| IJ aqueous colorant composition | 22 | 26.67 | — | — | — | — | — | — | — | — | — | — | — |
| | 23 | — | 26.67 | — | — | — | — | — | — | — | — | — | — |
| | 24 | — | — | 26.67 | — | — | — | — | — | — | — | — | — |
| | 25 | — | — | — | 26.67 | — | — | — | — | — | — | — | — |
| | 26 | — | — | — | — | 26.67 | — | — | — | — | — | — | — |
| | 27 | — | — | — | — | — | 26.67 | — | — | — | — | — | — |

TABLE 19-continued

| | | | | | | | | | | | | | |
|---|---|---|---|---|---|---|---|---|---|---|---|---|---|
| | 28 | — | — | — | — | — | — | 26.67 | — | — | — | — | — |
| | 29 | — | — | — | — | — | — | — | 26.67 | — | — | — | — |
| | 30 | — | — | — | — | — | — | — | — | 26.67 | — | — | — |
| | 31 | — | — | — | — | — | — | — | — | — | 26.67 | — | — |
| | 32 | — | — | — | — | — | — | — | — | — | — | 26.67 | — |
| | 33 | — | — | — | — | — | — | — | — | — | — | — | 26.67 |
| PG | | 25.00 | 25.00 | 25.00 | 25.00 | 25.00 | 25.00 | 25.00 | 25.00 | 25.00 | 25.00 | 28.00 | 27.00 |
| TEA | | — | — | — | — | — | — | — | — | — | — | — | — |
| AMP | | 1.00 | 1.00 | 1.00 | 1.00 | 1.00 | 1.00 | 1.00 | 1.00 | 1.00 | 1.00 | 1.00 | 1.00 |
| NH$_3$ 28% aq | | — | — | — | — | — | — | — | — | — | — | — | — |
| Water | | Remaining amount | Remaining amount | Remaining amount | Remaining amount | Remaining amount | Remaining amount | Remaining amount | Remaining amount | Remaining amount | Remaining amount | Remaining amount | Remaining amount |
| Total | | 100 | 100 | 100 | 100 | 100 | 100 | 100 | 100 | 100 | 100 | 100 | 100 |
| Ink pH value | | 6.5 | 7.8 | 10.5 | 12.1 | 10.5 | 10.5 | 10.5 | 10.5 | 10.5 | 10.5 | 10.5 | 10.5 |
| Color change (ΔE value) | | 1 | 1 | 1 | 1 | 1 | 1 | 1 | 1 | 1 | 1 | 1 | 1 |

| | | Example K-3 | Example K-24 | Example K-25 | Example K-26 |
|---|---|---|---|---|---|
| IJ aqueous colorant composition | 3 | 26.67 | — | — | — |
| | 34 | — | 26.67 | — | — |
| | 35 | — | — | 26.67 | — |
| | 36 | — | — | — | 26.67 |
| PG | | 25.00 | 25.00 | 25.00 | 25.00 |
| TEA | | — | — | — | 1.00 |
| AMP | | 1.00 | 1.00 | 1.00 | — |
| NH$_3$ 28% aq | | — | — | — | — |
| Water | | Remaining amount | Remaining amount | Remaining amount | Remaining amount |
| Total | | 100 | 100 | 100 | 100 |
| Ink pH value | | 10.5 | 10.5 | 10.5 | 10.5 |
| Color change (ΔE value) | | 3 | 4 | 4 | 4 |

From the above results, it is evident the effects of the pigment composition including the isoindoline compound (1) and the isoindoline compound (2). For example, the results of Table 7 provide a composition for molding capable of forming a molded body having excellent heat resistance. The toner results also provide a toner having excellent pigment dispersibility. The coating material results also provide a coating material having excellent weather resistance. In particular, discoloration can be suppressed. From the results of the gravure ink, it is evident that a printing ink excellent in viscosity change and transparency, and excellent in scratch resistance and adhesiveness in printed matters can be obtained. From the results of the aqueous flexographic ink, it is evident that an aqueous flexographic ink improved in dispersibility and stability over time can be obtained. From the results of the active energy ray curable ink, it is evident that an active energy ray curable ink improved in initial viscosity and storage stability can be obtained. From the results of the water-based colorant composition, it is evident that the initial viscosity and storage stability can be improved. Furthermore, from the results of the aqueous inkjet ink, it is evident that an inkjet ink capable of suppressing the color change of the ink coating film during long-term storage stability can be obtained. In particular, it can be confirmed that further improvement of long-term storage stability can be achieved by using it as a pigment composition-containing crosslinked resin particles. Note that although each embodiment illustrates a colorant composition made by using a typical isoindoline compound and the use thereof, the embodiments of the present invention are not limited thereto. Compounds corresponding to the isoindoline compound (1) and the isoindoline compound (2) can be used for various applications, and the effects similar to those of the embodiments specifically illustrated can be obtained by using the compounds. For example, the desired effects can be easily obtained even when other forms of inks, such as aqueous inkjet inks, are prepared using colorant compositions used in gravure inks and aqueous flexographic inks.

<III> Ink Set and its Characteristics Evaluation

<Gravure Ink Set>

A gravure ink set was prepared using the obtained isoindoline compound, and its characteristics evaluation was performed.

(Synthesis Example 6) Polyurethane Resin Solution [PU2]

An amount of 54.719 parts of a polyester diol having a number average molecular weight of 2,000 obtained from adipic acid and 3-methyl-1,5-pentanediol, 3.989 parts of an isophorone diisocyanate, and 10.0 parts of n-propyl acetate were reacted under a stream of nitrogen at 85° C. for 3 hours, 10.0 parts of n-propyl acetate were added, and the mixture was cooled to obtain 78.718 parts of a solvent solution of a terminal isocyanate prepolymer.

Next, 78.718 parts of the obtained terminal isocyanate prepolymer solvent solution were gradually added at room temperature to a mixture of 1.031 parts of isophorone diamine, 0.261 parts of di-n-butylamine, 30.4 parts of n-propyl acetate, and 19.6 parts of isopropyl alcohol, and then reacted at 50° C. for 1 hour to obtain a polyurethane resin solution [PU2] having a non-volatile fraction of 30%, a weight average molecular weight of 60,000, and an amine value of 3.0 mgKOH/g.

(Synthesis Example 7) Polyurethane Resin Solution [PU3]

An amount of 161.9 parts of PPA (poly(propylene glycol) adipate diol having a number average molecular weight of 2,000), 27.7 parts of 2,2-dimethylolbutanoic acid (DMBA), 96.4 parts of isophorone diisocyanate (IPDI), and 200 parts of methyl ethyl ketone (MEK) were charged while introducing nitrogen gas in a reaction container equipped with a reflux condenser, a dropping funnel, a gas inlet tube, a stirring device, and a thermometer, and reacted at 90° C. for 5 hours to obtain a resin solution of a urethane prepolymer having a terminal isocyanate group.

A mixture of 13.6 parts of 2-(2-aminoethylamino)ethanol (ΔEA), 0.5 parts of ethanolamine (MEA), and 350 parts of isopropyl alcohol (IPA) was added dropwise to the obtained terminal isocyanate group urethane prepolymer resin solution over 60 minutes at room temperature, and further reacted at 70° C. for 3 hours. Further, the non-volatile fraction was adjusted using 150 parts of MEK to obtain a polyurethane resin solution [PU3] having a non-volatile fraction of 30%, a weight average molecular weight of 35,000, Mw/Mn=3.0, an acid value of 35.0 mgKOH/g, and a hydroxyl group value of 25.7 mgKOH/g.

(Synthesis Example 8) Aluminum Phthalocyanine

To a reaction container, 1,250 parts of n-amyl alcohol, 225 parts of phthalodinitrile, and 78 parts of aluminum chloride anhydride were added, and mixed and stirred. To this, 266 parts of DBU (1,8-diazabicyclo[5.4.0]undec-7-ene) was added, and the mixture was warmed and refluxed at 136° C. for 5 hours. The reaction solution, which was cooled to 30° C. while stirring, was poured into a mixed solvent of 5,000 parts of methanol and 10,000 parts of water while stirring to obtain a blue slurry. The slurry was filtered, washed with a mixed solvent of 2,000 parts of methanol and 4,000 parts of water, and dried to obtain 135 parts of chloroaluminum phthalocyanine represented by the following chemical formula (16).

[Chemical formula 9]

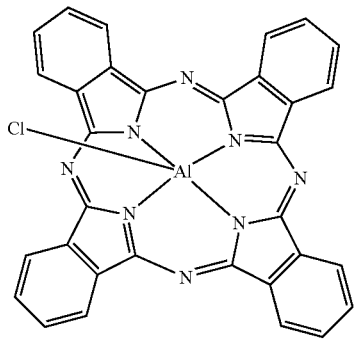

(16)

Then, 1,500 parts of concentrated sulfuric acid were added to the reaction container, and then 100 parts of the above chloroaluminum phthalocyanine were added under an ice bath, and the mixture was stirred at 25° C. for 4 hours. Subsequently, the sulfuric acid solution was poured into 9,000 parts of cold water at 3° C., and the precipitate formed was filtered, washed with water, washed with a 1% sodium hydroxide aqueous solution, washed with water, and dried to obtain 98 parts of aluminum phthalocyanine represented by the following chemical formula (11).

[Chemical formula 10]

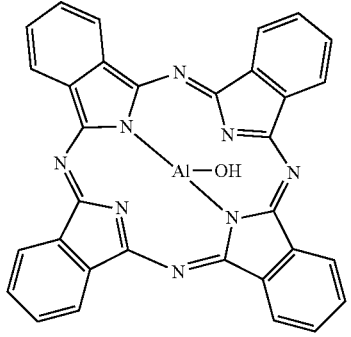

(11)

(Synthesis Example 9) Titanyl Phthalocyanine

To a reaction container, 1,280 parts of 1-hexanol, 320 parts of quinoline, 320 parts of 1,3-diiminoisoindoline, and 206.3 parts of tetrabutyl orthotitanate were added, and mixed and stirred. The temperature was raised to 155° C., and the mixture was refluxed for 8 hours. Note that the n-butanol generated from a system was recovered so as not to return to the system. To the reaction solution, which was cooled to 60° C. while stirring, 1,000 parts of methanol were added, the slurry was filtered, washed in the order of 1,000 parts of methanol, 500 parts of N-methylpyrrolidone, and 1,000 parts of methanol, and dried to obtain 250 parts of titanyl phthalocyanine crude represented by the following chemical formula (12).

[Chemical formula 11]

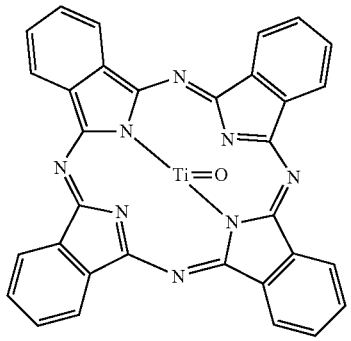

(12)

Next, 1,500 parts of concentrated sulfuric acid were added to the reaction container, and then 100 parts of the above titanyl phthalocyanine crude were added under an ice bath, and the mixture was stirred at 25° C. for 4 hours. Subsequently, the sulfuric acid solution was poured into 9,000 parts of cold water at 3° C., and the precipitate formed was filtered, washed with water, washed with a 1% sodium hydroxide aqueous solution, and washed with water in this order to obtain a cake. Then, 1,000 parts of diethylene glycol and the obtained cake were added to the reaction container, stirred to make a slurry, and stirred at 120° C. for 3 hours. The slurry cooled to 60° C. was filtered, washed with 5,000 parts of water, and dried to obtain 87 parts of titanyl phthalocyanine.

(Example LY-1) [Production of Yellow Ink [LY-1]]

An amount of 7.0 parts of the isoindoline compound (1-1), 34.5 parts of the polyurethane resin solution [PU2], 20 parts of N-propyl acetate, and 5 parts of isopropyl alcohol were mixed and stirred, and kneaded in a Sand mill, and then 20 parts of the polyurethane resin solution [PU2], 11 parts of N-propyl acetate, and 3 parts of isopropyl alcohol were added to obtain a yellow ink [LY-1].

(Examples LY-2 to LY-20, Production Examples LY-1 to LY-11, LC-1 to LC-5, LM-1 to LM-10) [Production of Yellow Inks [LY-2] to [LY-31], Cyan Inks [LC-1] to [LC-6], and Magenta Inks [LM-1] to [LM-10]]

The inks described in Table 20 were obtained in the same manner as in example LY-1 except that 7.0 parts of the isoindoline compound (1-1) were changed to the compounds described in Table 20 and the amounts described in Table 20.

TABLE 20

| | Pigment | | |
|---|---|---|---|
| | Compound name Pigment name | Charged amount [part] | Obtained ink |
| Example LY-1 | Isoindoline compound (1-1) | 7.00 | Yellow ink [LY-1] |
| Example LY-2 | Isoindoline compound (1-2) | 7.00 | Yellow ink [LY-2] |
| Example LY-3 | Isoindoline compound (1-3) | 7.00 | Yellow ink [LY-3] |
| Example LY-4 | Isoindoline compound (1-4) | 7.00 | Yellow ink [LY-4] |
| Example LY-5 | Isoindoline compound (1-5) | 7.00 | Yellow ink [LY-5] |
| Example LY-6 | Isoindoline compound (1-6) | 7.00 | Yellow ink [LY-6] |
| Example LY-7 | Isoindoline compound (1-7) | 7.00 | Yellow ink [LY-7] |
| Example LY-8 | Isoindoline compound (1-8) | 7.00 | Yellow ink [LY-8] |
| Example LY-9 | Isoindoline compound (1-9) | 7.00 | Yellow ink [LY-9] |
| Example LY-10 | Isoindoline compound (1-10) | 7.00 | Yellow ink [LY-10] |
| Example LY-11 | Isoindoline compound (1-11) | 7.00 | Yellow ink [LY-11] |
| Example LY-12 | Isoindoline compound (2-1) | 7.00 | Yellow ink [LY-12] |
| Example LY-13 | Isoindoline compound (2-2) | 7.00 | Yellow ink [LY-13] |
| Example LY-14 | Isoindoline compound (2-3) | 7.00 | Yellow ink [LY-14] |
| Example LY-15 | Isoindoline compound (2-4) | 7.00 | Yellow ink [LY-15] |
| Example LY-16 | Isoindoline compound (3-1) | 7.00 | Yellow ink [LY-16] |
| Example LY-17 | Isoindoline compound (1-12) | 6.93 | Yellow ink [LY-17] |
| | Isoindoline compound (1-21) | 0.07 | |
| Example LY-18 | Isoindoline compound (1-12) | 6.79 | Yellow ink [LY-18] |
| | Isoindoline compound (1-21) | 0.07 | |
| | Isoindoline compound (1-22) | 0.07 | |
| | Isoindoline compound (1-23) | 0.07 | |
| Example LY-19 | Isoindoline compound (1-24) | 7.00 | Yellow ink [LY-19] |
| Example LY-20 | Isoindoline compound (1-25) | 7.00 | Yellow ink [LY-20] |
| Production example LY-1 | Isoindoline compound (1-12) | 7.00 | Yellow ink [LY-21] |
| Production example LY-2 | Isoindoline compound (1-13) | 7.00 | Yellow ink [LY-22] |
| Production example LY-3 | Isoindoline compound (1-14) | 7.00 | Yellow ink [LY-23] |
| Production example LY-4 | Isoindoline compound (1-15) | 7.00 | Yellow ink [LY-24] |
| Production example LY-5 | Isoindoline compound (1-16) | 7.00 | Yellow ink [LY-25] |
| Production example LY-6 | Isoindoline compound (1-17) | 7.00 | Yellow ink [LY-26] |
| Production example LY-7 | Isoindoline compound (2-6) | 7.00 | Yellow ink [LY-27] |
| Production example LY-8 | Isoindoline compound (2-7) | 7.00 | Yellow ink [LY-28] |
| Production example LY-9 | Isoindoline compound (2-8) | 7.00 | Yellow ink [LY-29] |
| Production example LY-10 | Isoindoline compound (2-9) | 7.00 | Yellow ink [LY-30] |
| Production example LY-11 | Isoindoline compound (1-12) | 6.86 | Yellow ink [LY-31] |
| | Isoindoline compound (1-22) | 0.07 | |
| | Isoindoline compound (1-23) | 0.07 | |
| Production example LC-1 | PB15:3 | 6.50 | Cyan ink [LC-1] |
| Production example LC-2 | PB15:4 | 6.50 | Cyan ink [LC-2] |
| Production example LC-3 | PB16 | 7.00 | Cyan ink [LC-3] |
| Production example LC-4 | Aluminum phthalocyanine | 7.00 | Cyan ink [LC-4] |
| Production example LC-5 | Titanyl phthalocyanine | 7.00 | Cyan ink [LC-5] |
| Production example LC-6 | PB15:6 | 6.70 | Cyan ink [LC-6] |
| Production example LM-1 | PR122 | 7.40 | Magenta ink [LM-1] |
| Production example LM-2 | PV19 | 7.40 | Magenta ink [LM-2] |
| Production example LM-3 | PR48:3 | 7.00 | Magenta ink [LM-3] |
| Production example LM-4 | PR57:1 | 7.00 | Magenta ink [LM-4] |
| Production example LM-5 | PR146 | 7.00 | Magenta ink [LM-5] |
| Production example LM-6 | PR185 | 7.00 | Magenta ink [LM-6] |
| Production example LM-7 | PR144 | 7.10 | Magenta ink [LM-7] |
| Production example LM-8 | PR179 | 7.20 | Magenta ink [LM-8] |
| Production example LM-9 | PR255 | 7.00 | Magenta ink [LM-9] |
| Production example LM-10 | PR264 | 7.00 | Magenta ink [LM-10] |

The pigments used in the production of the inks are shown in Table 21.

TABLE 21

| Pigment | Product name |
| --- | --- |
| PB15:3 | LIONOL BLUE FG-7358-G (manufactured by TOYOCOLOR CO., LTD.) |
| PB15:4 | LIONOL BLUE FG-7400-G (manufactured by TOYOCOLOR CO., LTD.) |
| PB16 | Heliogen Blue D7490 (manufactured by BASF Japan Ltd.) |
| Aluminum phthalocyanine | Aluminum phthalocyanine in synthesis example 7 |
| Titanyl phthalocyanine | Titanyl phthalocyanine in synthesis example 8 |
| PR122 | Hostaperm Pink E 02 (manufactured by CLARIANT) |
| PV19 | Hostaperm Red Violet ER02 (manufactured by CLARIANT) |
| PR48:3 | FUJI Red 5R 763 (manufacture by Fuji Pigment Co., LTD) |
| PR57:1 | LIONOL RED 6B FG-4306-G (manufactured by TOYOCOLOR CO., LTD.) |
| PR146 | LIONOL RED 5620 (manufactured by TOYOCOLOR CO., LTD.) |
| PR185 | Novoperm Carmine HF4C (manufactured by CLARIANT) |
| PR144 | Cromophtal Red D3890 (manufactured by BASF Japan Ltd.) |
| PR179 | Paliogen Red L3885 (manufactured by BASF Japan Ltd.) |
| PR255 | Irgazin Scarlet L3550HD (manufactured by BASF Japan Ltd.) |
| PR264 | Irgazin Rubine L4025 (manufactured by BASF Japan Ltd.) |

[Evaluation Method and Evaluation Criteria]
<Evaluation of Gravure Ink>
[Viscosity Stability Over Time]
Yellow inks [LY-1] to [LY-31], cyan inks [LC-1] to [LC-5], and magenta inks [LM-1] to [LM-10] were each stored in a sealed container at 40° C. for 14 days. Viscosity was then measured and evaluated by comparing the change in viscosity from before storage. Note that viscosity was measured at 25° C. with Zahn Cup No. 4 in outflow seconds. Note that the viscosity of any of the inks in the B-type viscometer before storage was within the range of 40 to 500 cps (25° C.). Table 23 shows the results.
(Evaluation Criteria)
○: viscosity change is less than 2 seconds (good)
Δ: viscosity change is 2 seconds or more and less than 5 seconds (practical)
X: viscosity change is 5 seconds or more (poor)
<Evaluation of Ink Set>

(Examples LS-1 to LS-69, Comparative Examples LS-1 to LS-24) [Production of Ink Sets 1 to 93]

Ink sets 1 to 93 were produced by combining the obtained inks as described in Table 22. Trapping property and gamut of the obtained ink sets were evaluated using the following methods. Table 23 shows the results.

TABLE 22

| | Ink set | Yellow ink | Cyan ink | Magenta ink |
| --- | --- | --- | --- | --- |
| Example LS-1 | Ink set 1 | [LY-1] | [LC-1] | [LM-1] |
| Example LS-2 | Ink set 2 | [LY-2] | [LC-1] | [LM-1] |
| Example LS-3 | Ink set 3 | [LY-3] | [LC-1] | [LM-1] |
| Example LS-4 | Ink set 4 | [LY-4] | [LC-1] | [LM-1] |
| Example LS-5 | Ink set 5 | [LY-5] | [LC-1] | [LM-1] |
| Example LS-6 | Ink set 6 | [LY-6] | [LC-1] | [LM-1] |
| Example LS-7 | Ink set 7 | [LY-7] | [LC-1] | [LM-1] |
| Example LS-8 | Ink set 8 | [LY-8] | [LC-1] | [LM-1] |
| Example LS-9 | Ink set 9 | [LY-9] | [LC-1] | [LM-1] |
| Example LS-10 | Ink set 10 | [LY-10] | [LC-1] | [LM-1] |
| Example LS-11 | Ink set 11 | [LY-11] | [LC-1] | [LM-1] |
| Example LS-12 | Ink set 12 | [LY-12] | [LC-1] | [LM-1] |
| Example LS-13 | Ink set 13 | [LY-13] | [LC-1] | [LM-1] |
| Example LS-14 | Ink set 14 | [LY-14] | [LC-1] | [LM-1] |
| Example LS-15 | Ink set 15 | [LY-15] | [LC-1] | [LM-1] |
| Example LS-16 | Ink set 16 | [LY-16] | [LC-1] | [LM-1] |
| Example LS-17 | Ink set 17 | [LY-17] | [LC-1] | [LM-1] |
| Example LS-18 | Ink set 18 | [LY-18] | [LC-1] | [LM-1] |
| Example LS-19 | Ink set 19 | [LY-19] | [LC-1] | [LM-1] |
| Example LS-20 | Ink set 20 | [LY-20] | [LC-1] | [LM-1] |
| Example LS-21 | Ink set 21 | [LY-4] | [LC-1] | [LM-2] |
| Example LS-22 | Ink set 22 | [LY-4] | [LC-1] | [LM-3] |
| Example LS-23 | Ink set 23 | [LY-4] | [LC-1] | [LM-4] |
| Example LS-24 | Ink set 24 | [LY-4] | [LC-1] | [LM-5] |
| Example LS-25 | Ink set 25 | [LY-4] | [LC-1] | [LM-6] |
| Example LS-26 | Ink set 26 | [LY-4] | [LC-1] | [LM-7] |
| Example LS-27 | Ink set 27 | [LY-4] | [LC-1] | [LM-8] |
| Example LS-28 | Ink set 28 | [LY-4] | [LC-1] | [LM-9] |
| Example LS-29 | Ink set 29 | [LY-4] | [LC-1] | [LM-10] |
| Example LS-30 | Ink set 30 | [LY-4] | [LC-2] | [LM-1] |
| Example LS-31 | Ink set 31 | [LY-4] | [LC-2] | [LM-2] |
| Example LS-32 | Ink set 32 | [LY-4] | [LC-2] | [LM-3] |
| Example LS-33 | Ink set 33 | [LY-4] | [LC-2] | [LM-4] |
| Example LS-34 | Ink set 34 | [LY-4] | [LC-2] | [LM-5] |
| Example LS-35 | Ink set 35 | [LY-4] | [LC-2] | [LM-6] |
| Example LS-36 | Ink set 36 | [LY-4] | [LC-2] | [LM-7] |
| Example LS-37 | Ink set 37 | [LY-4] | [LC-2] | [LM-8] |
| Example LS-38 | Ink set 38 | [LY-4] | [LC-2] | [LM-9] |
| Example LS-39 | Ink set 39 | [LY-4] | [LC-2] | [LM-10] |
| Example LS-40 | Ink set 40 | [LY-4] | [LC-3] | [LM-1] |
| Example LS-41 | Ink set 41 | [LY-4] | [LC-3] | [LM-2] |
| Example LS-42 | Ink set 42 | [LY-4] | [LC-3] | [LM-3] |
| Example LS-43 | Ink set 43 | [LY-4] | [LC-3] | [LM-4] |
| Example LS-44 | Ink set 44 | [LY-4] | [LC-3] | [LM-5] |
| Example LS-45 | Ink set 45 | [LY-4] | [LC-3] | [LM-6] |
| Example LS-46 | Ink set 46 | [LY-4] | [LC-3] | [LM-7] |
| Example LS-47 | Ink set 47 | [LY-4] | [LC-3] | [LM-8] |
| Example LS-48 | Ink set 48 | [LY-4] | [LC-3] | [LM-9] |
| Example LS-49 | Ink set 49 | [LY-4] | [LC-3] | [LM-10] |
| Example LS-50 | Ink set 50 | [LY-4] | [LC-4] | [LM-1] |
| Example LS-51 | Ink set 51 | [LY-4] | [LC-4] | [LM-2] |
| Example LS-52 | Ink set 52 | [LY-4] | [LC-4] | [LM-3] |
| Example LS-53 | Ink set 53 | [LY-4] | [LC-4] | [LM-4] |
| Example LS-54 | Ink set 54 | [LY-4] | [LC-4] | [LM-5] |
| Example LS-55 | Ink set 55 | [LY-4] | [LC-4] | [LM-6] |
| Example LS-56 | Ink set 56 | [LY-4] | [LC-4] | [LM-7] |
| Example LS-57 | Ink set 57 | [LY-4] | [LC-4] | [LM-8] |
| Example LS-58 | Ink set 58 | [LY-4] | [LC-4] | [LM-9] |
| Example LS-59 | Ink set 59 | [LY-4] | [LC-4] | [LM-10] |
| Example LS-60 | Ink set 60 | [LY-4] | [LC-5] | [LM-1] |
| Example LS-61 | Ink set 61 | [LY-4] | [LC-5] | [LM-2] |
| Example LS-62 | Ink set 62 | [LY-4] | [LC-5] | [LM-3] |
| Example LS-63 | Ink set 63 | [LY-4] | [LC-5] | [LM-4] |
| Example LS-64 | Ink set 64 | [LY-4] | [LC-5] | [LM-5] |
| Example LS-65 | Ink set 65 | [LY-4] | [LC-5] | [LM-6] |
| Example LS-66 | Ink set 66 | [LY-4] | [LC-5] | [LM-7] |
| Example LS-67 | Ink set 67 | [LY-4] | [LC-5] | [LM-8] |
| Example LS-68 | Ink set 68 | [LY-4] | [LC-5] | [LM-9] |
| Example LS-69 | Ink set 69 | [LY-4] | [LC-5] | [LM-10] |

TABLE 22-continued

|  | Ink set | Yellow ink | Cyan ink | Magenta ink |
|---|---|---|---|---|
| Comparative example LS-1 | Ink set 70 | [LY-21] | [LC-1] | [LM-1] |
| Comparative example LS-2 | Ink set 71 | [LY-22] | [LC-1] | [LM-1] |
| Comparative example LS-3 | Ink set 72 | [LY-23] | [LC-1] | [LM-1] |
| Comparative example LS-4 | Ink set 73 | [LY-24] | [LC-1] | [LM-1] |
| Comparative example LS-5 | Ink set 74 | [LY-25] | [LC-1] | [LM-1] |
| Comparative example LS-6 | Ink set 75 | [LY-26] | [LC-1] | [LM-1] |
| Comparative example LS-7 | Ink set 76 | [LY-27] | [LC-1] | [LM-1] |
| Comparative example LS-8 | Ink set 77 | [LY-28] | [LC-1] | [LM-1] |
| Comparative example LS-9 | Ink set 78 | [LY-29] | [LC-1] | [LM-1] |
| Comparative example LS-10 | Ink set 79 | [LY-30] | [LC-1] | [LM-1] |
| Comparative example LS-11 | Ink set 80 | [LY-31] | [LC-1] | [LM-1] |
| Comparative example LS-12 | Ink set 81 | [LY-21] | [LC-1] | [LM-2] |
| Comparative example LS-13 | Ink set 82 | [LY-21] | [LC-1] | [LM-3] |
| Comparative example LS-14 | Ink set 83 | [LY-21] | [LC-1] | [LM-4] |
| Comparative example LS-15 | Ink set 84 | [LY-21] | [LC-1] | [LM-5] |
| Comparative example LS-16 | Ink set 85 | [LY-21] | [LC-1] | [LM-6] |
| Comparative example LS-17 | Ink set 86 | [LY-21] | [LC-1] | [LM-7] |
| Comparative example LS-18 | Ink set 87 | [LY-21] | [LC-1] | [LM-8] |
| Comparative example LS-19 | Ink set 88 | [LY-21] | [LC-1] | [LM-9] |
| Comparative example LS-20 | Ink set 89 | [LY-21] | [LC-1] | [LM-10] |
| Comparative example LS-21 | Ink set 90 | [LY-21] | [LC-2] | [LM-1] |
| Comparative example LS-22 | Ink set 91 | [LY-21] | [LC-3] | [LM-1] |
| Comparative example LS-23 | Ink set 92 | [LY-21] | [LC-4] | [LM-1] |
| Comparative example LS-24 | Ink set 93 | [LY-21] | [LC-5] | [LM-1] |

[Trapping Property Evaluation]
(Cyan Ink/Yellow Ink)

Cyan ink and yellow ink were each diluted with a mixed solvent 1 (methyl ethyl ketone:N-propyl acetate:isopropanol=40:40:20) so that the viscosity was 16 seconds (25° C., Zahn Cup No. 3).

On the corona discharge treated surface of a corona discharge treated polyester film having a thickness of 12 μm (manufactured by TOYOBO Co., Ltd., E-5100) (initial evaluation of trapping property), cyan and yellow were printed on each other in this order to obtain a printed matter.

The printing conditions were as follows: temperature 25° C., humidity 60%, printing speed 100 m/min, and printing distance 4,000 m. A helio 175 line gradation plate (printing type compressed, solid pattern 75% and gradation pattern 100% to 3%) was used for cyan ink, and a helio 175 line gradation plate (printing type elongate, solid pattern 75% and gradation pattern 100% to 3%) was used for yellow ink.

Cyan ink and yellow ink were each stored in a sealed container at 40° C. for 14 days, and then diluted and printed in the same manner as above to obtain a printed matter (over time evaluation of trapping property).
(Yellow Ink/Magenta Ink)

Yellow ink and magenta ink were each diluted with the above mixed solvent 1 so that the viscosity was 16 seconds (25° C., Zahn Cup No. 3).

On the corona discharge treated surface of a corona discharge treated polyester film having a thickness of 12 μm (manufactured by TOYOBO Co., Ltd., E-5100), yellow and magenta were printed on each other in this order to obtain a printed matter (initial evaluation of trapping property).

The printing conditions were as follows: temperature 25° C., humidity 60%, printing speed 100 m/min, and printing distance 4,000 m. A helio 175 line gradation plate (printing type elongate, solid pattern 75% and gradation pattern 100% to 3%) was used for yellow ink, and a helio 175 line gradation plate (printing type elongate, solid pattern 75% and gradation pattern 100% to 3%) was used for magenta ink.

Yellow ink and magenta ink were each stored in a sealed container at 40° C. for 14 days, then diluted and printed in the same manner as described above to obtain a printed matter (over time evaluation of trapping property).

Trapping property of the gradation overprinted part of the obtained printed matter was observed using a microscope (VHX-5000) manufactured by KEYENCE CORPORATION, and evaluated according to the following criteria.
(Evaluation Criteria)
○: unevenness in printing occurs at a cell depth of less than 70% (good)
Δ: unevenness occurs at a cell depth of 70% or more and less than 80% (usable)
x: unevenness occurs at a cell depth of 80% or more, or all overlapped ink becomes halftone dots and does not wet-spread (unusable)

[Gamut Evaluation]
(Initial Evaluation)

Cyan ink, magenta ink, and yellow ink were diluted with the mixed solvent 1 so that the viscosity was 16 seconds (25° C., Zahn Cup No. 3). The diluted inks were used to print in the order of cyan, magenta, and yellow to obtain a printed matter having a monochromatic solid part (cyan, magenta, yellow) and a monochromatic solid overprinted part (cyan× magenta, cyan×yellow, yellow×magenta). The printing conditions are as follows.
(Printing Conditions)
Printing machine: FUJI MACHINERY 5-color machine
Cyan plate: helio 175 L/inch, stylus angle 120°, elongate
Magenta plate: helio 175 L/inch, stylus angle 120°, compressed
Yellow plate: helio 175 L/inch, stylus angle 120°, compressed
Printing speed: 150 m/min
Substrate: corona-treated biaxially stretched polypropylene (OPP) film (pyrene P-2161, 20 μm manufactured by TOYOBO Co., Ltd.)
Drying temperature: 50° C.

For the obtained printed matter, the density value of the monochromatic solid part (yellow, magenta, cyan) of the printed matter was measured using a Gretagmacbeth D196. In addition, using a SpectroEye manufactured by Gretagmacbeth LLC as a measurement device, color measurement was performed on the monochromatic solid part and the overprinted part under the conditions of D50 light source, 2 degree observation field, white back (using a standard white plate), and no filter.

In a two-dimensional space with a* as the horizontal axis and b* as the vertical axis, a hexagon obtained by plotting the values of a* versus b* of six colors of the monochromatic solid part (yellow, magenta, cyan) and the monochromatic solid overprinted part (cyan×magenta, cyan×yellow, yellow×magenta) was prepared, and the area was determined. The area ratio when the area of the reference comparative example was set to 100% was determined, and the area ratio was evaluated by the following criteria. Specifically, the comparative example described in Table 23 was used as the reference. Note that - indicates not evaluated.
(Evaluation Criteria)
○: area ratio is 90% or more (good)
Δ: area ratio is 85% or more and less than 90% (usable)
x: area ratio is less than 85% (unusable)
(Over Time Evaluation)

Cyan ink, magenta ink, and yellow ink were each stored in an airtight container at 40° C. for 14 days, then diluted, and printed in the same manner as for the initial evaluation to obtain a printed matter.

Color measurement was performed on the obtained printed matter as in the initial evaluation described above.

In a two-dimensional space with a* as the horizontal axis and b* as the vertical axis, a hexagon obtained by plotting the values of a* versus b* of six colors of the monochromatic solid part (yellow, magenta, cyan) and the monochromatic solid overprinted part (cyan×magenta, cyan×yellow, yellow×magenta) was prepared, and the area was determined. The area ratio obtained by dividing the area of over time evaluation by the area of the initial evaluation in each example and comparative example was calculated, and the area ratio was evaluated using the following criteria. "-" indicates not evaluated.

(Evaluation Criteria)

○: area ratio is 98% or more (good)

Δ: area ratio is 95% or more and less than 98% (practical)

x: area ratio is less than 95% (defective)

TABLE 23

| | Viscosity stability over time | | | Trapping property | | | | Gamut | | Reference comparative example |
|---|---|---|---|---|---|---|---|---|---|---|
| | | | | Cyan/yellow | | Yello/magenta | | | | |
| | Yellow ink | Cyan ink | Magenta ink | Initial | Over time | Initial | Over time | Initial | Over time | |
| Example LS-1 | Δ | ○ | ○ | ○ | ○ | ○ | ○ | ○ | Δ | Comparative example LS-1 |
| Example LS-2 | Δ | ○ | ○ | ○ | Δ | ○ | Δ | ○ | Δ | |
| Example LS-3 | Δ | ○ | ○ | ○ | Δ | ○ | Δ | ○ | Δ | |
| Example LS-4 | ○ | ○ | ○ | ○ | ○ | ○ | ○ | ○ | ○ | |
| Example LS-5 | ○ | ○ | ○ | ○ | ○ | ○ | ○ | ○ | ○ | |
| Example LS-6 | ○ | ○ | ○ | ○ | Δ | ○ | ○ | ○ | ○ | |
| Example LS-7 | Δ | ○ | ○ | ○ | ○ | ○ | ○ | ○ | Δ | Comparative example LS-2 |
| Example LS-8 | ○ | ○ | ○ | ○ | ○ | ○ | ○ | ○ | ○ | Comparative example LS-3 |
| Example LS-9 | ○ | ○ | ○ | ○ | ○ | ○ | ○ | ○ | ○ | Comparative example LS-4 |
| Example LS-10 | ○ | ○ | ○ | ○ | ○ | ○ | ○ | ○ | ○ | Comparative example LS-5 |
| Example LS-11 | ○ | ○ | ○ | ○ | Δ | ○ | ○ | ○ | ○ | Comparative example LS-6 |
| Example LS-12 | ○ | ○ | ○ | ○ | ○ | ○ | ○ | ○ | ○ | Comparative example LS-7 |
| Example LS-13 | ○ | ○ | ○ | ○ | ○ | ○ | ○ | ○ | ○ | Comparative example LS-8 |
| Example LS-14 | ○ | ○ | ○ | ○ | ○ | ○ | ○ | ○ | ○ | Comparative example LS-9 |
| Example LS-15 | ○ | ○ | ○ | ○ | ○ | ○ | ○ | ○ | ○ | Comparative example LS-10 |
| Example LS-16 | ○ | ○ | ○ | ○ | ○ | ○ | ○ | ○ | ○ | Comparative example LS-1 |
| Example LS-17 | Δ | ○ | ○ | ○ | ○ | ○ | ○ | ○ | Δ | |
| Example LS-18 | ○ | ○ | ○ | ○ | Δ | ○ | ○ | ○ | ○ | Comparative example LS-11 |
| Example LS-19 | ○ | ○ | ○ | ○ | ○ | ○ | ○ | ○ | ○ | Comparative example LS-1 |
| Example LS-20 | ○ | ○ | ○ | ○ | ○ | ○ | ○ | ○ | ○ | |
| Example LS-21 | ○ | ○ | ○ | ○ | ○ | ○ | ○ | ○ | ○ | |
| Example LS-22 | ○ | ○ | ○ | ○ | ○ | ○ | ○ | ○ | ○ | |
| Example LS-23 | ○ | ○ | ○ | ○ | ○ | ○ | ○ | ○ | ○ | |
| Example LS-24 | ○ | ○ | ○ | ○ | ○ | ○ | ○ | ○ | ○ | |
| Example LS-25 | ○ | ○ | ○ | ○ | ○ | ○ | ○ | ○ | ○ | |
| Example LS-26 | ○ | ○ | ○ | ○ | ○ | ○ | ○ | Δ | — | — |
| Example LS-27 | ○ | ○ | ○ | ○ | ○ | ○ | ○ | Δ | — | — |
| Example LS-28 | ○ | ○ | ○ | ○ | ○ | ○ | ○ | Δ | — | — |
| Example LS-29 | ○ | ○ | ○ | ○ | ○ | ○ | ○ | Δ | — | — |
| Example LS-30 | ○ | ○ | ○ | ○ | ○ | ○ | ○ | ○ | ○ | Comparative example LS-1 |
| Example LS-31 | ○ | ○ | ○ | ○ | ○ | ○ | ○ | ○ | ○ | |
| Example LS-32 | ○ | ○ | ○ | ○ | ○ | ○ | ○ | ○ | ○ | |
| Example LS-33 | ○ | ○ | ○ | ○ | ○ | ○ | ○ | ○ | ○ | |
| Example LS-34 | ○ | ○ | ○ | ○ | ○ | ○ | ○ | ○ | ○ | |
| Example LS-35 | ○ | ○ | ○ | ○ | ○ | ○ | ○ | ○ | ○ | |
| Example LS-36 | ○ | ○ | ○ | ○ | ○ | ○ | ○ | Δ | — | — |
| Example LS-37 | ○ | ○ | ○ | ○ | ○ | ○ | ○ | Δ | — | — |
| Example LS-38 | ○ | ○ | ○ | ○ | ○ | ○ | ○ | Δ | — | — |
| Example LS-39 | ○ | ○ | ○ | ○ | ○ | ○ | ○ | Δ | — | — |
| Example LS-40 | ○ | ○ | ○ | ○ | ○ | ○ | ○ | ○ | ○ | Comparative example LS-22 |
| Example LS-41 | ○ | ○ | ○ | ○ | ○ | ○ | ○ | ○ | ○ | |
| Example LS-42 | ○ | ○ | ○ | ○ | ○ | ○ | ○ | ○ | ○ | |
| Example LS-43 | ○ | ○ | ○ | ○ | ○ | ○ | ○ | ○ | ○ | |
| Example LS-44 | ○ | ○ | ○ | ○ | ○ | ○ | ○ | ○ | ○ | |
| Example LS-45 | ○ | ○ | ○ | ○ | ○ | ○ | ○ | ○ | ○ | |

| | Viscosity stability over time | | | Trapping property | | | | Gamut | | Reference comparative example |
|---|---|---|---|---|---|---|---|---|---|---|
| | | | | Cyan/yellow | | Yello/magenta | | | | |
| | Yellow ink | Cyan ink | Magenta ink | Initial | Over time | Initial | Over time | Initial | Over time | |
| Example LS-46 | ○ | ○ | ○ | ○ | ○ | ○ | Δ | — | — | |
| Example LS-47 | ○ | ○ | ○ | ○ | ○ | ○ | Δ | — | — | |
| Example LS-48 | ○ | ○ | ○ | ○ | ○ | ○ | Δ | — | — | |
| Example LS-49 | ○ | ○ | ○ | ○ | ○ | ○ | Δ | — | — | |
| Example LS-50 | ○ | ○ | ○ | ○ | ○ | ○ | ○ | — | — | |
| Example LS-51 | ○ | ○ | ○ | ○ | ○ | ○ | ○ | — | — | |
| Example LS-52 | ○ | ○ | ○ | ○ | ○ | ○ | ○ | — | — | |
| Example LS-53 | ○ | ○ | ○ | ○ | ○ | ○ | ○ | — | — | |
| Example LS-54 | ○ | ○ | ○ | ○ | ○ | ○ | ○ | — | — | |

TABLE 23-continued

| | | | | | | | | | | |
|---|---|---|---|---|---|---|---|---|---|---|
| Example LS-55 | o | o | o | o | o | o | o | — | — | |
| Example LS-56 | o | o | o | o | o | o | Δ | — | — | |
| Example LS-57 | o | o | o | o | o | o | Δ | — | — | |
| Example LS-58 | o | o | o | o | o | o | Δ | — | — | |
| Example LS-59 | o | o | o | o | o | o | Δ | — | — | |
| Example LS-60 | o | o | o | o | o | o | o | — | — | |
| Example LS-61 | o | o | o | o | o | o | o | — | — | |
| Example LS-62 | o | o | o | o | o | o | o | — | — | |
| Example LS-63 | o | o | o | o | o | o | o | — | — | |
| Example LS-64 | o | o | o | o | o | o | o | — | — | |
| Example LS-65 | o | o | o | o | o | o | o | — | — | |
| Example LS-66 | o | o | o | o | o | o | Δ | — | — | |
| Example LS-67 | o | o | o | o | o | o | Δ | — | — | |
| Example LS-68 | o | o | o | o | o | o | Δ | — | — | |
| Example LS-69 | o | o | o | o | o | o | Δ | — | — | |
| Comparative example LS-1 | x | o | o | o | Δ | o | Δ | Reference | x | |
| Comparative example LS-2 | x | o | o | o | Δ | o | Δ | Reference | x | |
| Comparative example LS-3 | x | o | o | o | Δ | o | Δ | Reference | x | |
| Comparative example LS-4 | x | o | o | o | Δ | o | Δ | Reference | x | |
| Comparative example LS-5 | x | o | o | o | Δ | o | Δ | Reference | x | |
| Comparative example LS-6 | x | o | o | o | Δ | o | Δ | Reference | x | |
| Comparative example LS-7 | x | o | o | o | Δ | o | Δ | Reference | x | |
| Comparative example LS-8 | x | o | o | o | Δ | o | Δ | Reference | x | |
| Comparative example LS-9 | x | o | o | o | Δ | o | Δ | Reference | x | |
| Comparative example LS-10 | x | o | o | o | Δ | o | Δ | Reference | x | |
| Comparative example LS-11 | x | o | o | o | x | o | x | Reference | x | |
| Comparative example LS-12 | x | o | o | o | Δ | o | Δ | o | x | Comparative example LS-1 |
| Comparative example LS-13 | x | o | o | o | Δ | o | Δ | o | x | |
| Comparative example LS-14 | x | o | o | o | Δ | o | Δ | o | x | |
| Comparative example LS-15 | x | o | o | o | Δ | o | Δ | o | x | |
| Comparative example LS-16 | x | o | o | o | Δ | o | Δ | o | x | |
| Comparative example LS-17 | x | o | o | o | Δ | o | x | — | — | |
| Comparative example LS-18 | x | o | o | o | Δ | o | x | — | — | |
| Comparative example LS-19 | x | o | o | o | Δ | o | x | — | — | |
| Comparative example LS-20 | x | o | o | o | Δ | o | x | — | — | |
| Comparative example LS-21 | x | o | o | o | Δ | o | Δ | o | x | Comparative example LS-1 |
| Comparative example LS-22 | x | o | o | o | Δ | o | Δ | Reference | x | |
| Comparative example LS-20 | x | o | o | o | x | o | Δ | — | — | |
| Comparative example LS-24 | x | o | o | o | x | o | Δ | — | — | |

As can be seen from the results shown in Table 23, the gravure ink set according to one embodiment of the present invention had a similar or higher gamut area ratio and better color reproducibility than those of the conventional ink set. In addition, the viscosity stability of the yellow ink over time was improved, and the storage stability as the ink set was good. Furthermore, the trapping property and color reproducibility (gamut) of each color over time were also good, and the storage stability as the ink set was good.

In contrast, comparative examples LS-1 to LS-24 showed poor viscosity stability of yellow ink over time, and the trapping property and color reproducibility (gamut) of each color over time were also poor. Therefore, it is obvious that the storage stability as an ink set is poor and the issue of the present application cannot be solved.

<Production of clear ink>
(Production of Clear Ink [1])

A clear ink [1] was obtained by stirring and mixing 87 parts of the polyurethane resin solution [PU3] (non-volatile fraction 30%), 5 parts of ethyl acetate (EA), 5 parts of IPA, and 3 parts of silica ("P-73" manufactured by Mizusawa Industrial Chemicals, Ltd., hydrophilic silica particles having an average particle size of 3.8 μm) using a disper.

<Production of Adhesives Having Detachability Properties>
(Production of Laminating Adhesive Solution [1])

To a four-neck separable flask, 82 parts of terephthalic acid, 682 parts of isophthalic acid, 236 parts of adipic acid, 236 parts of ethylene glycol, 525 parts of neopentyl glycol, and 405 parts of 1,6-hexanediol were charged, and the esterification reaction was performed at 220 to 260° C. After the distillation of a predetermined amount of water, the pressure was gradually reduced to 1 mmHg or less, and the deglycolation reaction was performed at 240 to 260° C. for 5 hours. Then, 2 parts of isophorone diisocyanate were gradually added, and the reaction operation was performed at 150° C. for about 2 hours to obtain a polyester polyurethane polyol.

To 100 parts of the polyester polyurethane polyol, 2.83 parts of trimellitic anhydride were added, and the reaction operation was performed at 180° C. for about 2 hours. Then, dilution to 50% of the non-volatile fraction was performed with ethyl acetate to obtain a partially acid-modified polyester polyol solution having a number average molecular weight of 6,000 and an acid value of 16.5 mgKOH/g.

An amount of 100 parts of the obtained polyol solution were mixed with 7.94 parts of an ethyl acetate solution with HDI biuret non-volatile fraction of 95%, and ethyl acetate was added to obtain a laminating adhesive solution [1] having a non-volatile fraction of 30%.

<Evaluation of Packaging Materials>

(Example LP-1) [Production of Packaging Material 1]

The cyan ink [LC-1], magenta ink [LM-1], and yellow ink [LY-1] were diluted with the mixed solvent 1 so that the viscosity was 16 seconds (25° C., Zahn Cup No. 3).

Using each of the diluted inks, a gravure proof 5-color machine equipped with a gravure plate having a cell depth of 20 μm, and an ink set 101 including black ink (LIOAL-PHA R92 black ink, manufactured by TOYO INK CO., LTD.), cyan ink [LC-1], magenta ink [LM-1], yellow ink

[LY-1], and white ink (LIOALPHA R631 white, manufactured by TOYO INK CO., LTD.) were prepared. Using these, black ink, cyan ink [LC-1], magenta ink [LM-1], yellow ink [LY-1], and white ink were printed on each other in this order on a corona-treated oriented polypropylene film (OPP substrate) having a thickness of 20 μm. In each unit, drying was each performed at 50° C. to obtain a printed matter having a structure of "OPP substrate/black, cyan, magenta, yellow, or white printed layer".

Next, a urethane-based laminate adhesive (TM320/CAT13B manufactured by Toyo-Morton, Ltd., non-volatile fraction 30% ethyl acetate solution) was coated on the printed layer of the obtained printed material so that the coating amount after drying was 2.0 g/m$^2$, and dried. Then, a cast polyethylene (PE) film having a thickness of 50 μm was bonded to the adhesive layer to obtain a packaging material 1 having a structure of "OPP substrate/5 color overprinted layer/adhesive layer/PE substrate".

(Examples LP-2 to LP-69) [Production of Packaging Materials 2 to 69]

The ink set 101 used in example LP-1 was changed to the ink set illustrated in Table 24. Other than this, packaging materials 2 to 69 were obtained in the same manner as in example LP-1.

TABLE 24

|  | Packaging material | Ink set | Black ink | Yellow ink | Cyan ink | Magenta ink | White ink |
| --- | --- | --- | --- | --- | --- | --- | --- |
| Example LP-1 | Packaging material 1 | Ink set 101 | LIOALPHA R92 black | [LY-1] | [LC-1] | [LM-1] | LIOALPHA R631 white |
| Example LP-2 | Packaging material 2 | Ink set 102 |  | [LY-2] | [LC-1] | [LM-1] |  |
| Example LP-3 | Packaging material 3 | Ink set 103 |  | [LY-3] | [LC-1] | [LM-1] |  |
| Example LP-4 | Packaging material 4 | Ink set 104 |  | [LY-4] | [LC-1] | [LM-1] |  |
| Example LP-5 | Packaging material 5 | Ink set 105 |  | [LY-5] | [LC-1] | [LM-1] |  |
| Example LP-6 | Packaging material 6 | Ink set 106 |  | [LY-6] | [LC-1] | [LM-1] |  |
| Example LP-7 | Packaging material 7 | Ink set 107 |  | [LY-7] | [LC-1] | [LM-1] |  |
| Example LP-8 | Packaging material 8 | Ink set 108 |  | [LY-8] | [LC-1] | [LM-1] |  |
| Example LP-9 | Packaging material 9 | Ink set 109 |  | [LY-9] | [LC-1] | [LM-1] |  |
| Example LP-10 | Packaging material 10 | Ink set 110 |  | [LY-10] | [LC-1] | [LM-1] |  |
| Example LP-11 | Packaging material 11 | Ink set 111 |  | [LY-11] | [LC-1] | [LM-1] |  |
| Example LP-12 | Packaging material 12 | Ink set 112 |  | [LY-12] | [LC-1] | [LM-1] |  |
| Example LP-13 | Packaging material 13 | Ink set 113 |  | [LY-13] | [LC-1] | [LM-1] |  |
| Example LP-14 | Packaging material 14 | Ink set 114 |  | [LY-14] | [LC-1] | [LM-1] |  |
| Example LP-15 | Packaging material 15 | Ink set 115 |  | [LY-15] | [LC-1] | [LM-1] |  |
| Example LP-16 | Packaging material 16 | Ink set 116 |  | [LY-16] | [LC-1] | [LM-1] |  |
| Example LP-17 | Packaging material 17 | Ink set 117 |  | [LY-17] | [LC-1] | [LM-1] |  |
| Example LP-18 | Packaging material 18 | Ink set 118 |  | [LY-18] | [LC-1] | [LM-1] |  |
| Example LP-19 | Packaging material 19 | Ink set 119 |  | [LY-19] | [LC-1] | [LM-1] |  |
| Example LP-20 | Packaging material 20 | Ink set 120 |  | [LY-20] | [LC-1] | [LM-1] |  |
| Example LP-21 | Packaging material 21 | Ink set 121 |  | [LY-4] | [LC-1] | [LM-2] |  |
| Example LP-22 | Packaging material 22 | Ink set 122 |  | [LY-4] | [LC-1] | [LM-3] |  |
| Example LP-23 | Packaging material 23 | Ink set 123 |  | [LY-4] | [LC-1] | [LM-4] |  |
| Example LP-24 | Packaging material 24 | Ink set 124 |  | [LY-4] | [LC-1] | [LM-5] |  |
| Example LP-25 | Packaging material 25 | Ink set 125 |  | [LY-4] | [LC-1] | [LM-6] |  |
| Example LP-26 | Packaging material 26 | Ink set 126 |  | [LY-4] | [LC-1] | [LM-7] |  |
| Example LP-27 | Packaging material 27 | Ink set 127 |  | [LY-4] | [LC-1] | [LM-8] |  |
| Example LP-28 | Packaging material 28 | Ink set 128 |  | [LY-4] | [LC-1] | [LM-9] |  |
| Example LP-29 | Packaging material 29 | Ink set 129 |  | [LY-4] | [LC-1] | [LM-10] |  |
| Example LP-30 | Packaging material 30 | Ink set 130 |  | [LY-4] | [LC-2] | [LM-1] |  |
| Example LP-31 | Packaging material 31 | Ink set 131 |  | [LY-4] | [LC-2] | [LM-2] |  |
| Example LP-32 | Packaging material 32 | Ink set 132 |  | [LY-4] | [LC-2] | [LM-3] |  |
| Example LP-33 | Packaging material 33 | Ink set 133 |  | [LY-4] | [LC-2] | [LM-4] |  |
| Example LP-34 | Packaging material 34 | Ink set 134 |  | [LY-4] | [LC-2] | [LM-5] |  |
| Example LP-35 | Packaging material 35 | Ink set 135 |  | [LY-4] | [LC-2] | [LM-6] |  |
| Example LP-36 | Packaging material 36 | Ink set 136 | LIOALPHA R92 black | [LY-4] | [LC-2] | [LM-7] | LIOALPHA R631 white |
| Example LP-37 | Packaging material 37 | Ink set 137 |  | [LY-4] | [LC-2] | [LM-8] |  |
| Example LP-38 | Packaging material 38 | Ink set 138 |  | [LY-4] | [LC-2] | [LM-9] |  |
| Example LP-39 | Packaging material 39 | Ink set 139 |  | [LY-4] | [LC-2] | [LM-10] |  |
| Example LP-40 | Packaging material 40 | Ink set 140 |  | [LY-4] | [LC-3] | [LM-1] |  |
| Example LP-41 | Packaging material 41 | Ink set 141 |  | [LY-4] | [LC-3] | [LM-2] |  |
| Example LP-42 | Packaging material 42 | Ink set 142 |  | [LY-4] | [LC-3] | [LM-3] |  |
| Example LP-43 | Packaging material 43 | Ink set 143 |  | [LY-4] | [LC-3] | [LM-4] |  |
| Example LP-44 | Packaging material 44 | Ink set 144 |  | [LY-4] | [LC-3] | [LM-5] |  |
| Example LP-45 | Packaging material 45 | Ink set 145 |  | [LY-4] | [LC-3] | [LM-6] |  |
| Example LP-46 | Packaging material 46 | Ink set 146 |  | [LY-4] | [LC-3] | [LM-7] |  |
| Example LP-47 | Packaging material 47 | Ink set 147 |  | [LY-4] | [LC-3] | [LM-8] |  |
| Example LP-48 | Packaging material 48 | Ink set 148 |  | [LY-4] | [LC-3] | [LM-9] |  |
| Example LP-49 | Packaging material 49 | Ink set 149 |  | [LY-4] | [LC-3] | [LM-10] |  |
| Example LP-50 | Packaging material 50 | Ink set 150 |  | [LY-4] | [LC-4] | [LM-1] |  |
| Example LP-51 | Packaging material 51 | Ink set 151 |  | [LY-4] | [LC-4] | [LM-2] |  |
| Example LP-52 | Packaging material 52 | Ink set 152 |  | [LY-4] | [LC-4] | [LM-3] |  |
| Example LP-53 | Packaging material 53 | Ink set 153 |  | [LY-4] | [LC-4] | [LM-4] |  |
| Example LP-54 | Packaging material 54 | Ink set 154 |  | [LY-4] | [LC-4] | [LM-5] |  |
| Example LP-55 | Packaging material 55 | Ink set 155 |  | [LY-4] | [LC-4] | [LM-6] |  |
| Example LP-56 | Packaging material 56 | Ink set 156 |  | [LY-4] | [LC-4] | [LM-7] |  |
| Example LP-57 | Packaging material 57 | Ink set 157 |  | [LY-4] | [LC-4] | [LM-8] |  |
| Example LP-58 | Packaging material 58 | Ink set 158 |  | [LY-4] | [LC-4] | [LM-9] |  |
| Example LP-59 | Packaging material 59 | Ink set 159 |  | [LY-4] | [LC-4] | [LM-10] |  |
| Example LP-60 | Packaging material 60 | Ink set 160 |  | [LY-4] | [LC-5] | [LM-1] |  |
| Example LP-61 | Packaging material 61 | Ink set 161 |  | [LY-4] | [LC-5] | [LM-2] |  |

TABLE 24-continued

|  | Packaging material | Ink set | Black ink | Yellow ink | Cyan ink | Magenta ink | White ink |
|---|---|---|---|---|---|---|---|
| Example LP-62 | Packaging material 62 | Ink set 162 |  | [LY-4] | [LC-5] | [LM-3] |  |
| Example LP-63 | Packaging material 63 | Ink set 163 |  | [LY-4] | [LC-5] | [LM-4] |  |
| Example LP-64 | Packaging material 64 | Ink set 164 |  | [LY-4] | [LC-5] | [LM-5] |  |
| Example LP-65 | Packaging material 65 | Ink set 165 |  | [LY-4] | [LC-5] | [LM-6] |  |
| Example LP-66 | Packaging material 66 | Ink set 166 |  | [LY-4] | [LC-5] | [LM-7] |  |
| Example LP-67 | Packaging material 67 | Ink set 167 |  | [LY-4] | [LC-5] | [LM-8] |  |
| Example LP-68 | Packaging material 68 | Ink set 168 |  | [LY-4] | [LC-5] | [LM-9] |  |
| Example LP-69 | Packaging material 69 | Ink set 169 |  | [LY-4] | [LC-5] | [LM-10] |  |

(Example LP-101) [Production of Packaging Material 101]

The clear ink [1] described above was diluted with an EA/IPA mixed solvent (mass ratio 70/30) so that the viscosity was 15 seconds (25° C., Zahn Cup No. 3).

The cyan ink [LC-1], magenta ink [LM-1], and yellow ink [LY-1] were diluted with the above mixed solvent 1 so that the viscosity was 16 seconds (25° C., Zahn Cup No. 3).

Using each of the diluted inks, a gravure proof 5-color machine equipped with a gravure plate having a cell depth of 20 μm, and an ink set 201 including the clear ink [1], cyan ink [LC-1], magenta ink [LM-1], and yellow ink [LY-1] were prepared. Using these, the clear ink [1], cyan ink [LC-1], magenta ink [LM-1], and yellow ink [LY-1] were printed on each other in this order on a corona-treated oriented polypropylene film having a thickness of 20 μm. In each unit, drying was each performed at 50° C. to obtain a printed matter having a structure of "OPP substrate/detachable layer (clear ink)/cyan, magenta, or yellow printed layer" and including a detachable layer (a printed layer having detachability).

Next, the laminating adhesive solution [1] was coated using a dry laminator on the printed layer of the obtained printed matter, and bonding with an aluminum-deposited unstretched polypropylene (VMCPP) film having a thickness of 25 μm is performed at a line speed of 40 m/min to obtain a packaging material 101 having a detachable layer having a structure of "OPP substrate/detachable layer (printed layer having detachability)/3 color overprinted layer/adhesive layer having detachability/VMCPP substrate".

(Examples LP-102 to LP-169) [Production of Packaging Materials 102 to 169]

The ink set 201 used in example LP-101 was changed to the ink set illustrated in Table 25. Other than this, packaging materials 102 to 169 having a detachable layer was obtained in the same manner as in example LP-101.

TABLE 25

|  | Packaging material | Ink set | Clear ink | Yellow ink | Cyan ink | Magenta ink |
|---|---|---|---|---|---|---|
| Example LP-101 | Packaging material 101 | ink set 201 | Clear ink [1] | [LY-1] | [LC-1] | [LM-1] |
| Example LP-102 | Packaging material 102 | Ink set 202 |  | [LY-2] | [LC-1] | [LM-1] |
| Example LP-103 | Packaging material 103 | Ink set 203 |  | [LY-3] | [LC-1] | [LM-1] |
| Example LP-104 | Packaging material 104 | Ink set 204 |  | [LY-4] | [LC-1] | [LM-1] |
| Example LP-105 | Packaging material 105 | Ink set 205 |  | [LY-5] | [LC-1] | [LM-1] |
| Example LP-106 | Packaging material 106 | Ink set 206 |  | [LY-6] | [LC-1] | [LM-1] |
| Example LP-107 | Packaging material 107 | Ink set 207 |  | [LY-7] | [LC-1] | [LM-1] |
| Example LP-108 | Packaging material 108 | Ink set 208 |  | [LY-8] | [LC-1] | [LM-1] |
| Example LP-109 | Packaging material 109 | Ink set 209 |  | [LY-9] | [LC-1] | [LM-1] |
| Example LP-110 | Packaging material 110 | Ink set 210 |  | [LY-10] | [LC-1] | [LM-1] |
| Example LP-111 | Packaging material 111 | Ink set 211 |  | [LY-11] | [LC-1] | [LM-1] |
| Example LP-112 | Packaging material 112 | Ink set 212 |  | [LY-12] | [LC-1] | [LM-1] |
| Example LP-113 | Packaging material 113 | Ink set 213 |  | [LY-13] | [LC-1] | [LM-1] |
| Example LP-114 | Packaging material 114 | Ink set 214 |  | [LY-14] | [LC-1] | [LM-1] |
| Example LP-115 | Packaging material 115 | Ink set 215 |  | [LY-15] | [LC-1] | [LM-1] |
| Example LP-116 | Packaging material 116 | Ink set 216 |  | [LY-16] | [LC-1] | [LM-1] |
| Example LP-117 | Packaging material 117 | Ink set 217 |  | [LY-17] | [LC-1] | [LM-1] |
| Example LP-118 | Packaging material 118 | Ink set 218 |  | [LY-18] | [LC-1] | [LM-1] |
| Example LP-119 | Packaging material 119 | Ink set 219 |  | [LY-19] | [LC-1] | [LM-1] |
| Example LP-120 | Packaging material 120 | Ink set 220 |  | [LY-20] | [LC-1] | [LM-1] |
| Example LP-121 | Packaging material 121 | Ink set 221 |  | [LY-4] | [LC-1] | [LM-2] |
| Example LP-122 | Packaging material 122 | Ink set 222 |  | [LY-4] | [LC-1] | [LM-3] |
| Example LP-123 | Packaging material 123 | Ink set 223 |  | [LY-4] | [LC-1] | [LM-4] |
| Example LP-124 | Packaging material 124 | Ink set 224 |  | [LY-4] | [LC-1] | [LM-5] |
| Example LP-125 | Packaging material 125 | Ink set 225 |  | [LY-4] | [LC-1] | [LM-6] |
| Example LP-126 | Packaging material 126 | Ink set 226 |  | [LY-4] | [LC-1] | [LM-7] |
| Example LP-127 | Packaging material 127 | Ink set 227 |  | [LY-4] | [LC-1] | [LM-8] |
| Example LP-128 | Packaging material 128 | Ink set 228 |  | [LY-4] | [LC-1] | [LM-9] |
| Example LP-129 | Packaging material 129 | Ink set 229 |  | [LY-4] | [LC-1] | [LM-10] |
| Example LP-130 | Packaging material 130 | Ink set 230 |  | [LY-4] | [LC-2] | [LM-1] |
| Example LP-131 | Packaging material 131 | Ink set 231 |  | [LY-4] | [LC-2] | [LM-2] |
| Example LP-132 | Packaging material 132 | Ink set 232 |  | [LY-4] | [LC-2] | [LM-3] |
| Example LP-133 | Packaging material 133 | Ink set 233 |  | [LY-4] | [LC-2] | [LM-4] |
| Example LP-134 | Packaging material 134 | Ink set 234 |  | [LY-4] | [LC-2] | [LM-5] |
| Example LP-135 | Packaging material 135 | Ink set 235 |  | [LY-4] | [LC-2] | [LM-6] |
| Example LP-136 | Packaging material 136 | Ink set 236 | Clear ink [1] | [LY-4] | [LC-2] | [LM-7] |
| Example LP-137 | Packaging material 137 | Ink set 237 |  | [LY-4] | [LC-2] | [LM-8] |

TABLE 25-continued

| | Packaging material | Ink set | Clear ink | Yellow ink | Cyan ink | Magenta ink |
|---|---|---|---|---|---|---|
| Example LP-138 | Packaging material 138 | Ink set 238 | | [LY-4] | [LC-2] | [LM-9] |
| Example LP-139 | Packaging material 139 | Ink set 239 | | [LY-4] | [LC-2] | [LM-10] |
| Example LP-140 | Packaging material 140 | Ink set 240 | | [LY-4] | [LC-3] | [LM-1] |
| Example LP-141 | Packaging material 141 | Ink set 241 | | [LY-4] | [LC-3] | [LM-2] |
| Example LP-142 | Packaging material 142 | Ink set 242 | | [LY-4] | [LC-3] | [LM-3] |
| Example LP-143 | Packaging material 143 | Ink set 243 | | [LY-4] | [LC-3] | [LM-4] |
| Example LP-144 | Packaging material 144 | Ink set 244 | | [LY-4] | [LC-3] | [LM-5] |
| Example LP-145 | Packaging material 145 | Ink set 245 | | [LY-4] | [LC-3] | [LM-6] |
| Example LP-146 | Packaging material 146 | Ink set 246 | | [LY-4] | [LC-3] | [LM-7] |
| Example LP-147 | Packaging material 147 | Ink set 247 | | [LY-4] | [LC-3] | [LM-8] |
| Example LP-148 | Packaging material 148 | Ink set 248 | | [LY-4] | [LC-3] | [LM-9] |
| Example LP-149 | Packaging material 149 | Ink set 249 | | [LY-4] | [LC-3] | [LM-10] |
| Example LP-150 | Packaging material 150 | Ink set 250 | | [LY-4] | [LC-4] | [LM-1] |
| Example LP-151 | Packaging material 151 | Ink set 251 | | [LY-4] | [LC-4] | [LM-2] |
| Example LP-152 | Packaging material 152 | Ink set 252 | | [LY-4] | [LC-4] | [LM-3] |
| Example LP-153 | Packaging material 153 | Ink set 253 | | [LY-4] | [LC-4] | [LM-4] |
| Example LP-154 | Packaging material 154 | Ink set 254 | | [LY-4] | [LC-4] | [LM-5] |
| Example LP-155 | Packaging material 155 | Ink set 255 | | [LY-4] | [LC-4] | [LM-6] |
| Example LP-156 | Packaging material 156 | Ink set 256 | | [LY-4] | [LC-4] | [LM-7] |
| Example LP-157 | Packaging material 157 | Ink set 257 | | [LY-4] | [LC-4] | [LM-8] |
| Example LP-158 | Packaging material 158 | Ink set 258 | | [LY-4] | [LC-4] | [LM-9] |
| Example LP-159 | Packaging material 159 | Ink set 259 | | [LY-4] | [LC-4] | [LM-10] |
| Example LP-160 | Packaging material 160 | Ink set 260 | | [LY-4] | [LC-5] | [LM-1] |
| Example LP-161 | Packaging material 161 | Ink set 261 | | [LY-4] | [LC-5] | [LM-2] |
| Example LP-162 | Packaging material 162 | Ink set 262 | | [LY-4] | [LC-5] | [LM-3] |
| Example LP-163 | Packaging material 163 | Ink set 263 | | [LY-4] | [LC-5] | [LM-4] |
| Example LP-164 | Packaging material 164 | Ink set 264 | | [LY-4] | [LC-5] | [LM-5] |
| Example LP-165 | Packaging material 165 | Ink set 265 | | [LY-4] | [LC-5] | [LM-6] |
| Example LP-166 | Packaging material 166 | Ink set 266 | | [LY-4] | [LC-5] | [LM-7] |
| Example LP-167 | Packaging material 167 | Ink set 267 | | [LY-4] | [LC-5] | [LM-8] |
| Example LP-168 | Packaging material 168 | Ink set 268 | | [LY-4] | [LC-5] | [LM-9] |
| Example LP-169 | Packaging material 169 | Ink set 269 | | [LY-4] | [LC-5] | [LM-10] |

By using the gravure ink set of the present invention, packaging materials could be produced.

<Inkjet Ink Set>

An inkjet ink set was prepared using an obtained isoindoline compound, and its characteristics evaluation was performed.

(Example MY-1) [Water-Based Colorant Composition for Ink Jet (Hereinafter Referred to as "IJ Aqueous Colorant Composition") Production of IJ Aqueous Colorant Composition [MY-1]]

The following materials and 200 parts of 1.25 mm diameter zirconia beads were charged in a 200 ml glass bottle and dispersed in a paint shaker manufactured by Red Devil, Inc. for 6 hours.
Isoindoline compound (1-1): 19.0 parts
Styrene-acrylic acid copolymer (manufactured by BASF Japan Ltd., Joncryl 61J): 16.4 parts Surfactant (manufactured by Kao Corporation, EMULGEN 420): 5.0 parts
Ion exchanged water: 59.6 parts
Zirconia beads were then removed from the dispersion to obtain an IJ aqueous colorant composition [MY-1].
(Aqueous Inkjet Ink (Aqueous IJ Ink Below) [Production of Aqueous IJ Ink [MY-1]]
An amount of 33 parts of an aqueous IJ dispersion 1, 5 parts of butyl diglycol, 15 parts of 1,2-propanediol, 8.8 parts of Joncryl HPD96 (water-soluble resin manufactured by BASF Japan Ltd.), 1.25 parts of CHEMIPEARL W400S (manufactured by Mitsui Chemicals, Inc., Liolefin aqueous dispersion), 0.5 parts of Surfynol DF11 OD (manufactured by Nissin Chemical Industry Co., Ltd., anti-foaming agent), 1 part of BYK-348 (manufactured by BYK-Chemie GmbH, silicon-based surfactant), 0.1 parts of triethanolamine, 0.15 parts of Proxel GXL (manufactured by Lonza K.K., preservative), and 35.2 parts of ion exchanged water were mixed using a high-speed mixer, and filtered through a 0.5 μm membrane filter to obtain an aqueous IJ ink [MY-1].

(Examples MY-2 to MY-20, Production Examples MY-1 to MY-11, MC-1 to MC-3, MM-1 to MM-6) [Production of IJ Aqueous Colorant Compositions [MY-2] to [MY-31], [MC-1] to [MC-3], [MM-1] to [MM-6], and Aqueous IJ Inks [MY-2] to [MY-31], [MC-1] to [MC-3], [MM-1] to [MM-6]]

The IJ aqueous colorant compositions [MY-2] to [MY-31], [MC-1] to [MC-3], [MM-1] to [MM-6], and aqueous IJ inks [MY-2] to [MY 31], [MC-1] to [MC-3], and [MM-1] to [MM-6] were obtained in the same manner as in example MY-4 except that 19.0 parts of the isoindoline compound (1-1) in production example MY-1 were changed to compounds illustrated in Table 26 and the amounts illustrated in Table 26.

TABLE 26

| | Pigment | | | | |
|---|---|---|---|---|---|
| | Compound name Pigment name | Charged amount [part] | Obtained IJ aqueous colorant composition | | Obtained aqueous IJ ink |
| Example MY-1 | Isoindoline compound (1-1) | 7.00 | IJ aqueous colorant composition [MY-1] | | Aqueous IJ ink [MY-1] |
| Example MY-2 | Isoindoline compound (1-2) | 7.00 | IJ aqueous colorant composition [MY-2] | | Aqueous IJ ink [MY-2] |

TABLE 26-continued

| | Pigment | | | |
|---|---|---|---|---|
| | Compound name Pigment name | Charged amount [part] | Obtained IJ aqueous colorant composition | Obtained aqueous IJ ink |
| Example MY-3 | Isoindoline compound (1-3) | 7.00 | IJ aqueous colorant composition [MY-3] | Aqueous IJ ink [MY-3] |
| Example MY-4 | Isoindoline compound (1-4) | 7.00 | IJ aqueous colorant composition [MY-4] | Aqueous IJ ink [MY-4] |
| Example MY-5 | Isoindoline compound (1-5) | 7.00 | IJ aqueous colorant composition [MY-5] | Aqueous IJ ink [MY-5] |
| Example MY-6 | Isoindoline compound (1-6) | 7.00 | IJ aqueous colorant composition [MY-6] | Aqueous IJ ink [MY-6] |
| Example MY-7 | Isoindoline compound (1-7) | 7.00 | IJ aqueous colorant composition [MY-7] | Aqueous IJ ink [MY-7] |
| Example MY-8 | Isoindoline compound (1-8) | 7.00 | IJ aqueous colorant composition [MY-8] | Aqueous IJ ink [MY-8] |
| Example MY-9 | Isoindoline compound (1-9) | 7.00 | IJ aqueous colorant composition [MY-9] | Aqueous IJ ink [MY-9] |
| Example MY-10 | Isoindoline compound (1-10) | 7.00 | IJ aqueous colorant composition [MY-10] | Aqueous IJ ink [MY-10] |
| Example MY-11 | Isoindoline compound (1-11) | 7.00 | IJ aqueous colorant composition [MY-11] | Aqueous IJ ink [MY-11] |
| Example MY-12 | Isoindoline compound (2-1) | 7.00 | IJ aqueous colorant composition [MY-12] | Aqueous IJ ink [MY-12] |
| Example MY-13 | Isoindoline compound (2-2) | 7.00 | IJ aqueous colorant composition [MY-13] | Aqueous IJ ink [MY-13] |
| Example MY-14 | Isoindoline compound (2-3) | 7.00 | IJ aqueous colorant composition [MY-14] | Aqueous IJ ink [MY-14] |
| Example MY-15 | Isoindoline compound (2-4) | 7.00 | IJ aqueous colorant composition [MY-15] | Aqueous IJ ink [MY-15] |
| Example MY-16 | Isoindoline compound (3-1) | 7.00 | IJ aqueous colorant composition [MY-16] | Aqueous IJ ink [MY-16] |
| Example MY-17 | Isoindoline compound (1-12) Isoindoline compound (1-21) | 6.93 0.07 | IJ aqueous colorant composition [MY-17] | Aqueous IJ ink [MY-17] |
| Example MY-18 | Isoindoline compound (1-12) Isoindoline compound (1-21) Isoindoline compound (1-22) Isoindoline compound (1-23) | 6.79 0.07 0.07 0.07 | IJ aqueous colorant composition [MY-18] | Aqueous IJ ink [MY-18] |
| Example MY-19 | Isoindoline compound (1-24) | 7.00 | IJ aqueous colorant composition [MY-19] | Aqueous IJ ink [MY-19] |
| Example MY-20 | Isoindoline compound (1-25) | 7.00 | IJ aqueous colorant composition [MY-20] | Aqueous IJ ink [MY-20] |
| Production example MY-1 | Isoindoline compound (1-12) | 7.00 | IJ aqueous colorant composition [MY-21] | Aqueous IJ ink [MY-21] |
| Production example MY-2 | Isoindoline compound (1-13) | 7.00 | IJ aqueous colorant composition [MY-22] | Aqueous IJ ink [MY-22] |
| Production example MY-3 | Isoindoline compound (1-14) | 7.00 | IJ aqueous colorant composition [MY-23] | Aqueous IJ ink [MY-23] |
| Production example MY-4 | Isoindoline compound (1-15) | 7.00 | IJ aqueous colorant composition [MY-24] | Aqueous IJ ink [MY-24] |
| Production example MY-5 | Isoindoline compound (1-16) | 7.00 | IJ aqueous colorant composition [MY-25] | Aqueous IJ ink [MY-25] |
| Production example MY-6 | Isoindoline compound (1-17) | 7.00 | IJ aqueous colorant composition [MY-26] | Aqueous IJ ink [MY-26] |
| Production example MY-7 | Isoindoline compound (2-6) | 7.00 | IJ aqueous colorant composition [MY-27] | Aqueous IJ ink [MY-27] |
| Production example MY-8 | Isoindoline compound (2-7) | 7.00 | IJ aqueous colorant composition [MY-28] | Aqueous IJ ink [MY-28] |
| Production example MY-9 | Isoindoline compound (2-8) | 7.00 | IJ aqueous colorant composition [MY-29] | Aqueous IJ ink [MY-29] |
| Production example MY-10 | Isoindoline compound (2-9) | 7.00 | IJ aqueous colorant composition [MY-30] | Aqueous IJ ink [MY-30] |
| Production example MY-11 | Isoindoline compound (1-12) Isoindoline compound (1-22) Isoindoline compound (1-23) | 6.86 0.07 0.07 | IJ aqueous colorant composition [MY-31] | Aqueous IJ ink [MY-31] |
| Production example MC-1 | PB15:3 | 6.50 | IJ aqueous colorant composition [MC-1] | Aqueous IJ ink [MC-1] |
| Production example MC-2 | PB15:4 | 6.50 | IJ aqueous colorant composition [MC-2] | Aqueous IJ ink [MC-2] |
| Production example MC-3 | PB16 | 7.00 | IJ aqueous colorant composition [MC-3] | Aqueous IJ ink [MC-3] |
| Production example MM-1 | PR122 | 7.40 | IJ aqueous colorant composition [MM-1] | Aqueous IJ ink [MM-1] |
| Production example MM-2 | PV19 | 7.40 | IJ aqueous colorant composition [MM-2] | Aqueous IJ ink [MM-2] |
| Production example MM-3 | PR48:3 | 7.00 | IJ aqueous colorant composition [MM-3] | Aqueous IJ ink [MM-3] |
| Production example MM-4 | PR57:1 | 7.00 | IJ aqueous colorant composition [MM-4] | Aqueous IJ ink [MM-4] |
| Production example MM-5 | PR146 | 7.00 | IJ aqueous colorant composition [MM-5] | Aqueous IJ ink [MM-5] |
| Production example MM-6 | PR185 | 7.00 | IJ aqueous colorant composition [MM-6] | Aqueous IJ ink [MM-6] |

The pigments used in the production of inks are illustrated in Table 27.

TABLE 27

| Pigment | Product name |
|---|---|
| PB15:3 | LIONOGEN BLUE 7919 (manufactured by TOYOCOLOR CO., LTD.) |
| PB15:4 | LIONOL BLUE FG-7412-J (manufactured by TOYOCOLOR CO., LTD.) |

TABLE 27-continued

| Pigment | Product name |
|---|---|
| PB16 | Heliogen Blue D7490 (manufactured by BASF Japan Ltd.) |
| PR122 | Cinquasia Magenta D4550J (manufactured by BASF Japan Ltd.) |
| PV19 | Cinquasia Magenta E05B (manufactured by BASF Japan Ltd.) |
| PR48:3 | FUJI Red 5R 763 (manufacture by Fuji Pigment Co., LTD) |
| PR57:1 | SYMULER Brilliant Carmine 68 400S (manufactured by DIC Corporation) |
| PR146 | LIONOL RED 5620 (manufactured by TOYOCOLOR CO., LTD.) |
| PR185 | Novoperm Carmine HF4C (manufactured by CLARIANT) |

[Evaluation of Viscosity Stability Over Time]

The initial viscosity of aqueous IJ inks [MY-1] to [MY-31], [MC-1] to [MC-3], and [MM-1] to [MM-6] was measured at 25° C. using an E-type viscometer ("ELD type viscometer" manufactured by Toki Sangyo Co., Ltd.). Similarly, the viscosity was measured after aging at 25° C. for 4 weeks and after aging at 50° C. for 4 weeks. Using each measured value, the viscosity increase ratio with respect to the initial viscosity was calculated and used as an index of viscosity stability, which was evaluated according to the following criteria. Table 29 shows the results. It is thought that the viscosity stability is better as the viscosity increase ratio is smaller, and evaluations of "4", "3", and "2" in the following evaluation criteria are a practicable level.

(Evaluation Criteria for Viscosity Stability)
4: viscosity increase ratio is less than 15%
3: viscosity increase ratio is 15% or more and less than 25%
2: viscosity increase ratio is 25% or more and less than 40%
1: viscosity increase ratio is 40% or more <Evaluation of Ink Set>

(Examples MS-1 to MS-37, Comparative Examples MS-1 to MS-18) [Production of Ink Sets 301 to 355]

The obtained aqueous IJ inks were each combined as described in Table 28 to produce ink sets 301 to 355.

TABLE 28

| Ink set | | Aqueous IJ ink (yellow) | Aqueous IJ ink (cyan) | Aqueous IJ ink (magenta) |
|---|---|---|---|---|
| Example MS-1 | Ink set 301 | [MY-1] | [MC-1] | [MM-1] |
| Example MS-2 | Ink set 302 | [MY-2] | [MC-1] | [MM-1] |
| Example MS-3 | Ink set 303 | [MY-3] | [MC-1] | [MM-1] |
| Example MS-4 | Ink set 304 | [MY-4] | [MC-1] | [MM-1] |
| Example MS-5 | Ink set 305 | [MY-5] | [MC-1] | [MM-1] |
| Example MS-6 | Ink set 306 | [MY-6] | [MC-1] | [MM-1] |
| Example MS-7 | Ink set 307 | [MY-7] | [MC-1] | [MM-1] |
| Example MS-8 | Ink set 308 | [MY-8] | [MC-1] | [MM-1] |
| Example MS-9 | Ink set 309 | [MY-9] | [MC-1] | [MM-1] |
| Example MS-10 | Ink set 310 | [MY-10] | [MC-1] | [MM-1] |
| Example MS-11 | Ink set 311 | [MY-11] | [MC-1] | [MM-1] |
| Example MS-12 | Ink set 312 | [MY-12] | [MC-1] | [MM-1] |
| Example MS-13 | Ink set 313 | [MY-13] | [MC-1] | [MM-1] |
| Example MS-14 | Ink set 314 | [MY-14] | [MC-1] | [MM-1] |
| Example MS-15 | Ink set 315 | [MY-15] | [MC-1] | [MM-1] |
| Example MS-16 | Ink set 316 | [MY-16] | [MC-1] | [MM-1] |
| Example MS-17 | Ink set 317 | [MY-17] | [MC-1] | [MM-1] |
| Example MS-18 | Ink set 318 | [MY-18] | [MC-1] | [MM-1] |
| Example MS-19 | Ink set 319 | [MY-19] | [MC-1] | [MM-1] |
| Example MS-20 | Ink set 320 | [MY-20] | [MC-1] | [MM-1] |
| Example MS-21 | Ink set 321 | [MY-4] | [MC-1] | [MM-2] |
| Example MS-22 | Ink set 322 | [MY-4] | [MC-1] | [MM-3] |
| Example MS-23 | Ink set 323 | [MY-4] | [MC-1] | [MM-4] |
| Example MS-24 | Ink set 324 | [MY-4] | [MC-1] | [MM-5] |
| Example MS-25 | Ink set 325 | [MY-4] | [MC-1] | [MM-6] |
| Example MS-26 | Ink set 326 | [MY-4] | [MC-2] | [MM-1] |
| Example MS-27 | Ink set 327 | [MY-4] | [MC-2] | [MM-2] |
| Example MS-28 | Ink set 328 | [MY-4] | [MC-2] | [MM-3] |
| Example MS-29 | Ink set 329 | [MY-4] | [MC-2] | [MM-4] |
| Example MS-30 | Ink set 330 | [MY-4] | [MC-2] | [MM-5] |
| Example MS-31 | Ink set 331 | [MY-4] | [MC-2] | [MM-6] |
| Example MS-32 | Ink set 332 | [MY-4] | [MC-3] | [MM-1] |
| Example MS-33 | Ink set 333 | [MY-4] | [MC-3] | [MM-2] |
| Example MS-34 | Ink set 334 | [MY-4] | [MC-3] | [MM-3] |
| Example MS-35 | Ink set 335 | [MY-4] | [MC-3] | [MM-4] |
| Example MS-36 | Ink set 336 | [MY-4] | [MC-3] | [MM-5] |
| Example MS-37 | Ink set 337 | [MY-4] | [MC-3] | [MM-6] |
| Comparative example MS-1 | Ink set 338 | [MY-21] | [MC-1] | [MM-1] |
| Comparative example MS-2 | Ink set 339 | [MY-22] | [MC-1] | [MM-1] |
| Comparative example MS-3 | Ink set 340 | [MY-23] | [MC-1] | [MM-1] |
| Comparative example MS-4 | Ink set 341 | [MY-24] | [MC-1] | [MM-1] |
| Comparative example MS-5 | Ink set 342 | [MY-25] | [MC-1] | [MM-1] |
| Comparative example MS-6 | Ink set 343 | [MY-26] | [MC-1] | [MM-1] |
| Comparative example MS-7 | Ink set 344 | [MY-27] | [MC-1] | [MM-1] |
| Comparative example MS-8 | Ink set 345 | [MY-28] | [MC-1] | [MM-1] |
| Comparative example MS-9 | Ink set 346 | [MY-29] | [MC-1] | [MM-1] |
| Comparative example MS-10 | Ink set 347 | [MY-30] | [MC-1] | [MM-1] |
| Comparative example MS-11 | Ink set 348 | [MY-31] | [MC-1] | [MM-1] |
| Comparative example MS-12 | Ink set 349 | [MY-19] | [MC-1] | [MM-2] |
| Comparative example MS-13 | Ink set 350 | [MY-19] | [MC-1] | [MM-3] |
| Comparative example MS-14 | Ink set 351 | [MY-19] | [MC-1] | [MM-4] |
| Comparative example MS-15 | Ink set 352 | [MY-19] | [MC-1] | [MM-5] |
| Comparative example MS-16 | Ink set 353 | [MY-19] | [MC-1] | [MM-6] |
| Comparative example MS-17 | Ink set 354 | [MY-19] | [MC-2] | [MM-1] |
| Comparative example MS-18 | Ink set 355 | [MY-19] | [MC-3] | [MM-1] |

The obtained ink sets were evaluated for gamut in the following manner. Table 29 shows the results.

[Gamut Evaluation]
(Initial Evaluation)

A line pass type inkjet printer using an inkjet head with a resolution of 600 dpi in the width direction and a maximum jetting frequency of 30 kHz ("KJ4B series" manufactured by KYOCERA Corporation) was filled with yellow ink, magenta ink, and cyan ink of each ink set in each head. Using these, a color chart image (profilemaker chart image "TC3.5 CMYK i1 i0" manufactured by X-Rite, Incorporated.) was printed on coated paper (OK topcoat N manufactured by Oji Paper Co., Ltd., tsubo weight 104.7 g/m²) at a resolution of 600×600 dpi, and printed materials for evaluation were produced.

Color chart parts of the obtained printed matters for evaluation were measured using a spectrophotometer (i1 i0 Pro manufactured by X-Rite, Incorporated.) and a colorimetric tool (MesurementTool and profilemaker manufactured by X-Rite, Incorporated.), and a color reproduction area in L*a*b* color space was plotted. The measurement conditions were as follows: light source D50, 2-degree field of view, and measurement optics 45/0°. The area was determined from each plot obtained. The area ratio was obtained when the area of the reference comparative example was 100%, and the area ratio was evaluated using the following criteria. Specifically, the comparative example described in Table 29 was used as the reference.

(Evaluation Criteria)
○: area ratio is 90% or more (good)
Δ: area ratio is 85% or more and less than 90% (usable)
x: area ratio is less than 85% (unusable)

(Evaluation Over Time)
Each aqueous IJ ink was stored in an airtight container at 50° C. for 4 weeks, and then printed in the same manner as for the initial evaluation to produce an evaluation printed matter. Color measurement was performed on the obtained printed matter in the same manner as for the initial evaluation, and the area was determined from each plot obtained. The area ratio obtained by dividing the area in the over time evaluation of each example and comparative example by the area in the initial evaluation was determined, and the area ratio was evaluated using the following criteria.

(Evaluation Criteria)
○: area ratio is 98% or more (good)
Δ: area ratio is 95% or more and less than 98% (practical)
x: area ratio is less than 95% (poor)

TABLE 29

| | Viscosity stability over time | | | | | | | | |
|---|---|---|---|---|---|---|---|---|---|
| | 25° C. 4 weeks | | | 50° C. 4 weeks | | | Gamut | | Reference |
| | Aqueous IJ ink (yellow) | Aqueous IJ ink (cyan) | Aqueous IJ ink (magenta) | Aqueous IJ ink (yellow) | Aqueous IJ ink (cyan) | Aqueous IJ ink (magenta) | Initail | Over time | comparative example |
| Example MS-1 | 4 | 4 | 4 | 3 | 4 | 4 | ○ | Δ | Comparative example MS-1 |
| Example MS-2 | 4 | 4 | 4 | 4 | 4 | 4 | ○ | ○ | |
| Example MS-3 | 3 | 4 | 4 | 2 | 4 | 4 | ○ | Δ | |
| Example MS-4 | 4 | 4 | 4 | 4 | 4 | 4 | ○ | ○ | |
| Example MS-5 | 4 | 4 | 4 | 4 | 4 | 4 | ○ | ○ | |
| Example MS-6 | 4 | 4 | 4 | 4 | 4 | 4 | ○ | ○ | |
| Example MS-7 | 4 | 4 | 4 | 3 | 4 | 4 | ○ | Δ | Comparative example MS-2 |
| Example MS-8 | 4 | 4 | 4 | 4 | 4 | 4 | ○ | ○ | Comparative example MS-3 |
| Example MS-9 | 4 | 4 | 4 | 4 | 4 | 4 | ○ | ○ | Comparative example MS-4 |
| Example MS-10 | 4 | 4 | 4 | 4 | 4 | 4 | ○ | ○ | Comparative example MS-5 |
| Example MS-11 | 4 | 4 | 4 | 4 | 4 | 4 | ○ | ○ | Comparative example MS-6 |
| Example MS-12 | 3 | 4 | 4 | 2 | 4 | 4 | ○ | Δ | Comparative example MS-7 |
| Example MS-13 | 4 | 4 | 4 | 4 | 4 | 4 | ○ | ○ | Comparative example MS-8 |
| Example MS-14 | 4 | 4 | 4 | 3 | 4 | 4 | ○ | Δ | Comparative example MS-9 |
| Example MS-15 | 4 | 4 | 4 | 4 | 4 | 4 | ○ | ○ | Comparative example MS-10 |
| Example MS-16 | 4 | 4 | 4 | 4 | 4 | 4 | ○ | ○ | Comparative example MS-1 |
| Example MS-17 | 4 | 4 | 4 | 4 | 4 | 4 | ○ | ○ | |
| Example MS-18 | 4 | 4 | 4 | 4 | 4 | 4 | ○ | ○ | Comparative example MS-11 |
| Example MS-19 | 4 | 4 | 4 | 4 | 4 | 4 | ○ | ○ | Comparative example MS-1 |
| Example MS-20 | 4 | 4 | 4 | 4 | 4 | 4 | ○ | ○ | |
| Example MS-21 | 4 | 4 | 4 | 4 | 4 | 4 | ○ | ○ | |
| Example MS-22 | 4 | 4 | 4 | 4 | 4 | 4 | ○ | ○ | |
| Example MS-23 | 4 | 4 | 4 | 4 | 4 | 4 | ○ | ○ | |
| Example MS-24 | 4 | 4 | 4 | 4 | 4 | 4 | ○ | ○ | |
| Example MS-25 | 4 | 4 | 4 | 4 | 4 | 4 | ○ | ○ | |
| Example MS-26 | 4 | 4 | 4 | 4 | 4 | 4 | ○ | ○ | |
| Example MS-27 | 4 | 4 | 4 | 4 | 4 | 4 | ○ | ○ | |
| Example MS-28 | 4 | 4 | 4 | 4 | 4 | 4 | ○ | ○ | |
| Example MS-29 | 4 | 4 | 4 | 4 | 4 | 4 | ○ | ○ | |
| Example MS-30 | 4 | 4 | 4 | 4 | 4 | 4 | ○ | ○ | |
| Example MS-31 | 4 | 4 | 4 | 4 | 4 | 4 | ○ | ○ | |
| Example MS-32 | 4 | 4 | 4 | 4 | 4 | 4 | ○ | ○ | Comparative example MS-18 |
| Example MS-33 | 4 | 4 | 4 | 4 | 4 | 4 | ○ | ○ | |
| Example MS-34 | 4 | 4 | 4 | 4 | 4 | 4 | ○ | ○ | |
| Example MS-35 | 4 | 4 | 4 | 4 | 4 | 4 | ○ | ○ | |
| Example MS-36 | 4 | 4 | 4 | 4 | 4 | 4 | ○ | ○ | |
| Example MS-37 | 4 | 4 | 4 | 4 | 4 | 4 | ○ | ○ | |
| Comparative example MS-1 | 1 | 4 | 4 | 1 | 4 | 4 | Reference | x | |
| Comparative example MS-2 | 1 | 4 | 4 | 1 | 4 | 4 | Reference | x | |

TABLE 29-continued

| | Viscosity stability over time | | | | | | Gamut | | Reference |
| | 25° C. 4 weeks | | | 50° C. 4 weeks | | | | | |
| | Aqueous IJ ink (yellow) | Aqueous IJ ink (cyan) | Aqueous IJ ink (magenta) | Aqueous IJ ink (yellow) | Aqueous IJ ink (cyan) | Aqueous IJ ink (magenta) | Initail | Over time | comparative example |
|---|---|---|---|---|---|---|---|---|---|
| Comparative example MS-3 | 1 | 4 | 4 | 1 | 4 | 4 | Reference | x | |
| Comparative example MS-4 | 1 | 4 | 4 | 1 | 4 | 4 | Reference | x | |
| Comparative example MS-5 | 1 | 4 | 4 | 1 | 4 | 4 | Reference | x | |
| Comparative example MS-6 | 1 | 4 | 4 | 1 | 4 | 4 | Reference | x | |
| Comparative example MS-7 | 1 | 4 | 4 | 1 | 4 | 4 | Reference | x | |
| Comparative example MS-8 | 1 | 4 | 4 | 1 | 4 | 4 | Reference | x | |
| Comparative example MS-9 | 1 | 4 | 4 | 1 | 4 | 4 | Reference | x | |
| Comparative example MS-10 | 1 | 4 | 4 | 1 | 4 | 4 | Reference | x | |
| Comparative example MS-11 | 1 | 4 | 4 | 1 | 4 | 4 | Reference | x | |
| Comparative example MS-12 | 1 | 4 | 4 | 1 | 4 | 4 | ○ | x | Comparative example MS-1 |
| Comparative example MS-13 | 1 | 4 | 4 | 1 | 4 | 4 | ○ | x | |
| Comparative example MS-14 | 1 | 4 | 4 | 1 | 4 | 4 | ○ | x | |
| Comparative example MS-15 | 1 | 4 | 4 | 1 | 4 | 4 | ○ | x | |
| Comparative example MS-16 | 1 | 4 | 4 | 1 | 4 | 4 | ○ | x | |
| Comparative example MS-17 | 1 | 4 | 4 | 1 | 4 | 4 | ○ | x | |
| Comparative example MS-18 | 1 | 4 | 4 | 1 | 4 | 4 | Reference | x | |

As can be seen from the results shown in Table 29, the aqueous IJ ink set according to one embodiment of the present invention has a similar or higher gamut area ratio and better color reproducibility than those of the conventional ink set. In addition, the viscosity stability over time of the yellow ink was improved, and the storage stability as an ink set was good. Furthermore, also in the color reproducibility (gamut), evaluation over time was well, and the storage stability as an ink set was good.

In contrast, in comparative examples MS-1 to MS-18, the viscosity stability over time of the yellow ink was poor, and also in the color reproducibility (gamut), evaluation over time was poor. Therefore, it is clear that the storage stability as an ink set is poor and the issue of the present application cannot be solved.

<Active Energy Ray-Curable Ink Set>

An active energy ray-curable ink set was prepared using an obtained isoindoline compound, and characteristics evaluation was performed.

(Example RY-1) [Production of Yellow Ink [RY-1]]

The following materials were stirred and mixed using a butterfly mixer, and dispersed using three-rolls so that the maximum particle size was 15 μm or less to produce a yellow ink [RY-1].

isoindoline compound (1-1): 18.0 parts
EBECRYL225: 8.4 parts (active compound 5.0 parts) (10-functional urethane acrylate oligomer)
4-acryloylmorpholine: 15.0 parts (monofunctional monomer)
EO-modified trimethylolpropane triacrylate: 20.0 parts
Dipentaerythritol pentaacrylate: 5.0 parts
Dipentaerythritol hexaacrylate: 16.6 parts
Irgacure 369: 3.0 parts (photopolymerization initiator)
Chemrk DEABP: 3.0 parts (photopolymerization initiator)
SB-P1718: 4.0 parts (photopolymerization initiator)
Azisper PB821: 3.0 parts (dispersant)
T Wax compound: 4.0 parts (wax)

Examples RY-2 to RY-20, Production Examples RY-1 to RY-11, RC-1 to RC-3, RM-1 to RM-6

[Production of Yellow Inks [RY-2] to [RY-31], Cyan Inks [RC-1] to [RC-3], and Magenta Inks [RM-1] to [RM-6]]

An amount of 18.0 parts of the isoindoline compound (1-1) of example RY-1 was changed to the compounds described in Table 30 and the amounts described in Table 30. Other than this, yellow inks [RY-2] to [RY-31], cyan inks [RC-1] to [RC-3], and magenta inks [RM-1] to [RM-6] described in Table 30 were obtained in the same manner as in example RY-1.

TABLE 30

|  | Pigment | | Obtained active energy ray-curable ink |
|---|---|---|---|
|  | Compound name Pigment name | Charge amount [part] |  |
| Example RY-1 | Isoindoline compound (1-1) | 18.00 | Yellow ink [RY-1] |
| Example RY-2 | Isoindoline compound (1-2) | 18.00 | Yellow ink [RY-2] |
| Example RY-3 | Isoindoline compound (1-3) | 18.00 | Yellow ink [RY-3] |
| Example RY-4 | Isoindoline compound (1-4) | 18.00 | Yellow ink [RY-4] |
| Example RY-5 | Isoindoline compound (1-5) | 18.00 | Yellow ink [RY-5] |
| Example RY-6 | Isoindoline compound (1-6) | 18.00 | Yellow ink [RY-6] |
| Example RY-7 | Isoindoline compound (1-7) | 18.00 | Yellow ink [RY-7] |
| Example RY-8 | Isoindoline compound (1-8) | 18.00 | Yellow ink [RY-8] |
| Example RY-9 | Isoindoline compound (1-9) | 18.00 | Yellow ink [RY-9] |
| Example RY-10 | Isoindoline compound (1-10) | 18.00 | Yellow ink [RY-10] |
| Example RY-11 | Isoindoline compound (1-11) | 18.00 | Yellow ink [RY-11] |
| Example RY-12 | Isoindoline compound (2-1) | 18.00 | Yellow ink [RY-12] |
| Example RY-13 | Isoindoline compound (2-2) | 18.00 | Yellow ink [RY-13] |
| Example RY-14 | Isoindoline compound (2-3) | 18.00 | Yellow ink [RY-14] |
| Example RY-15 | Isoindoline compound (2-4) | 18.00 | Yellow ink [RY-15] |
| Example RY-16 | Isoindoline compound (3-1) | 18.00 | Yellow ink [RY-16] |
| Example RY-17 | Isoindoline compound (1-12) | 17.82 | Yellow ink [RY-17] |
|  | Isoindoline compound (1-21) | 0.18 |  |
| Example RY-18 | Isoindoline compound (1-12) | 17.46 | Yellow ink [RY-18] |
|  | Isoindoline compound (1-21) | 0.18 |  |
|  | Isoindoline compound (1-22) | 0.18 |  |
|  | Isoindoline compound (1-23) | 0.18 |  |
| Example RY-19 | Isoindoline compound (1-24) | 18.00 | Yellow ink [RY-19] |
| Example RY-20 | Isoindoline compound (1-25) | 18.00 | Yellow ink [RY-20] |
| Production example RY-1 | Isoindoline compound (1-12) | 18.00 | Yellow ink [RY-21] |
| Production example RY-2 | Isoindoline compound (1-13) | 18.00 | Yellow ink [RY-22] |
| Production example RY-3 | Isoindoline compound (1-14) | 18.00 | Yellow ink [RY-23] |
| Production example RY-4 | Isoindoline compound (1-15) | 18.00 | Yellow ink [RY-24] |
| Production example RY-5 | Isoindoline compound (1-16) | 18.00 | Yellow ink [RY-25] |
| Production example RY-6 | Isoindoline compound (1-17) | 18.00 | Yellow ink [RY-26] |
| Production example RY-7 | Isoindoline compound (2-6) | 18.00 | Yellow ink [RY-27] |
| Production example RY-8 | Isoindoline compound (2-7) | 18.00 | Yellow ink [RY-28] |
| Production example RY-9 | Isoindoline compound (2-8) | 18.00 | Yellow ink [RY-29] |
| Production example RY-10 | Isoindoline compound (2-9) | 18.00 | Yellow ink [RY-30] |
| Production example RY-11 | Isoindoline compound (1-12) | 17.64 | Yellow ink [RY-31] |
|  | Isoindoline compound (1-22) | 0.18 |  |
|  | Isoindoline compound (1-23) | 0.18 |  |
| Production example RC-1 | PB 15:3 | 18.00 | Cyan ink [RC-1] |
| Production example RC-2 | PB 15:4 | 18.00 | Cyan ink [RC-2] |
| Production example RC-3 | PB16 | 19.00 | Cyan ink [RC-3] |
| Production example RM-1 | PR122 | 19.00 | Magenta ink [RM-1] |
| Production example RM-2 | PV19 | 19.00 | Magenta ink [RM-2] |
| Production example RM-3 | PR48:3 | 18.00 | Magenta ink [RM-3] |
| Production example RM-4 | PR57:1 | 18.00 | Magenta ink [RM-4] |
| Production example RM-5 | PR146 | 18.00 | Magenta ink [RM-5] |
| Production example RM-6 | PR185 | 18.00 | Magenta ink [RM-6] |

The pigments used in the production of inks are illustrated in Table 31.

TABLE 31

| Pigment | Product name |
|---|---|
| PB15:3 | LIONOL BLUE FG-7330 (manufactured by TOYOCOLOR CO., LTD.) |
| PB15:4 | LIONOL BLUE FG-7400-G (manufactured by TOYOCOLOR CO., LTD.) |
| PB16 | Heliogen Blue D7490 (manufactured by BASF Japan Ltd.) |
| PR122 | Hostaperm Pink E 02 (manufactured by CLARIANT) |
| PV19 | Hostaperm Red Violet ER02 (manufactured by CLARIANT) |
| PR48:3 | FUJI Red 5R 763 (manufacture by Fuji Pigment Co., LTD) |
| PR57:1 | LIONOL RED 6B FG-4306-G (manufactured by TOYOCOLOR CO., LTD.) |
| PR146 | LIONOL RED 5620 (manufactured by TOYOCOLOR CO., LTD.) |
| PR185 | Novoperm Carmine HF4C (manufactured by CLARIANT) |

[Evaluation of Viscosity Stability Over Time]

The initial viscosity of the yellow inks [RY-1] to [RY-31], cyan inks [RC-1] to [RC-3], and magenta inks [RM-1] to [RM-6] was measured at 25° C. using an E-type viscometer ("ELD type viscometer" manufactured by Toki Sangyo Co., Ltd.). Similarly, the viscosity was measured after aging at 25° C. for 10 days and after aging at 25° C. for 20 days. Using each measured value, the viscosity increase ratio with respect to the initial viscosity was calculated and used as an index of viscosity stability, which was evaluated according to the following criteria. Table 32 shows the results. It is said that the viscosity stability is better as the viscosity increase ratio is smaller. The practical level is 2 or more.

Viscosity change ratio (%)=|(viscosity over time/initial viscosity)−1|×100

(Evaluation Criteria for Viscosity Stability)

4: viscosity change ratio is less than 2%
3: viscosity change ratio is 2% or more and less than 5%
2: viscosity change ratio is 5% or more and less than 10%
1: viscosity change ratio is 10% or more <Evaluation of Ink Set>

Examples RS-1 to RS-37, Comparative Examples RS-1 to RS-18

[Production of Ink Sets 401 to 455]

The obtained active energy ray-curable inks were combined as described in Table 32 to obtain ink sets 401 to 455.

TABLE 32

|  | Ink set | Yellow ink | Cyan ink | Magenta ink |
|---|---|---|---|---|
| Example RS-1 | Inkset 401 | [RY-1] | [RC-1] | [RM-1] |
| Example RS-2 | Inkset 402 | [RY-2] | [RC-1] | [RM-1] |
| Example RS-3 | Inkset 403 | [RY-3] | [RC-1] | [RM-1] |
| Example RS-4 | Inkset 404 | [RY-4] | [RC-1] | [RM-1] |
| Example RS-5 | Inkset 405 | [RY-5] | [RC-1] | [RM-1] |
| Example RS-6 | Inkset 406 | [RY-6] | [RC-1] | [RM-1] |
| Example RS-7 | Inkset 407 | [RY-7] | [RC-1] | [RM-1] |
| Example RS-8 | Inkset 408 | [RY-8] | [RC-1] | [RM-1] |
| Example RS-9 | Inkset 409 | [RY-9] | [RC-1] | [RM-1] |
| Example RS-10 | Inkset 410 | [RY-10] | [RC-1] | [RM-1] |
| Example RS-11 | Inkset 411 | [RY-11] | [RC-1] | [RM-1] |
| Example RS-12 | Inkset 412 | [RY-12] | [RC-1] | [RM-1] |
| Example RS-13 | Inkset 413 | [RY-13] | [RC-1] | [RM-1] |
| Example RS-14 | Inkset 414 | [RY-14] | [RC-1] | [RM-1] |
| Example RS-15 | Inkset 415 | [RY-15] | [RC-1] | [RM-1] |
| Example RS-16 | Inkset 416 | [RY-16] | [RC-1] | [RM-1] |
| Example RS-17 | Inkset 417 | [RY-17] | [RC-1] | [RM-1] |
| Example RS-18 | Inkset 418 | [RY-18] | [RC-1] | [RM-1] |
| Example RS-19 | Inkset 419 | [RY-19] | [RC-1] | [RM-1] |
| Example RS-20 | Inkset 420 | [RY-20] | [RC-1] | [RM-1] |
| Example RS-21 | Inkset 421 | [RY-4] | [RC-1] | [RM-2] |
| Example RS-22 | Inkset 422 | [RY-4] | [RC-1] | [RM-3] |
| Example RS-23 | Inkset 423 | [RY-4] | [RC-1] | [RM-4] |
| Example RS-24 | Inkset 424 | [RY-4] | [RC-1] | [RM-5] |
| Example RS-25 | Inkset 425 | [RY-4] | [RC-1] | [RM-6] |
| Example RS-26 | Inkset 426 | [RY-4] | [RC-2] | [RM-1] |
| Example RS-27 | Inkset 427 | [RY-4] | [RC-2] | [RM-2] |
| Example RS-28 | Inkset 428 | [RY-4] | [RC-2] | [RM-3] |
| Example RS-29 | Inkset 429 | [RY-4] | [RC-2] | [RM-4] |
| Example RS-30 | Inkset 430 | [RY-4] | [RC-2] | [RM-5] |
| Example RS-31 | Inkset 431 | [RY-4] | [RC-2] | [RM-6] |
| Example RS-32 | Inkset 432 | [RY-4] | [RC-3] | [RM-1] |
| Example RS-33 | Inkset 433 | [RY-4] | [RC-3] | [RM-2] |
| Example RS-34 | Inkset 434 | [RY-4] | [RC-3] | [RM-3] |
| Example RS-35 | Inkset 435 | [RY-4] | [RC-3] | [RM-4] |
| Example RS-36 | Inkset 436 | [RY-4] | [RC-3] | [RM-5] |
| Example RS-37 | Inkset 437 | [RY-4] | [RC-3] | [RM-6] |
| Comparative example RS-1 | Inkset 438 | [RY-21] | [RC-1] | [RM-1] |
| Comparative example RS-2 | Inkset 439 | [RY-22] | [RC-1] | [RM-1] |
| Comparative example RS-3 | Inkset 440 | [RY-23] | [RC-1] | [RM-1] |
| Comparative example RS-4 | Inkset 441 | [RY-24] | [RC-1] | [RM-1] |
| Comparative example RS-5 | Inkset 442 | [RY-25] | [RC-1] | [RM-1] |
| Comparative example RS-6 | Inkset 443 | [RY-26] | [RC-1] | [RM-1] |
| Comparative example RS-7 | Inkset 444 | [RY-27] | [RC-1] | [RM-1] |
| Comparative example RS-8 | Inkset 445 | [RY-28] | [RC-1] | [RM-1] |
| Comparative example RS-9 | Inkset 446 | [RY-29] | [RC-1] | [RM-1] |
| Comparative example RS-10 | Inkset 447 | [RY-30] | [RC-1] | [RM-1] |
| Comparative example RS-11 | Inkset 448 | [RY-31] | [RC-1] | [RM-1] |
| Comparative example RS-12 | Inkset 449 | [RY-19] | [RC-1] | [RM-2] |
| Comparative example RS-13 | Inkset 450 | [RY-19] | [RC-1] | [RM-3] |
| Comparative example RS-14 | Inkset 451 | [RY-19] | [RC-1] | [RM-4] |
| Comparative example RS-15 | Inkset 452 | [RY-19] | [RC-1] | [RM-5] |
| Comparative example RS-16 | Inkset 453 | [RY-19] | [RC-1] | [RM-6] |
| Comparative example RS-17 | Inkset 454 | [RY-19] | [RC-2] | [RM-1] |
| Comparative example RS-18 | Inkset 455 | [RY-19] | [RC-3] | [RM-1] |

The obtained ink sets were evaluated for gamut in the following manner. Table 33 shows the results.

[Gamut Evaluation]

(Initial Evaluation)

With the ink sets obtained above, cyan ink was printed on coated paper using an anilox roller having a line number of 800 lpi and a cell volume of 3.72 cm³/m² and a flexi-proof machine, and then cured with a conveyor speed of 50 m/min and an air-cooled mercury lamp (under the condition of an output of 160 w/cm²). Then, magenta ink was printed on the cyan ink layer under the same conditions as in the cyan ink, and yellow ink was printed on the magenta ink layer. In this way, an evaluation printed matter layered in the order of the substrate, cyan ink layer, magenta ink layer, and yellow ink layer was obtained.

For the obtained printed matter, the density value of the monochromatic solid part (yellow, magenta, cyan) of the printed matter was measured using a Gretagmacbeth D196. In addition, using a SpectroEye manufactured by Gretagmacbeth LLC as a measurement device, color measurement was performed on the monochromatic solid part and the overprinted part under the conditions of D50 light source, 2 degree observation field, white back (using a standard white plate), and no filter.

In a two-dimensional space with a* as the horizontal axis and b* as the vertical axis, a hexagon obtained by plotting the values of a* versus b* of six colors of the monochromatic solid part (yellow, magenta, cyan) and the monochromatic solid overprinted part (cyan×magenta, cyan×yellow, yellow×magenta) was prepared, and the area was determined. The area ratio when the area of the reference comparative example was set to 100% was determined, and the area ratio was evaluated by the following criteria. Specifically, the comparative example described in Table 33 was used as the reference. Note that - indicates not evaluated.

(Evaluation Criteria)
○: area ratio is 90% or more (good)
Δ: area ratio is 85% or more and less than 90% (usable)
x: area ratio is less than 85% (unusable)

(Evaluation Over Time)
Active energy ray-curable inks were each stored in an airtight container at 25° C. for 20 days, and printed in the same manner as for the initial evaluation to produce an evaluation printed matter. Color measurement was performed on the obtained printed matter in the same manner as for the initial evaluation, and the area was determined from each plot obtained. The area ratio obtained by dividing the area in the over time evaluation of each example and comparative example by the area in the initial evaluation was determined, and the area ratio was evaluated using the following criteria.

(Evaluation Criteria)
○: area ratio is 98% or more (good)
Δ: area ratio is 95% or more and less than 98% (practical)
x: area ratio is less than 95% (poor)

TABLE 33

| | Viscosity stability over time | | | | | | Gamut | | Reference |
| | 25° C. 10 days | | | 25° C. 20 days | | | | | |
| | Yellow ink | Cyan ink | Magenta ink | Yellow ink | Cyan ink | Magenta ink | Initail | Over time | comparative example |
|---|---|---|---|---|---|---|---|---|---|
| Example RS-1 | 4 | 4 | 4 | 3 | 4 | 4 | ○ | Δ | Comparative example RS-1 |
| Example RS-2 | 4 | 4 | 4 | 3 | 4 | 4 | ○ | ○ | |
| Example RS-3 | 4 | 4 | 4 | 3 | 4 | 4 | ○ | Δ | |
| Example RS-4 | 4 | 4 | 4 | 4 | 4 | 4 | ○ | ○ | |
| Example RS-5 | 4 | 4 | 4 | 4 | 4 | 4 | ○ | ○ | |
| Example RS-6 | 4 | 4 | 4 | 4 | 4 | 4 | ○ | ○ | |
| Example RS-7 | 4 | 4 | 4 | 3 | 4 | 4 | ○ | Δ | Comparative example RS-2 |
| Example RS-8 | 4 | 4 | 4 | 4 | 4 | 4 | ○ | ○ | Comparative example RS-3 |
| Example RS-9 | 4 | 4 | 4 | 3 | 4 | 4 | ○ | ○ | Comparative example RS-4 |
| Example RS-10 | 4 | 4 | 4 | 3 | 4 | 4 | ○ | ○ | Comparative example RS-5 |
| Example RS-11 | 4 | 4 | 4 | 4 | 4 | 4 | ○ | ○ | Comparative example RS-6 |
| Example RS-12 | 4 | 4 | 4 | 3 | 4 | 4 | ○ | Δ | Comparative example RS-7 |
| Example RS-13 | 4 | 4 | 4 | 3 | 4 | 4 | ○ | ○ | Comparative example RS-8 |
| Example RS-14 | 4 | 4 | 4 | 4 | 4 | 4 | ○ | ○ | Comparative example RS-9 |
| Example RS-15 | 4 | 4 | 4 | 4 | 4 | 4 | ○ | ○ | Comparative example RS-10 |
| Example RS-16 | 4 | 4 | 4 | 3 | 4 | 4 | ○ | ○ | Comparative example RS-1 |
| Example RS-17 | 4 | 4 | 4 | 3 | 4 | 4 | ○ | ○ | |
| Example RS-18 | 4 | 4 | 4 | 4 | 4 | 4 | ○ | ○ | Comparative example RS-11 |
| Example RS-19 | 4 | 4 | 4 | 4 | 4 | 4 | ○ | ○ | Comparative example RS-1 |
| Example RS-20 | 4 | 4 | 4 | 4 | 4 | 4 | ○ | ○ | |
| Example RS-21 | 4 | 4 | 4 | 4 | 4 | 4 | ○ | ○ | |
| Example RS-22 | 4 | 4 | 4 | 4 | 4 | 4 | ○ | ○ | |
| Example RS-23 | 4 | 4 | 4 | 4 | 4 | 4 | ○ | ○ | |
| Example RS-24 | 4 | 4 | 4 | 4 | 4 | 4 | ○ | ○ | |
| Example RS-25 | 4 | 4 | 4 | 4 | 4 | 4 | ○ | ○ | |
| Example RS-26 | 4 | 4 | 4 | 4 | 4 | 4 | ○ | ○ | |
| Example RS-27 | 4 | 4 | 4 | 4 | 4 | 4 | ○ | ○ | |
| Example RS-28 | 4 | 4 | 4 | 4 | 4 | 4 | ○ | ○ | |
| Example RS-29 | 4 | 4 | 4 | 4 | 4 | 4 | ○ | ○ | |
| Example RS-30 | 4 | 4 | 4 | 4 | 4 | 4 | ○ | ○ | |
| Example RS-31 | 4 | 4 | 4 | 4 | 4 | 4 | ○ | ○ | |
| Example RS-32 | 4 | 4 | 4 | 4 | 4 | 4 | ○ | ○ | Comparative example RS-18 |
| Example RS-33 | 4 | 4 | 4 | 4 | 4 | 4 | ○ | ○ | |
| Example RS-34 | 4 | 4 | 4 | 4 | 4 | 4 | ○ | ○ | |

TABLE 33-continued

| | Viscosity stability over time | | | | | | Gamut | | Reference |
| | 25° C. 10 days | | | 25° C. 20 days | | | | | |
| | Yellow ink | Cyan ink | Magenta ink | Yellow ink | Cyan ink | Magenta ink | Initail | Over time | comparative example |
|---|---|---|---|---|---|---|---|---|---|
| Example RS-35 | 4 | 4 | 4 | 4 | 4 | 4 | ○ | ○ | |
| Example RS-36 | 4 | 4 | 4 | 4 | 4 | 4 | ○ | ○ | |
| Example RS-37 | 4 | 4 | 4 | 4 | 4 | 4 | ○ | ○ | |
| Comparative example RS-1 | 1 | 4 | 4 | 1 | 4 | 4 | Reference | x | |
| Comparative example RS-2 | 1 | 4 | 4 | 1 | 4 | 4 | Reference | x | |
| Comparative example RS-3 | 2 | 4 | 4 | 1 | 4 | 4 | Reference | x | |
| Comparative example RS-4 | 2 | 4 | 4 | 1 | 4 | 4 | Reference | x | |
| Comparative example RS-5 | 2 | 4 | 4 | 1 | 4 | 4 | Reference | x | |
| Comparative example RS-6 | 2 | 4 | 4 | 1 | 4 | 4 | Reference | x | |
| Comparative example RS-7 | 1 | 4 | 4 | 1 | 4 | 4 | Reference | x | |
| Comparative example RS-8 | 2 | 4 | 4 | 1 | 4 | 4 | Reference | x | |
| Comparative example RS-9 | 1 | 4 | 4 | 1 | 4 | 4 | Reference | x | |
| Comparative example RS-10 | 1 | 4 | 4 | 1 | 4 | 4 | Reference | x | |
| Comparative example RS-11 | 2 | 4 | 4 | 1 | 4 | 4 | Reference | x | |
| Comparative example RS-12 | 1 | 4 | 4 | 1 | 4 | 4 | ○ | x | Comparative example RS-1 |
| Comparative example RS-13 | 1 | 4 | 4 | 1 | 4 | 4 | ○ | x | |
| Comparative example RS-14 | 1 | 4 | 4 | 1 | 4 | 4 | ○ | x | |
| Comparative example RS-15 | 1 | 4 | 4 | 1 | 4 | 4 | ○ | x | |
| Comparative example RS-16 | 1 | 4 | 4 | 1 | 4 | 4 | ○ | x | |
| Comparative example RS-17 | 1 | 4 | 4 | 1 | 4 | 4 | ○ | x | |
| Comparative example RS-18 | 1 | 4 | 4 | 1 | 4 | 4 | Reference | x | |

As can be seen from the results shown in Table 33, the active energy ray-curable ink set according to one embodiment of the present invention has a similar or higher gamut area ratio and better color reproducibility than those of the conventional ink set. In addition, In addition, the viscosity stability over time of the yellow ink was improved, and the storage stability as an ink set was good. Furthermore, also in the color reproducibility (gamut), evaluation over time was well, and the storage stability as an ink set was good.

In contrast, in comparative examples RS-1 to RS-18, the viscosity stability over time of yellow ink was poor, and also in the color reproducibility (gamut), evaluation over time was poor. It is thus clear that the storage stability as an ink set is poor and the issue of the present application cannot be solved.

The invention claimed is:

1. A pigment composition comprising:
a compound represented by formula (1) below; and
a compound represented by formula (2) below,

[Chemical formula 1]

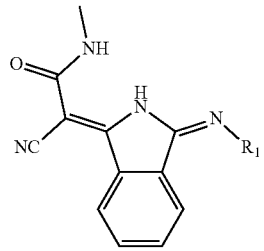

(1)

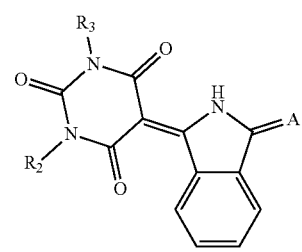

(2)

[wherein in formula, $R_1$ represents an alkyl group that may be substituted, $R_2$ and $R_3$ each independently represent: a hydrogen atom; or an alkyl or aryl group that may be substituted, 'A' represents a group represented by formula (3) below, formula (4) below, or formula (5) below,

[Chemical formula 2]

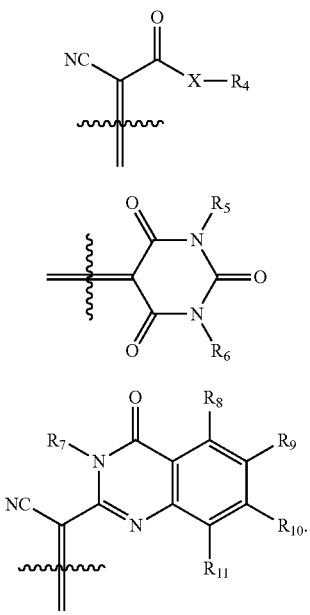

wherein in formula, 'X' represents —O— or —NH—, and $R_4$ represents an alkyl or aryl group that may be substituted, $R_5$ and $R_6$ each independently represent a hydrogen atom, or an alkyl group that may be substituted, and $R_7$ represents a hydrogen atom, $R_8$ to $R_{11}$ each independently represent: a hydrogen atom; a halogen atom; or an alkyl, alkoxy, aryl, or aryloxy group that may be substituted].

2. A colorant composition comprising:
the pigment composition according to claim 1; and
a dispersion medium.

3. A composition for molding comprising:
the colorant composition according to claim 2.

4. A toner comprising:
the colorant composition according to claim 2.

5. A coating material comprising:
the colorant composition according to claim 2.

6. A printing ink comprising:
the colorant composition according to claim 2.

7. An inkjet ink comprising:
the colorant composition according to claim 2.

8. An ink set comprising: at least, yellow ink, cyan ink, and magenta ink, wherein
the yellow ink is an ink including the colorant composition according to claim 2.

9. A gravure ink set comprising: at least, yellow ink, cyan ink, and magenta ink, wherein
the yellow ink is an ink including the colorant composition according to claim 2.

10. The gravure ink set according to claim 9, further comprising: a clear ink.

11. A printed matter comprising: a substrate; and a printed layer formed from the gravure ink set according to claim 9.

12. A printed matter comprising: a substrate; a printed layer formed from the gravure ink set according to claim 9; and a detachable layer formed from a clear ink.

13. A packaging material comprising: the printed matter according to claim 11.

14. A packaging material comprising: the printed matter according to claim 12.

* * * * *